US007630100B2

(12) United States Patent
Tojima et al.

(10) Patent No.: US 7,630,100 B2
(45) Date of Patent: Dec. 8, 2009

(54) COLOR IMAGE FORMING APPARATUS

(75) Inventors: Kenzo Tojima, Tokyo (JP); Hiroki Kitamura, Kawasaki (JP); Yoshiyuki Akiba, Yokohama (JP); Tsutomu Takata, Yokohama (JP); Shuichi Nakamura, Kawasaki (JP); Yusuke Yamamoto, Tokyo (JP); Masanao Motoyama, Tokyo (JP); Takeshi Akiyama, Tokyo (JP); Takaaki Nagaoka, Hadano (JP)

(73) Assignee: Canon Kabushiki Kaisha, Tokyo (JP)

( * ) Notice: Subject to any disclaimer, the term of this patent is extended or adjusted under 35 U.S.C. 154(b) by 737 days.

(21) Appl. No.: 11/279,001

(22) Filed: Apr. 7, 2006

(65) Prior Publication Data
US 2006/0226338 A1  Oct. 12, 2006

(30) Foreign Application Priority Data

| Apr. 8, 2005 | (JP) | ............................. | 2005-112657 |
| Apr. 8, 2005 | (JP) | ............................. | 2005-112658 |
| Apr. 15, 2005 | (JP) | ............................. | 2005-118972 |
| Apr. 15, 2005 | (JP) | ............................. | 2005-118973 |
| Apr. 15, 2005 | (JP) | ............................. | 2005-118974 |
| Apr. 15, 2005 | (JP) | ............................. | 2005-118975 |

(51) Int. Cl.
*H04N 1/409* (2006.01)
*G06K 1/00* (2006.01)
*G06K 9/00* (2006.01)
*G03F 3/08* (2006.01)
*B41J 2/47* (2006.01)
*B41J 2/435* (2006.01)
*G03G 15/01* (2006.01)

(52) U.S. Cl. ...................... 358/3.26; 358/1.9; 358/518; 382/162; 382/167; 382/275; 382/289; 347/232; 347/234; 347/235; 347/248; 399/66; 399/111; 399/115; 399/303

(58) Field of Classification Search ................ 358/3.26, 358/1.9, 518; 382/162, 167, 275, 289; 347/232, 347/234, 235, 248; 399/66, 111, 115, 303
See application file for complete search history.

(56) References Cited

U.S. PATENT DOCUMENTS 5,854,958 A * 12/1998 Tanimoto et al. .............. 399/49

(Continued)

FOREIGN PATENT DOCUMENTS

EP  1 372 336 A  12/2003

(Continued)

OTHER PUBLICATIONS

Office Action dated Aug. 21, 2009, in JP 2005-118973.

*Primary Examiner*—Edward L Coles
*Assistant Examiner*—Charlotte M Baker
(74) *Attorney, Agent, or Firm*—Fitzpatrick, Cella, Harper & Scinto

(57) ABSTRACT

A color image forming apparatus of a so-called tandem type which has image forming units in correspondence with colors is provided. In the color image forming apparatus, a color discrepancy amount storage unit stores information of a color discrepancy amount of each of the image forming units, which is measured in advance. A first color discrepancy correcting unit performs color discrepancy correction in a pixel unit by performing coordinate conversion of bitmap data to be printed based on the information of the color discrepancy amount stored in the color discrepancy amount storage unit. A second color discrepancy correcting unit performs color discrepancy correction in less than a pixel unit by performing tone correction of the bitmap data corrected by the first color discrepancy correcting unit based on the information of the color discrepancy amount stored in the color discrepancy amount storage unit.

40 Claims, 43 Drawing Sheets

U.S. PATENT DOCUMENTS

| | | |
|---|---|---|
| 5,903,262 A | 5/1999 | Ichihashi et al. |
| 6,069,984 A | 5/2000 | Sadler et al. ................. 382/321 |
| 6,075,527 A | 6/2000 | Ichihashi et al. |
| 6,134,022 A | 10/2000 | Yamamoto et al. |
| 6,215,512 B1 | 4/2001 | Imaizumi et al. ............ 347/234 |
| 6,229,626 B1* | 5/2001 | Boll ............................ 358/1.9 |
| 6,493,533 B1* | 12/2002 | Munakata ................... 399/301 |
| 6,529,643 B1 | 3/2003 | Loce et al. .................. 382/300 |
| 6,912,064 B1 | 6/2005 | Fujita |
| 2001/0055120 A1 | 12/2001 | Sawada et al. ............... 358/1.9 |

FOREIGN PATENT DOCUMENTS

| | | |
|---|---|---|
| JP | 64-040956 | 2/1989 |
| JP | 08-085236 | 4/1996 |
| JP | 08-085237 | 4/1996 |
| JP | 9-39294 | 2/1997 |
| JP | 09-090695 | 4/1997 |
| JP | 2000-56525 | 2/2000 |

* cited by examiner

FIG. 5

| REGION | WIDTH (dot) | INCLINATION (dot) |
|---|---|---|
| REGION 1 | L1 | m1 |
| REGION 2 | L2 | m2 |
| REGION 3 | L3 | m3 |

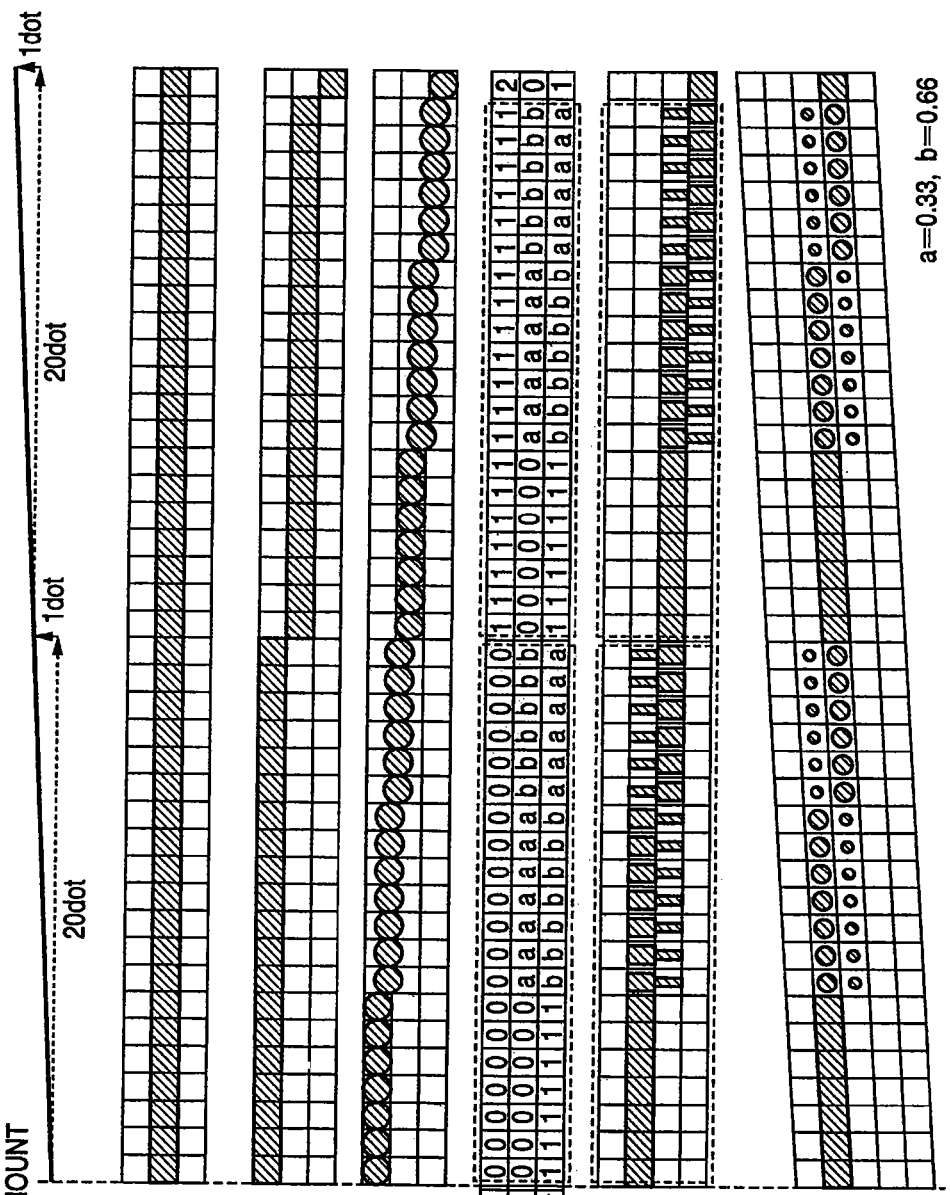

FIG. 12

| REGION | WIDTH (mm) | INCLINATION (mm) |
|---|---|---|
| REGION 1 | L1 | m1 |
| REGION 2 | L2 | m2 |
| REGION 3 | L3 | m3 |

FIG. 22A
INCLINATION DISCREPANCY AMOUNT
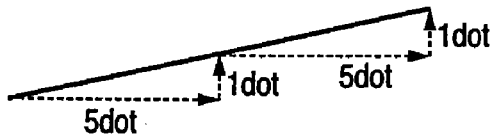
FIG. 22B
BITMAP IMAGE
(BEFORE TONE CORRECTION)
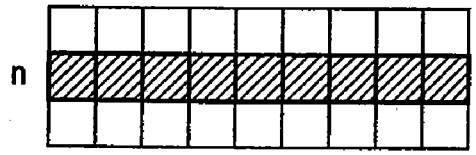
FIG. 22C
CORRECTED BITMAP IMAGE
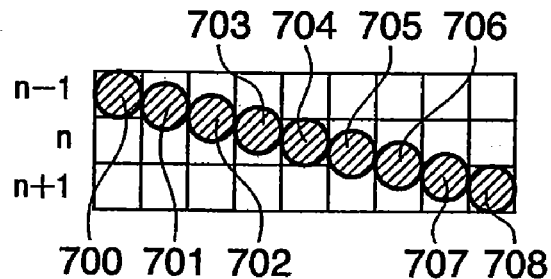
FIG. 22D
CORRECTION AMOUNT
| Δy | 0 | 0.25 | 0.5 | 0.75 | 1 | 1.25 | 1.5 | 1.75 | 2 |
|---|---|---|---|---|---|---|---|---|---|
| k | 0 | 0 | 0 | 0 | 1 | 1 | 1 | 1 | 2 |
| α = Δy−k | 0 | 0.25 | 0.5 | 0.75 | 0 | 0.25 | 0.5 | 0.75 | 0 |
| β = 1−α | 1 | 0.75 | 0.5 | 0.25 | 1 | 0.75 | 0.5 | 0.25 | 1 |
FIG. 22E
BITMAP IMAGE
(AFTER TONE CORRECTION)
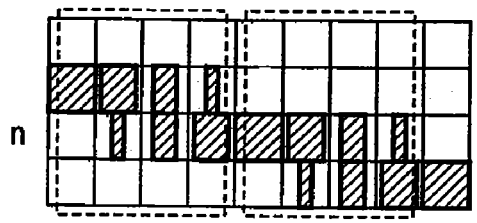
FIG. 22F
EXPOSED IMAGE
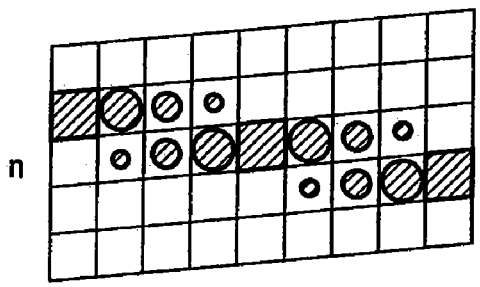

FIG. 26

| REGION | WIDTH (mm) | DISCREPANCY AMOUNT (mm) |
|---|---|---|
| REGION 1 | L1 | m1 |
| REGION 2 | L2−L1 | m2−m1 |
| REGION 3 | L3−L2 | m3−m2 |

FIG. 29A
INCLINATION DISCREPANCY AMOUNT
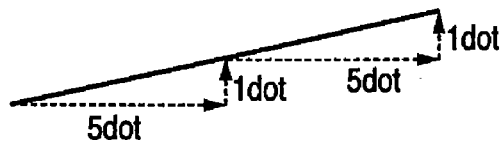
FIG. 29B
BITMAP IMAGE (BEFORE TONE CORRECTION)
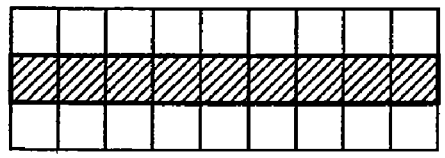
FIG. 29C
CORRECTED BITMAP IMAGE
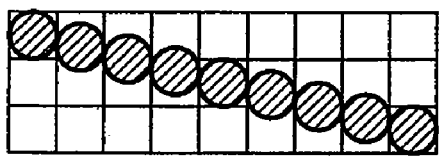
FIG. 29D
CORRECTION AMOUNT
| $\Delta y$ | 0 | 0.25 | 0.5 | 0.75 | 1 | 1.25 | 1.5 | 1.75 | 2 |
|---|---|---|---|---|---|---|---|---|---|
| k | 0 | 0 | 0 | 0 | 1 | 1 | 1 | 1 | 2 |
| $\beta = \Delta y - k$ | 0 | 0.25 | 0.5 | 0.75 | 0 | 0.25 | 0.5 | 0.75 | 0 |
| $\alpha = 1 - \beta$ | 0 | 0.75 | 0.5 | 0.25 | 0 | 0.75 | 0.5 | 0.25 | 0 |
FIG. 29E
BITMAP IMAGE (AFTER TONE CORRECTION)
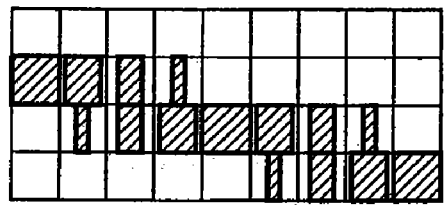
FIG. 29F
EXPOSED IMAGE
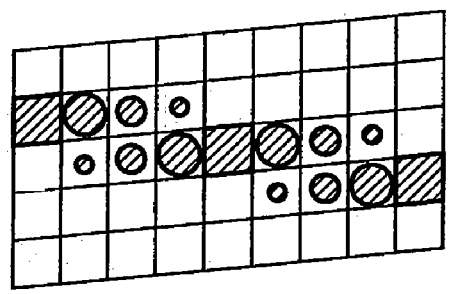

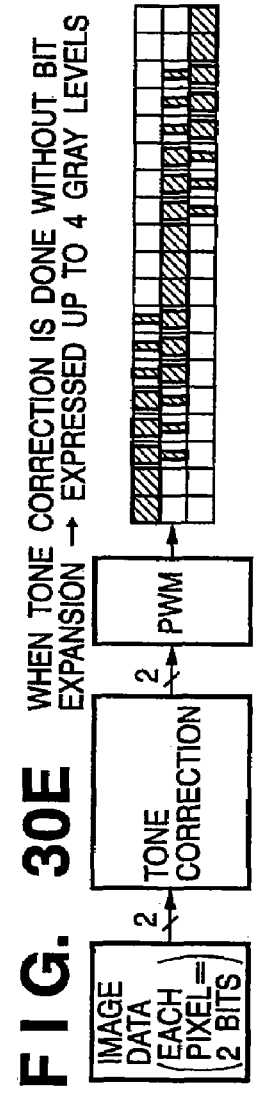
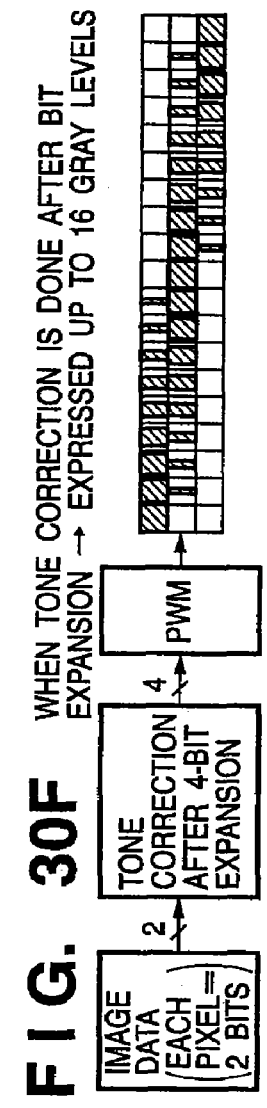
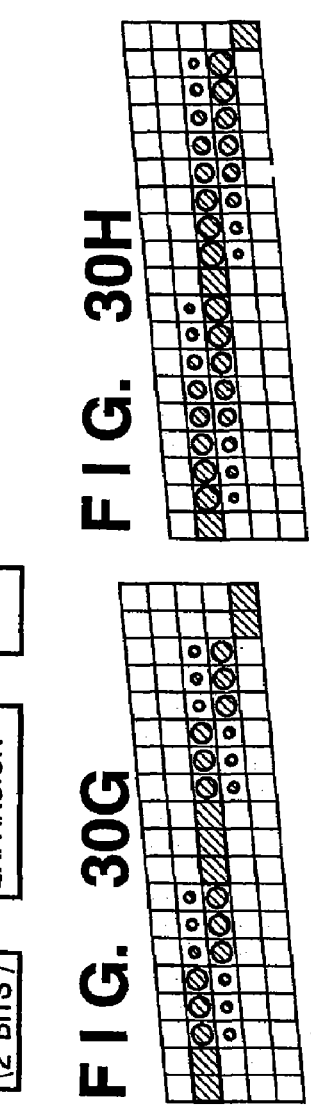
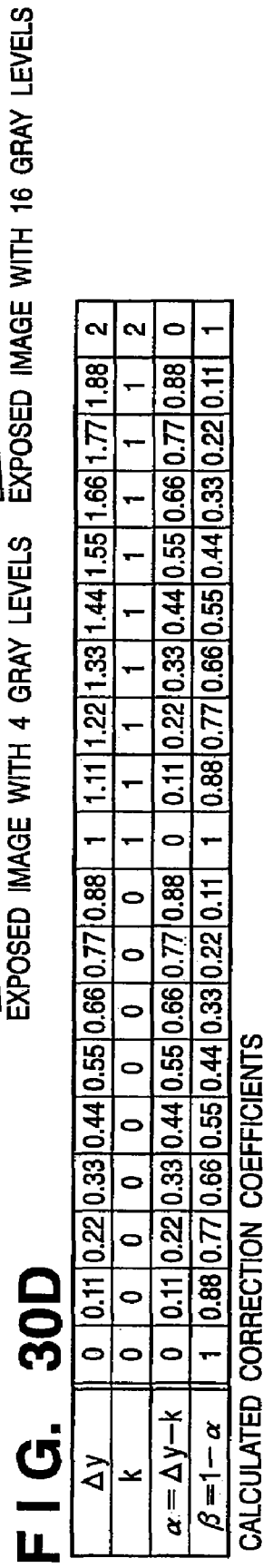

IDEAL IMAGE

DISTORTED IMAGE

IMAGE AFTER COORDINATE
CONVERSION PROCESSING

PRINT IMAGE AFTER COORDINATE
CONVERSION PROCESSING

INPUT IMAGE

IMAGE AFTER
COLOR DISCREPANCY
CORRECTION

IDEAL IMAGE

WITHOUT CORRECTION

AFTER OUTPUT POSITION CORRECTION

COLOR IMAGE FORMING APPARATUS

FIELD OF THE INVENTION

The present invention relates to a color image forming apparatus and, more particularly, to a color image forming apparatus of an electrophotographic method.

BACKGROUND OF THE INVENTION

A color image forming apparatus of an electrophotographic method is well known. In this method, one photosensitive member undergoes developments of respective colors using a plurality of developers, color images are superposed and formed on a single transfer material by repeating exposure, development, and transfer processes a plurality of number of times, and these color images are fixed to obtain a full-color image.

However, this method must repeat three (four if black is used) image forming processes to obtain a print image on one sheet, resulting in a long image forming time.

As a system that can cope with this drawback, a so-called tandem system which superposes visual images obtained for respective colors using a plurality of photosensitive members to obtain a full-color print via a single paper feed operation is known. According to this tandem system, the throughput can be greatly improved. On the other hand, a color discrepancy program has occurred due to misalignments of respective colors on a transfer material resulting from errors of the positional precisions and diameters of photosensitive members, and the positional precision errors of optical systems, and it is difficult to obtain a high-quality full-color image.

Various measures against this color discrepancy have been proposed. For example, Japanese Patent Application Laid-Open No. 64-40956 (parent reference 1) discloses a technique which forms a test toner image on a transfer material or a transfer belt which forms a transfer unit, detects the formed image, and corrects the optical path of each optical system or corrects the image write start position of each color based on the detection result.

Japanese Patent Application Laid-Open No. 8-85237 (patent reference 2) discloses the following technique. The output coordinates of image data of respective colors are converted into those free from any registration errors. After that, based on the converted image data of respective colors, the positions of modulated light beams are corrected by an amount less than the minimum dot unit of a color signal.

However, the method disclosed in patent reference 1 poses, e.g., the following problems.

First, in order to correct the optical path of the optical system, a correction optical system including a light source and f-θ lens, a mirror in the optical path, and the like must be mechanically moved to adjust the position of the test toner image. For this purpose, high-precision movable members are required, resulting in high cost. Furthermore, since it takes much time until correction is completed, it is impossible to frequently perform correction. However, an optical path length difference may change along with an elapse of time due to temperature rise of mechanical components. In such case, it becomes difficult to prevent color discrepancy by correcting the optical path of the optical system. Second, in order to correct the image write start position, it is possible to conduct misalignment correction of the left end and upper left portion but it is impossible to correct the tilt of the optical system and to correct any magnification errors due to the optical path length difference.

The method disclosed in patent reference 2 poses, e.g., a problem of a large calculation volume since color discrepancy correction amounts must be calculated for all pixels. FIGS. 1A and 1B show an example. An image shown in FIG. 1A has a constant density value. In order to obtain an image shown in FIG. 1B by applying arbitrary color discrepancy correction to this input image, the density values corresponding to all pixels must be calculated. For this reason, the calculation volume becomes large, and the arrangement of a processing system becomes complicated.

SUMMARY OF THE INVENTION

In view of the above problems in the conventional art, the present invention has an object to provide a color image forming apparatus which can obtain a high-quality color image by reducing color discrepancy without large increase in cost.

According to one aspect of the present invention, there is provided a color image forming apparatus of a so-called tandem type which comprises image forming units in correspondence with colors. This color image forming apparatus comprises a color discrepancy amount storage unit configured to store information of a color discrepancy amount of each of the image forming units, which is measured in advance, a first color discrepancy correcting unit configured to perform color discrepancy correction in a pixel unit by performing coordinate conversion of bitmap data to be printed based on the information of the color discrepancy amount stored in the color discrepancy amount storage unit, and a second color discrepancy correcting unit configured to perform color discrepancy correction in less than a pixel unit by performing tone correction of the bitmap data corrected by the first color discrepancy correcting unit based on the information of the color discrepancy amount stored in the color discrepancy amount storage unit.

The above and other objects and features of the present invention will appear more fully hereinafter from a consideration of the following description taken in connection with the accompanying drawings wherein one example is illustrated by way of example.

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 5 is a table showing an example of information stored in a color discrepancy amount storage unit in the first embodiment of the present invention;

FIGS. 7A to 7G are views for explaining discrepancy correction in less than the pixel unit by a tone corrector in the first embodiment of the present invention;

FIG. 12 is a table showing an example of data stored in a color discrepancy amount storage unit according to the third embodiment of the present invention;

FIGS. 22A to 22F are conceptual views for explaining the operation contents when a tone corrector according to the fourth embodiment of the present invention performs color discrepancy correction in less than a dot unit, i.e., it corrects a discrepancy amount of the decimal part of the color discrepancy correction amount $\Delta y$;

FIG. 26 is a table showing an example of data stored in a color discrepancy amount storage unit according to the fifth embodiment of the present invention;

FIGS. 29A to 29F are views illustrating the operation contents of color discrepancy correction in less than the pixel unit performed by a tone corrector according to the fifth embodiment of the present invention;

FIGS. 30A to 30H are views illustrating processing for assigning many bits to the number of bits of data output from a bitmap memory upon performing tone correction according to the fifth embodiment of the present invention;

DESCRIPTION OF THE PREFERRED EMBODIMENTS

Preferred embodiments of the present invention will be described in detail in accordance with the accompanying drawings. The present invention is not limited by the disclosure of the embodiments and all combinations of the features described in the embodiments are not always indispensable to solving means of the present invention.

First Embodiment

Figure 1:
FIGS. 1A and 1B are views for explaining conventional color discrepancy correction processing.
Figure 2:
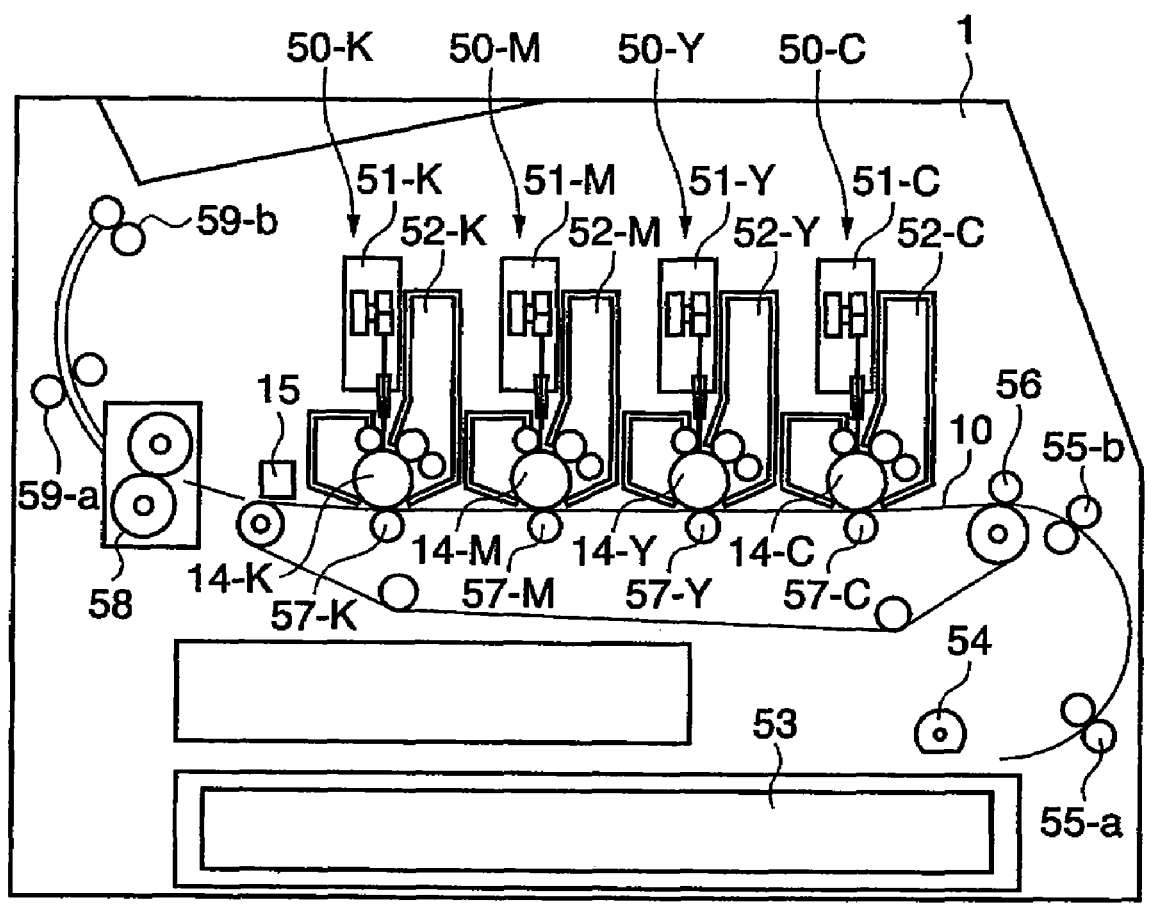
FIG. 2 is a schematic sectional view showing the arrangement of a color image forming apparatus according to the first embodiment of the present invention.

FIG. 2 is a schematic sectional view showing the arrangement of a color image forming apparatus according to this embodiment. A color image forming apparatus 1 shown in FIG. 2 is a color laser beam printer of a so-called tandem system, which comprises, e.g., four photosensitive drums. This color image forming apparatus 1 mounts a transfer material cassette 53 in a lower portion of the right side surface of its main body. Transfer materials set in the transfer material cassette 53 are picked up one by one by a paper feed roller 54, and each transfer material is fed to image forming units by guide roller pairs 55-*a* and 55-*b*. A feeding belt 10 that feeds the transfer material is stretched flat via a plurality of rotary rollers in the transfer material feeding direction (from the right to the left in FIG. 2), and the transfer material is electrostatically attracted on the most upstream portion of the feeding belt 10.

The color image forming apparatus 1 has four image forming units (sometimes referred to as "printer engines" or "image station") 50-C, 50-Y, 50M, and 50-K, which are juxtaposed in turn from the upstream side along the feeding belt 10. The printer engine 50-C forms an image using C (CYAN) toner. The printer engine 50-Y forms an image using Y (YELLOW) toner. The printer engine 50-M forms an image using M (magenta) toner. The printer engine 50-K forms an image using K (BLACK) toner. These printer engines respectively comprise photosensitive drums 14-C, 14-M, 14-Y, and 14-K as drum-shaped image carriers, which face the belt conveyor surface of the feeding belt 10. This is the basic arrangement of the so-called tandem system. Since the detailed arrangements of the respective printer engines are basically the same, the arrangement of the printer engine 50-C will be described as a representative, and a description of the arrangements of other printer engines will be omitted.

The printer engine 50-C comprises an exposure unit 51-C, developing unit 52-C, and transfer member 57-C in addition to the photosensitive drum 14-C. The exposure unit 51-C includes a laser scanner, and the developing unit 52-C includes C (CYAN) toner, a charger, and a developer. A predetermined gap is formed between the charger and developer in the housing of the developing unit 52-C, and the circumferential surface of the photosensitive drum 14-C is uniformly charged by a predetermined charge from the exposure unit 51-C via this gap. The exposure unit 51-C exposes the circumferential surface of the photosensitive drum 14-C in accordance with image information to form an electrostatic latent image, and the developer transfers toner to a low-potential part of the electrostatic latent image to develop a toner image.

The transfer member 57-C is arranged on the other side of the conveyor surface of the feeding belt 10. The toner image formed (developed) on the circumferential surface of the photosensitive drum 14-C is attracted by a charge, which is generated on the fed transfer material by a transfer electric field formed by the transfer member 57-C, and is transferred onto the surface of the transfer material.

The transfer material on which toner images are transferred by the respective printer engines are discharged outside the apparatus by discharge roller pairs 59-*a* and 59-*b*. Note that the feeding belt 10 may be an intermediate feeding belt which has an arrangement for temporarily transferring C (CYAN), Y (YELLOW), M (MAGENTA), and K (BLACK) color toners, and then secondarily transferring them onto a transfer material.

Figure 3:
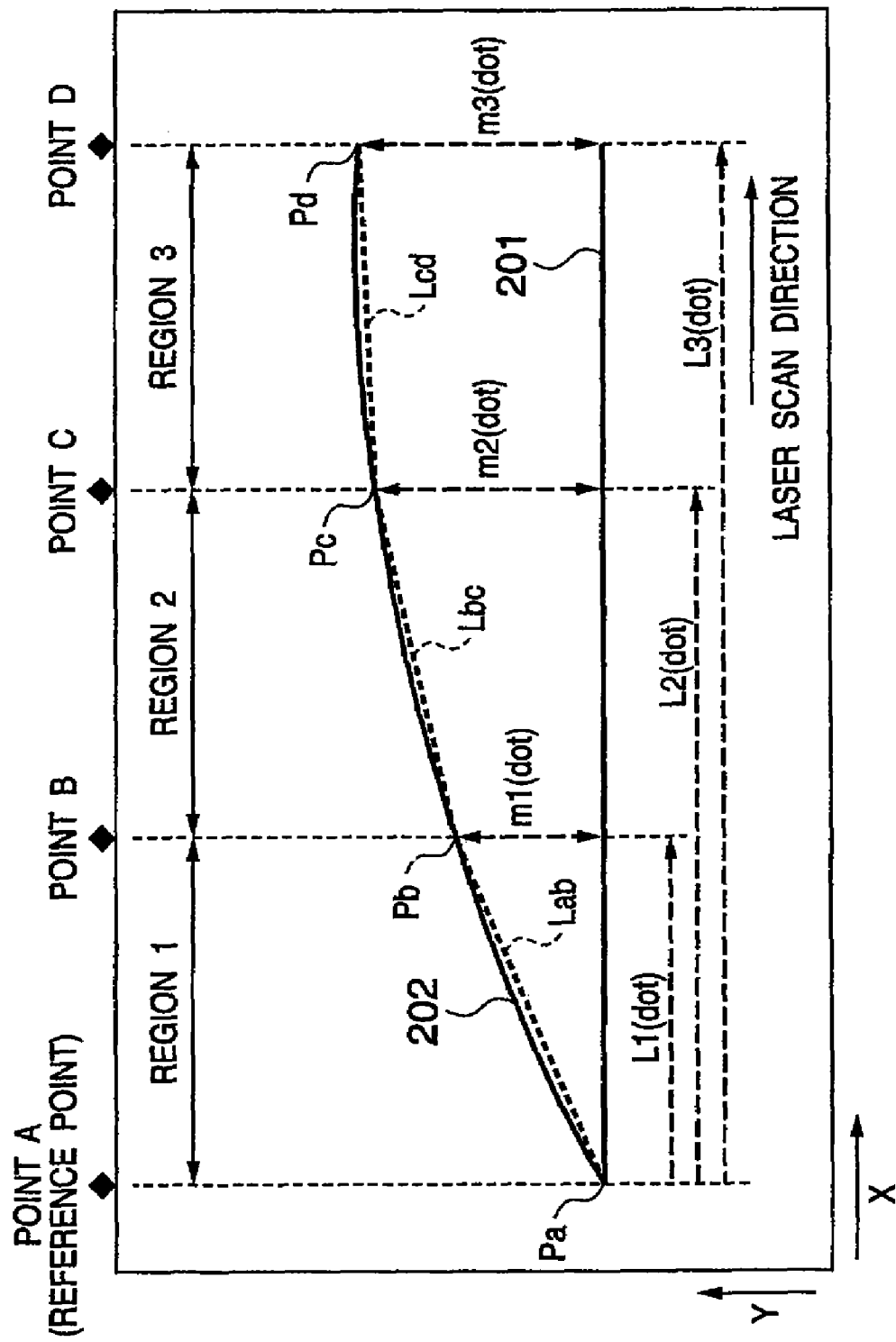
FIG. 3 is a view for explaining a misalignment of a main scan line scanned on a photosensitive drum.

FIG. 3 is a conceptual view for explaining a misalignment of a main scan line scanned on each photosensitive drum 14 as an image carrier.

Reference numeral 201 denotes an image of an ideal main scan line which is scanned in a direction perpendicular to the rotational direction of each photosensitive drum 14 (the longitudinal direction of the drum=the main scan direction). Reference numeral 202 denotes an image of an actual main scan line which has suffered a right upward inclination and curvature resulting from errors of the positional precision and diameter of each photosensitive drum 14, and the positional precision error of the exposure unit 51 of each color. If the printer engine of any color suffers such inclination and curvature of the main scan line, color discrepancy occurs upon simultaneously transferring toner images of a plurality of colors onto a transfer material.

In this embodiment, the discrepancy amounts of the actual main scan line 202 in the sub-scan direction with respect to the ideal main scan line 201 are measured at a plurality of points (points B, C, and D) to have point A as a reference point, which serves as the scan start position of the print region in the main scan direction (X-direction). The main scan line is divided into a plurality of regions (region 1 between Pa and Pb, region 2 between Pb and Pc, and region 3 between Pc and Pd in the example shown in FIG. 3) in correspondence with the points where the discrepancy amounts are measured, and the inclinations of main scan lines of the respective regions are approximated by straight lines (Lab, Lbc, and Lcd) that connect neighboring points. Therefore, when a difference (m1 for region 1, m2−m1 for region 2, or m3−m2 for region 3) between the discrepancy amounts of neighboring points assumes a positive value, it indicates that the main scan line of the region of interest has a right upward inclination; when the difference assumes a negative value, it indicates that the main scan line of that region has a right downward inclination. Note that the unit of m1, m2, m3, L1, L2, and L3 in FIG. 3 is dots.

Figure 4:
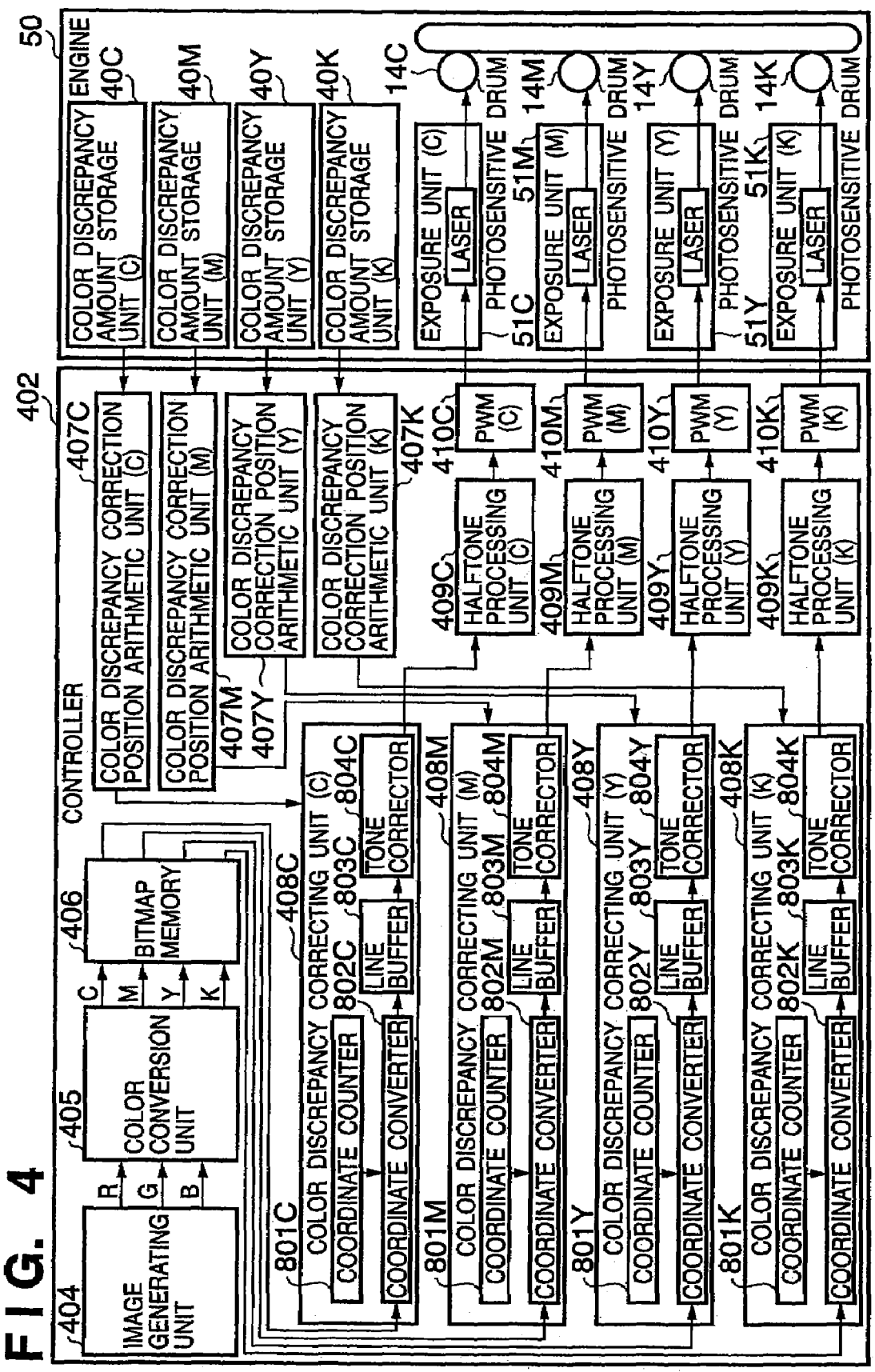
FIG. 4 is a control block diagram associated with color discrepancy correction processing according to the first embodiment of the present invention.

FIG. 4 is a control block diagram associated with color discrepancy correction processing according to this embodiment.

A printer engine 50 executes print processing based on bitmap data to be printed generated by a controller 402.

The printer engine 50 comprises color discrepancy amount storage units 40C, 40M, 40Y, and 40K which respectively store the aforementioned discrepancy amounts of main scan lines for respective regions. In this embodiment, each of the color discrepancy amount storage units 40C, 40M, 40Y, and 40K stores, as information of the color discrepancy amount, the discrepancy amounts between the actual main scan line 202 and ideal main scan line 201 in the sub-scan direction, which are measured at the plurality of points described in FIG. 3. FIG. 5 shows an example of information to be stored in each of the color discrepancy amount storage units 40C, 40M, 40Y, and 40K.

In this embodiment, each of the color discrepancy amount storage units 40C, 40M, 40Y, and 40K stores the discrepancy amounts between the ideal main scan line and actual main scan line. However, the present invention is not limited to this as long as the degree of the inclination or curvature of the actual main scan line is identifiable information. As information to be stored in each of the color discrepancy amount storage units 40C, 40M, 40Y, and 40K, the above discrepancy amounts may be measured in the manufacturing process of the apparatus, and may be pre-stored as information unique to the apparatus. Alternatively, a detection mechanism that detects the discrepancy amounts may be prepared to form a predetermined pattern used to measure discrepancy for an image carrier of each color, and the discrepancy amounts detected by the detection mechanism may be stored.

The controller 402 in FIG. 4 executes print processing by correcting image data to cancel the discrepancy amounts of the main scan lines stored in the color discrepancy amount storage units 40C, 40M, 40Y, and 40K.

More specifically, an image generating unit 404 generates raster image data, which allows print processing, based on print data received from a computer apparatus or the like (not shown), and outputs that data as RGB data for respective dots. A color conversion unit 405 converts the RGB data into data on a CMYK space which can be processed by the printer engine 50, and stores the converted data in a bitmap memory 406 (to be described below) for respective colors. The bitmap memory 406 temporarily stores the raster image data to be printed, and is a page memory that can store image data for one page or a band memory that can store data for a plurality of lines.

Reference numerals 407C, 407M, 407Y, and 407K denote color discrepancy correction position arithmetic units. The color discrepancy correction position arithmetic units calculate positions where coordinate conversion is to be made later as first color discrepancy correction, based on the information of the color discrepancy amounts stored in the color discrepancy amount storage units 40C, 40M, 40Y, and 40K. Also, the color discrepancy correction position arithmetic units calculate positions where the tone correction level is to be switched as second color discrepancy correction. The calculation results are output to corresponding color discrepancy correcting units 408C, 408M, 408Y, and 408K.

An example of the arithmetic contents of respective regions based on FIG. 3 by the color discrepancy correction position arithmetic units 407C, 407M, 407Y, and 407K will be described below.

In this embodiment, the coordinate conversion to be described later is done at the following positions.

Region 1: The coordinate conversion is done every (L1/m1) dots in the main scan direction.

Region 2: The coordinate conversion is done every (L2−L1)/(m2−m1) dots in the main scan direction.

Region 3: The coordinate conversion is done every (L3−L2)/(m3−m2) dots in the main scan direction.

Thus, the color discrepancy correction position arithmetic units 407C, 407M, 407Y, and 407K respectively calculate (L1/m1), (L2−L1)/(m2−m1), and (L3−L2)/(m3−m2). These values respectively correspond to the reciprocal numbers of the inclinations of the actual main scan lines in respective regions.

Also, in this embodiment, the density of the tone correction to be described later is switched to, e.g., three levels as follows.

Region 1: The density of the tone correction is switched every ((L1/m1)/3) dots in the main scan direction.

Region 2: The density of the tone correction is switched every (((L2−L1)/(m2−m1))/3) dots in the main scan direction.

Region 3: The density of the tone correction is switched every (((L3−L2)/(m3−m2))/3) dots in the main scan direction.

Hence, the color discrepancy correction position arithmetic units 407C, 407M, 407Y, and 407K respectively calculate (L1/m1)/3, ((L2−L1)/(m2−m1))/3, and ((L3−L2)/(m3−m2))/3.

In this way, the color discrepancy correction position arithmetic units 407C, 407M, 407Y, and 407K calculate the positions where the coordinate conversion is to be done and those where the density of the tone correction is to be switched in correspondence with the inclinations of the actual main scan lines.

L1, L2, and L3 are distances (unit: dots) from the print start position to the left ends of regions 1, 2, and 3 in the main scan direction. m1, m2, and m3 are discrepancy amounts (unit: dots) between the ideal main scan line 301 and actual scan line 302 at the left ends of regions 1, 2, and 3.

The color discrepancy correcting units 408C, 408M, 408Y, and 408K shown in FIG. 4 correct color discrepancy due to the inclinations and distortions of the main scan lines. More specifically, the color discrepancy correcting units 408C, 408M, 408Y, and 408K adjust the output timings of the bitmap data stored in the bitmap memory 406 and adjust the exposure amounts for respective pixels on the basis of the color discrepancy correction positions calculated by the color discrepancy correction position arithmetic units 407C, 407M, 407Y, and 407K. In this manner, any color discrepancy (registration errors) upon transferring toner images of respective colors onto a transfer material can be prevented.

Each of the color discrepancy correcting units 408C, 408M, 408Y, and 408K has an arrangement shown in FIG. 4 in principle. For example, the color discrepancy correcting unit 408C comprises a coordinate counter 801C, coordinate converter 802C, line buffer 803C, tone corrector 804C. The coordinate counter 801C outputs coordinate data in the main scan direction and sub-scan direction where color discrepancy correction processing is to be executed to the coordinate converter 802C, and also the coordinate data in the main scan direction to the tone corrector 804C. The coordinate converter 802C executes reconstruction processing in the sub-scan direction for respective pixels based on the coordinate data in the main scan direction and sub-scan direction from the coordinate counter 801C and the correction position obtained from the color discrepancy correction position arithmetic unit 407C. The tone corrector 804C performs correction in less than the pixel unit using predetermined exposure ratios of several levels in the sub-scan direction based on the coordinate data in the main scan direction from the coordinate counter 801C and the correction position obtained from the color discrepancy correction position arithmetic unit 407C. Also, the tone corrector 804C uses the line buffer 803C to refer to neighboring dots in the sub-scan direction. The other color discrepancy correcting units 408M, 408Y, and 408K have the same arrangement.

Figure 6A:
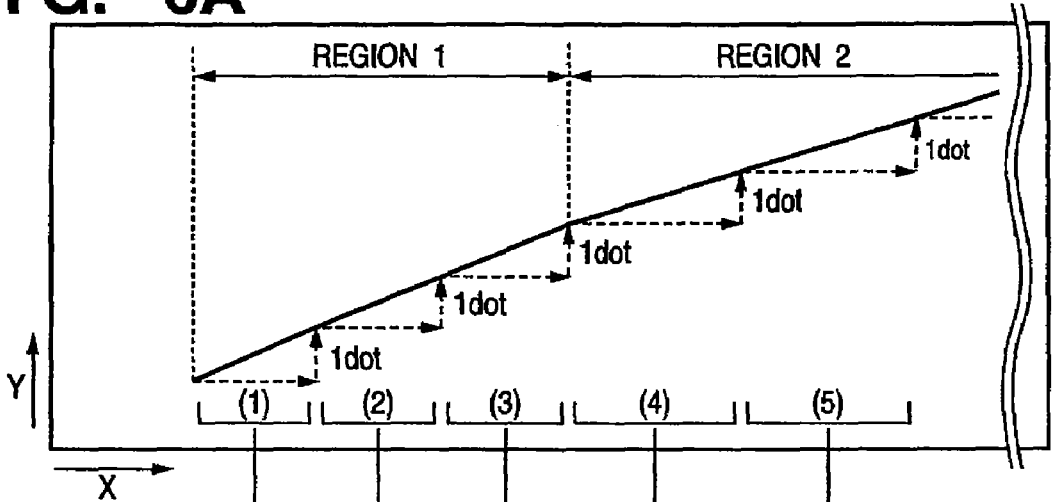
FIGS. 6A to 6C are views for explaining correction of discrepancy amounts in the pixel unit by a coordinate converter in the first embodiment of the present invention.
Figure 6B:
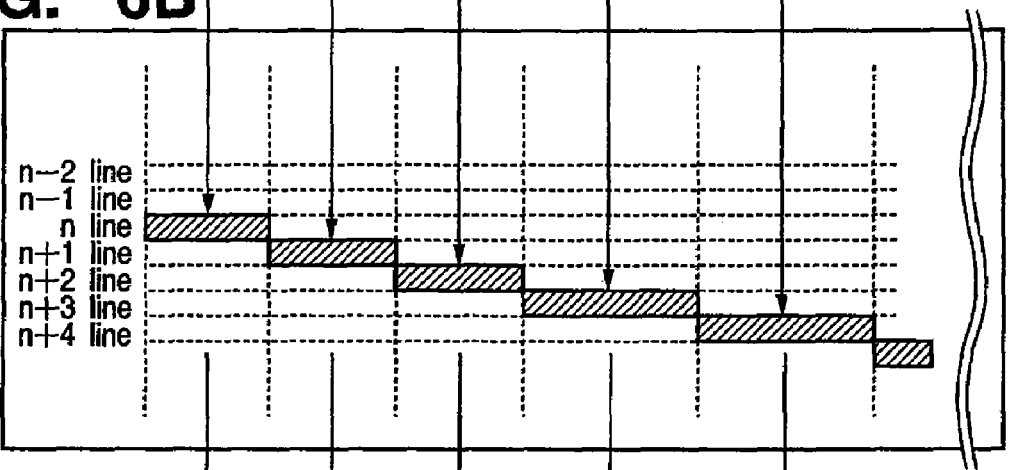
Figure 6C:
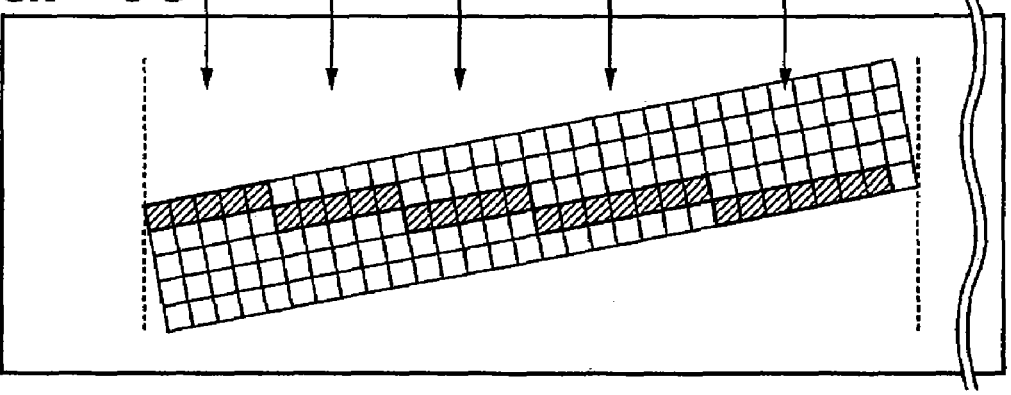

FIGS. 6A to 6C are views for explaining discrepancy amount correction in the pixel unit by the coordinate converter 802.

The coordinate converter 802 offsets coordinates in the sub-scan direction (Y-direction) of the bitmap data to be printed stored in the bitmap memory 406 for respective color discrepancy correction positions calculated based on the color discrepancy information of the main scan lines approximated by straight lines, as shown in FIG. 6A (i.e., in a dot count unit in the main scan direction according to the color discrepancy amounts).

For example, as shown in FIG. 6B, if the coordinate in the sub-scan direction from the coordinate counter 801 is n, letting X be the coordinate in the main scan direction, the color discrepancy correction amount in region (1) is zero. At this time, upon reconstructing data of the n-th line, the data of the n-th line is read out from the bitmap memory. In region (2), the color discrepancy correction amount is 1, and upon reconstructing data of the n-th line, coordinate conversion processing for reading out an image bitmap at a position offset by one sub-scan line count, i.e., data of the (n+1)-th line from the bitmap memory is executed. Likewise, coordinate conversion processing for reading out data of the (n+2)-th line for region (3) and that for reading out data of the (n+3)-th line for region (4) are executed. With the aforementioned method, the reconstruction processing in the sub-scan direction in the pixel unit is executed.

FIG. 6C shows an exposed image formed by exposing image data which has undergone the color discrepancy correction in the pixel unit by the coordinate converter 802 on the photosensitive drum.

FIGS. 7A to 7G are views for explaining color discrepancy correction in less than the pixel unit by the tone corrector 804.

The discrepancy amount less than the pixel unit is corrected adjusting the exposure ratios of neighboring dots in the sub-scan direction.

FIG. 7A shows an image of a main scan line having a right upward inclination. FIG. 7B shows a bitmap image of a horizontal straight line before coordinate conversion. FIG. 7C shows a bitmap image before tone correction. FIG. 7D shows a correction image of FIG. 7B to cancel color discrepancy due to the inclination of the main scan line in FIG. 7A. In order to realize the correction image in FIG. 7D, neighboring dots in the sub-scan direction undergo exposure amount adjustment. FIG. 7E shows the relationship between k which represents a correction amount in the sub-scan direction in the pixel unit, and correction coefficients α and β used to tone correction. α and β are correction coefficients used to perform correction in less than the pixel unit in the sub-scan direction, and indicate distribution ratios of the density (exposure amount) to neighboring dots in the sub-scan direction. For example, if the distribution ratios of three levels are prepared, α and β are:

First Level:
α=0
β=1
Second Level:
α=0.333
β=0.666
Third Level:
α=0.666
β=0.333

(β+α=1). α is the distribution ratio of the previous dot, and β is that of the next dot. The level of the distribution ratio is switched based on the tone correction position information in the main scan direction, which is calculated by the color discrepancy correction position arithmetic unit 407.

FIG. 7F shows a bitmap image which has undergone tone correction to adjust the exposure ratios of neighboring dots in the sub-scan direction in accordance with the correction coefficients shown in FIG. 7E. FIG. 7G shows an exposed image of the bitmap image that has undergone the tone correction on the photosensitive drum. In FIG. 7G, the inclination of the main scan line is canceled, and a nearly horizontal straight line is formed.

Figure 8:
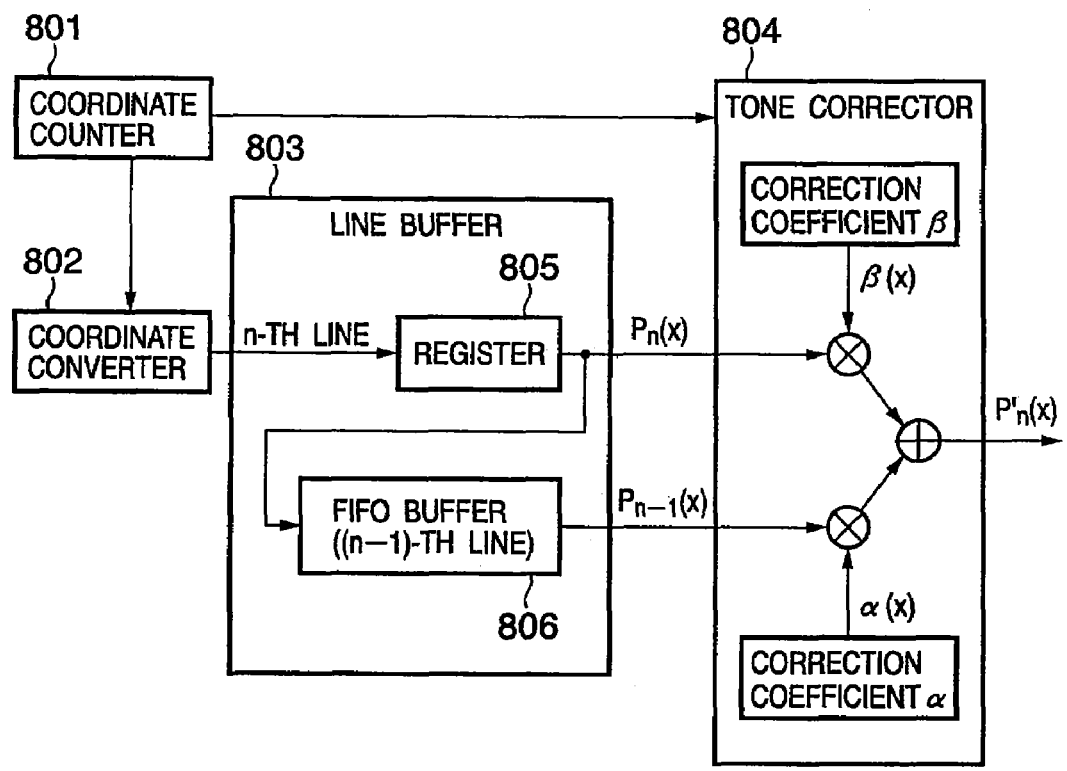
FIG. 8 is a block diagram showing the detailed arrangement of a color discrepancy correcting unit in the first embodiment of the present invention.

FIG. 8 is a block diagram showing the detailed arrangement of the color discrepancy correcting units 408C, 408M, 408Y, and 408K. The method of generating a correction bitmap by the tone correction processing will be described below with reference to FIG. 8.

The coordinate converter 802 transfers image bitmap data which is reconstructed to correct the color discrepancy amounts in the pixel unit by the bitmap memory 406 to the line buffer 803.

The tone corrector 804 uses the line buffer 803 for one line to refer to the previous and next pixel values in the sub-scan direction so as to generate correction data. The line buffer 803 includes a FIFO (first in first out) buffer 806 which stores data for one line of the previous line, and a register 805 which holds pixel data of the coordinate which is to undergo tone correction processing. The pixel data stored in the register 805 is output to the tone corrector 804, and is stored in the FIFO buffer 806 since it is used to generate correction data for the next line. In order to generate correction data, the tone corrector 804 executes arithmetic processing given by:

$$P'_n(x)=P_n(x)*\beta(x)+P_{n-1}(x)*\alpha(x) \quad (1)$$

where x (dots) is the coordinate in the main scan direction, $P_n(x)$ is pixel data input from the register 805, and $P_{n-1}(x)$ is the pixel data input from the FIFO buffer 806.

With the above arithmetic processing, an image bitmap in which the color discrepancy amount in the sub-scan direction less than the pixel unit is corrected is output.

The image data that has undergone the color discrepancy correction by the above processing undergoes halftone processing using a predetermined halftone pattern by each of next halftone processing units 409C, 409M, 409Y, and 409K. The image data undergoes pulse width modulation processing by each of PWM units 410C, 410M, 410Y, and 410K, and is output to the printer engine 50, thus performing exposure processing on the photosensitive drum 14 as an image carrier.

As described above, the correction position required to correct the discrepancy amount in the sub-scan direction at each main scan position is calculated from an image bitmap, and a corrected image bitmap is reconstructed according to the correction position, thus generating an image free from any color discrepancy due to the inclination and distortion of the main scan line.

As for the distribution ratios α and β of the exposure amount of neighboring dots in the sub-scan direction, for example, if two levels of distribution ratios are prepared, α and β are:

First Level:
α=0
β=1
Second Level:
α=0.5
β=0.5

Multiplication by 0.5 is equivalent to right shift. Hence, the arithmetic processing given by equation (1) above by the tone corrector 804 can be implemented by only bit shift. By replacing multipliers by shifters, an image free from any color discrepancy due to the inclination and distortion of the main scan line can be generated by a simpler processing system.

Alternatively, as for the distribution ratios α and β of the exposure amount of neighboring dots in the sub-scan direction, for example, if four levels of distribution ratios are prepared, α and β are:

First Level:
α=0
β=1
Second Level:
α=0.25
β=0.75
Third Level:
α=0.5
β=0.5
Fourth Level:
α=0.75
β=0.25

Multiplication by 0.5 is equivalent to right shift. Also, multiplication by 0.25 is equivalent to right shift by 2 bits. Furthermore, multiplication by 0.75 is the sum of 0.5 and 0.25. Hence, the arithmetic processing given by equation (1) above by the tone corrector 804 can be implemented by only bit shift and addition. By replacing multipliers by shifters and an adder, an image free from any color discrepancy due to the inclination and distortion of the main scan line can be generated by a simpler processing system.

According to the aforementioned first embodiment, each color discrepancy correction position arithmetic unit calculates the color discrepancy correction position based on the color discrepancy amount due to the inclination and distortion (e.g., curvature or the like) of the scan line that scans the photosensitive drum as an image carrier, which is held in the color discrepancy amount storage unit. Each color discrepancy correcting unit reconstructs an image bitmap by performing color discrepancy correction in the pixel unit and that of several levels (e.g., 3 levels) less than the pixel unit using the correction coefficients α and β of fixed values. In this manner, color discrepancy due to the inclination, curvature, and the like of the main scan line that exposes the photosensitive drum can be prevented by processing simpler than the arrangement that makes optical correction, thus obtaining a high-quality color image.

Furthermore, by applying color discrepancy correction in less than the pixel unit in two or four levels, the processing system can be more simplified.

Second Embodiment

In the second embodiment, when the density of the tone correction is switched at, e.g., three pixels in four levels, it is done at (a) a position where coordinate conversion is performed, (b) a position one pixel before the position where coordinate conversion is performed, and (c) a position two pixels before the position where coordinate conversion is performed.

Hence, the color discrepancy correction position arithmetic units 407C, 407M, 407Y, and 407K respectively calculate the position one pixel before the position where coordinate conversion is performed, and the position two pixels before the position where coordinate conversion is performed.

FIGS. 9A to 9G are views for explaining color discrepancy correction in less than the pixel unit by the tone corrector 804. The discrepancy amount correction in less than the pixel unit is implemented by adjusting the exposure ratios of neighboring dots in the sub-scan direction.

Figure 9:
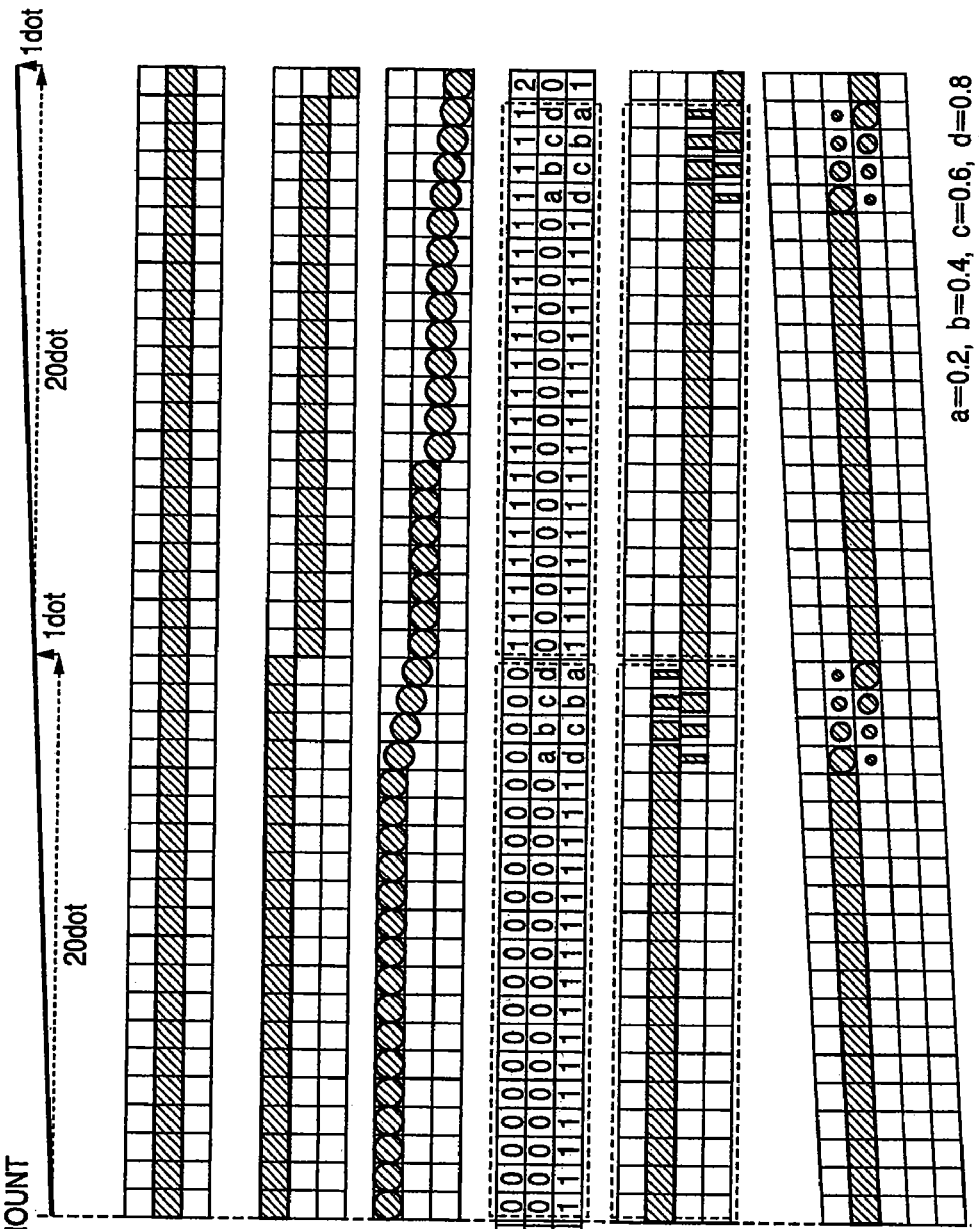
FIGS. 9A to 9G are views for explaining discrepancy correction in less than the pixel unit by a tone corrector in the second embodiment of the present invention.

FIG. 9A shows an image of a main scan line having a right upward inclination. FIG. 9B shows a bitmap image of a horizontal straight line before coordinate conversion. FIG. 9C shows a bitmap image before tone correction. FIG. 9D shows a correction image of FIG. 9B to cancel color discrepancy due to the inclination of the main scan line in FIG. 9A. In order to realize the correction image in FIG. 9D, neighboring dots in the sub-scan direction undergo exposure amount adjustment. FIG. 9E shows the relationship between k which represents a correction amount in the sub-scan direction in the pixel unit, and correction coefficients α and β used to tone correction. α and β are correction coefficients used to perform correction in less than the pixel unit in the sub-scan direction, and indicate distribution ratios of the density (exposure amount) to neighboring dots in the sub-scan direction. For example, in order to perform tone correction at four pixels, distribution ratios of five levels must be prepared, and more specifically, α and β are:

First Level:
α=0
β=1
Second Level:
α=0.2
β=0.8
Third Level:
α=0.4
β=0.6
Fourth Level:
α=0.6
β=0.4
Fifth level
α=0.8
β=0.2

(β+α=1). α is the distribution ratio of the previous dot, and β is that of the next dot. The level of the distribution ratio is switched at four pixels near the pixel where the coordinate conversion is done, based on the tone correction position information in the main scan direction, which is calculated by the color discrepancy correction position arithmetic unit 407.

FIG. 9F shows a bitmap image which has undergone tone correction to adjust the exposure ratios of neighboring dots in the sub-scan direction in accordance with the correction coefficients shown in FIG. 9E. FIG. 9G shows an exposed image of the bitmap image that has undergone the tone correction on the photosensitive drum. In FIG. 9G, the inclination of the main scan line is canceled, and a nearly horizontal straight line is formed.

As described above, the correction position required to correct the discrepancy amount in the sub-scan direction at each main scan position is calculated from an image bitmap, and a corrected image bitmap is reconstructed according to the correction position, thus generating an image free from any color discrepancy due to the inclination and distortion of the main scan line.

For example, if distribution ratios of four levels are prepared to execute tone correction at three pixels, α and β are:

First Level:
α=0
β=1
Second Level:
α=0.25
β=0.75
Third Level:
α=0.5
β=0.5
Fourth Level:
α=0.75
β=0.25

Multiplication by 0.5 is equivalent to right shift. Also, multiplication by 0.25 is equivalent to right shift by 2 bits. Furthermore, multiplication by 0.75 is the sum of 0.5 and 0.25. Hence, the arithmetic processing given by equation (1) above by the tone corrector 804 can be implemented by only bit shift and addition. By replacing multipliers by shifters and an adder, an image free from any color discrepancy due to the inclination and distortion of the main scan line can be generated by a simpler processing system.

Ad described above, according to the second embodiment, the same effects as in the first embodiment can be obtained. That is, color discrepancy due to the inclination, curvature, and the like of the main scan line that exposes the photosensitive drum can be prevented by processing simpler than the arrangement that makes optical correction, thus obtaining a high-quality color image.

Third Embodiment

According to parent reference 2 (Japanese Patent Application Laid-Open No. 8-85237) described above, the output coordinate position of image data for each color is corrected for an image that has undergone halftone processing. For this reason, if dithering is applied, reproducibility of halftone dots of a halftone image deteriorates. As a result, color inconsistency may occur and moiré may become obvious. Furthermore, when such non-uniform density values are periodically repeated, moiré becomes obvious, and a high-quality color image cannot be obtained. The third embodiment solves such drawbacks.

A color image forming apparatus according to the embodiment of the present invention is also a four-drum color laser beam printer, and FIG. 2 will be quoted.

Figure 10:
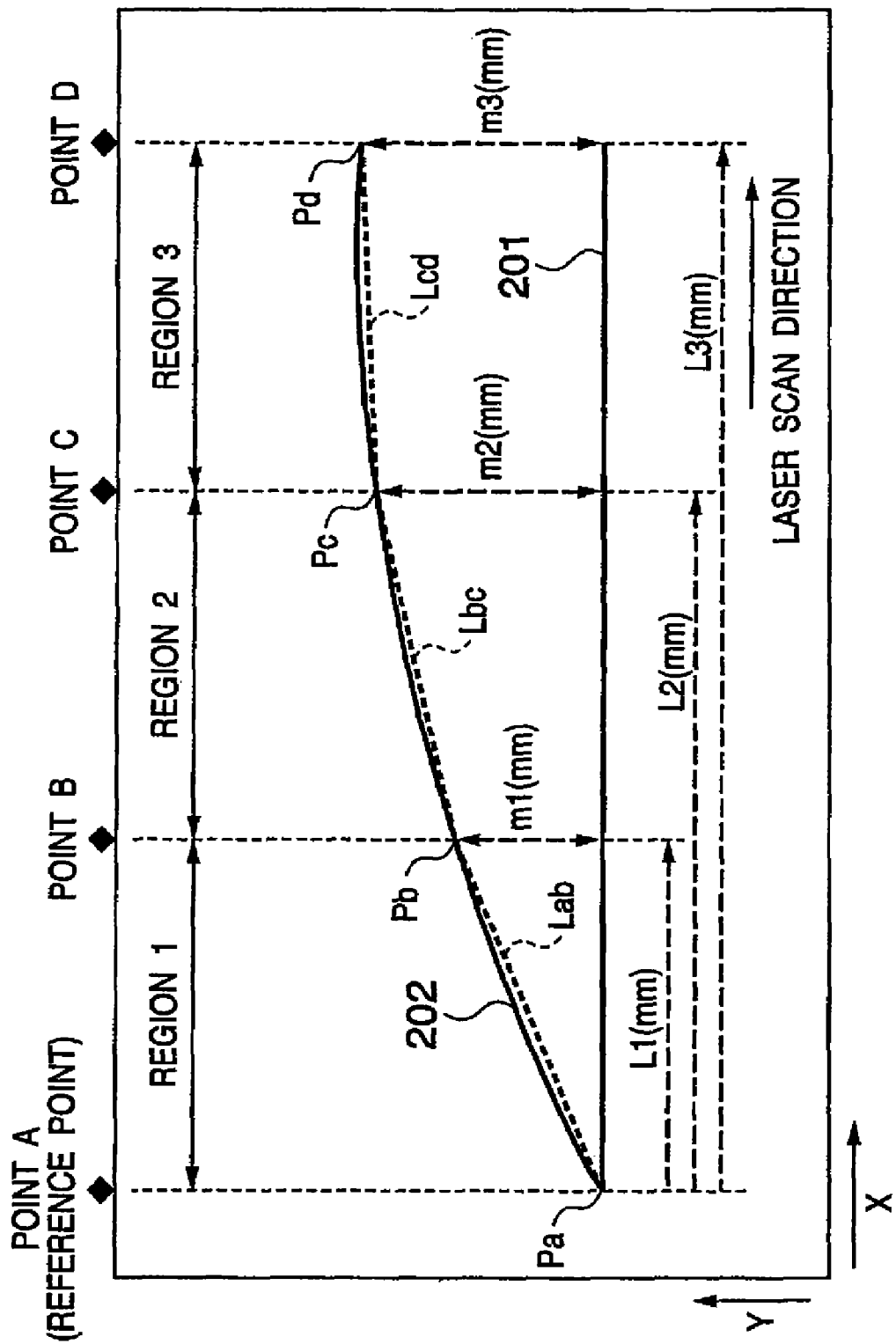
FIG. 10 is a view for explaining a misalignment of a main scan line scanned on each photosensitive drum of a color image forming apparatus according to the third embodiment of the present invention.

FIG. 10 is a conceptual view for explaining a misalignment of a main scan line scanned on each photosensitive drum 14 as an image carrier (for example, the photosensitive drum 14-C for cyan). Since the same applies to photosensitive drums corresponding to other colors, a description thereof will be omitted.

Reference numeral 201 denotes an image of an ideal main scan line which is scanned in a direction perpendicular to the rotational direction of each photosensitive drum 14-C (the longitudinal direction of the drum). Reference numeral 202 denotes an image of a main scan line which has suffered a right upward inclination and curvature by an actual laser scan, which occur due to errors of the positional precision and diameter of each photosensitive drum 14-C, and the positional precision error of an optical system of the cyan exposure unit 51-C. If the image station of any color suffers such inclination and curvature of the main scan line, color discrepancy occurs upon simultaneously transferring toner images of a plurality of colors onto a transfer material.

In this embodiment, the discrepancy amount in the sub-scan direction between the ideal main scan line 201 and actual main scan line 202 is measured at a plurality of points (points B, C, and D) to have point A as a reference point, which serves as the scan start position of the print region in the main scan direction (x-direction: the longitudinal direction of the drum). The measured discrepancy amount is divided into a plurality of regions (region 1 between Pa and Pb, region 2 between Pb and Pc, and region 3 between Pc and Pd) in correspondence with the measurement points, and the inclinations of main scan lines of the respective regions are approximated by straight lines (Lab, Lbc, and Lcd) that connect neighboring points. Therefore, when a difference (m1 for region 1, (m2−m1) for region 2, or (m3−m2) for region 3) between the discrepancy amounts of neighboring points Pa, Pb, Pc, and Pd assumes a positive value, the main scan line of the region of interest has a right upward inclination; when the difference assumes a negative value, the main scan line of that region has a right downward inclination. FIG. 10 is a view similar to FIG. 3. Note that the unit of m1, m2, m3, L1, L2, and L3 in FIG. 10 is mm.

Figure 11:
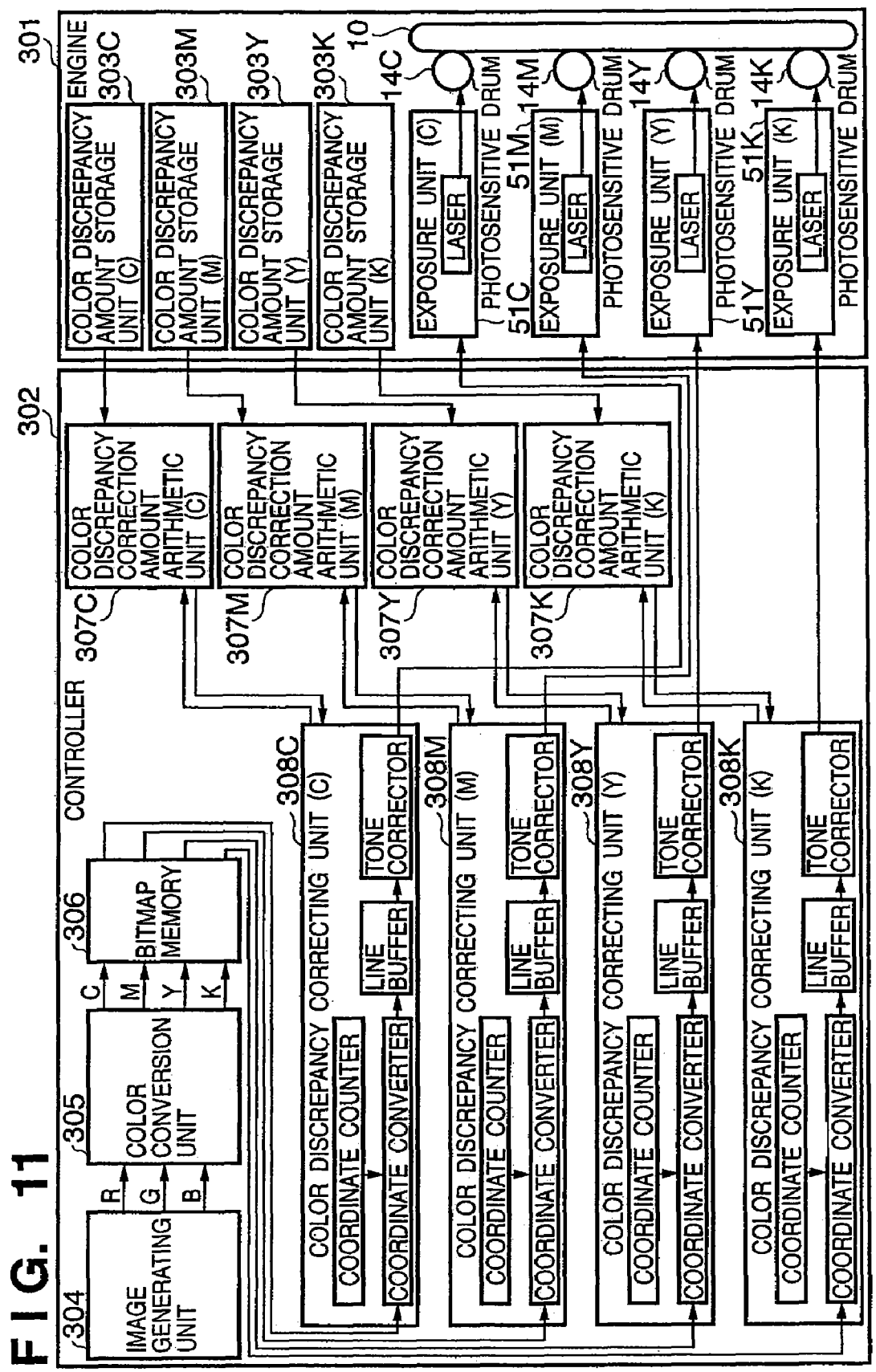
FIG. 11 is a control block diagram associated with color discrepancy correction processing according to the third embodiment of the present invention.

FIG. 11 is a block diagram for explaining color discrepancy correction processing for correcting color discrepancy that occurs due to the inclination and curvature of the main scan line in this embodiment.

Reference numeral 301 denotes a printer engine which has image forming units shown in FIG. 2, and executes print processing based on bitmap image data generated by a controller 302. Reference numerals 303C, 303Y, 303M, and 303K denote color discrepancy amount storage units which respectively store color discrepancy amounts for respective colors, i.e., cyan, yellow, magenta, and black. These units store discrepancy amounts of the main scan lines for the respective regions described above in correspondence with colors. In practice, a misalignment amount of an image to be formed is stored. However, this amount causes color discrepancy, and it will be referred to as a "color discrepancy amount" hereinafter. In this embodiment, discrepancy amounts in the sub-scan direction with respect to the ideal main scan line 201 based on the positions of the actual main scan line 202 measured at the plurality of points, as described above using FIG. 10, are stored as information indicating the inclination and curvature of the main scan line 202 in the color discrepancy amount storage unit 303.

FIG. 12 shows an example of data to be stored in this color discrepancy amount storage unit 303 (303C, 303Y, 303M, and 303K).

In FIG. 12, the lengths (L1, L2, and L3) in the main scan direction from the reference point to the actual measurement points on the main scan line 202, and discrepancy amounts (m1, m2, and m3) between the points (Pb, Pc, and Pd) on the main scan line 202 and the ideal main scan line 201 are stored in association with each other. Note that the unit of L1, L2, L3, m1, m2, and m3 is mm. L1, L2, and L3 respectively represent lengths from the reference point (point A) to the terminal ends of regions 1, 2, and 3. Also, m1, m2, and m3 are discrepancy amounts between the ideal main scan line 201 and actual main scan line 202 at the terminal ends of regions 1, 2, and 3 (see FIG. 10).

In this embodiment, each of the color discrepancy amount storage units 303C, 303M, 303Y, and 303K stores the discrepancy amounts between the ideal main scan line 201 and actual main scan line 202 on the photosensitive drum. However, the present invention is not limited to this as long as the characteristics of the inclination and curvature of the actual main scan line 202 are identifiable information. As information to be stored in each of the color discrepancy amount storage unit 303, the above discrepancy amounts may be measured in the manufacturing process of the apparatus, and may be pre-stored as information unique to the apparatus. Alternatively, a detection mechanism that detects the discrepancy amounts may be prepared to form a predetermined pattern used to measure discrepancy for an image carrier (photosensitive drum) of each color, and the discrepancy amounts detected by the detection mechanism may be stored.

An operation for executing print processing by correcting image data to cancel the discrepancy amounts of the main scan lines stored in the color discrepancy amount storage unit 303 in the controller 302 will be described below.

More specifically, an image generating unit 304 generates raster image data, which allows print processing, based on print data received from an external apparatus (not shown) such as a computer apparatus or the like, and outputs that data as RGB data for respective dots. A color conversion unit 305 converts the RGB data into data on a CMYK space which can be processed by the printer engine 301, and stores the converted data in a bitmap memory 306 (to be described below) for respective colors. The bitmap memory 306 temporarily stores the raster image data to be printed, and comprises either a page memory that can store image data for one page or a band memory that can store data for a plurality of lines.

Reference numerals 307C, 307Y, 307M, and 307K denote color discrepancy amount arithmetic units which calculate correction amounts of color discrepancy corresponding to respective color data. These arithmetic units calculate color discrepancy correction amounts in the sub-scan direction corresponding to coordinate information in the main scan direction designated by color discrepancy correcting units 308 (to be described later) for respective dots on the basis of information indicating the discrepancy amounts of the main scan lines stored in the color discrepancy amount storage units 303 corresponding to respective colors. The calculation results are output to the corresponding color discrepancy correcting units 308.

Let x (dots) be a coordinate of a given dot in the main scan direction, y (lines) be a coordinate of that dot in the sub-scan direction, and $\Delta y_i$ (dots) (i indicates a region) be the color discrepancy correction amount in the sub-scan direction. In this case, arithmetic expressions of the color discrepancy correction amounts Δyi in the sub-scan direction in respective regions based on FIG. 10 are as follows (note that the resolution in this case is 600 dpi).

$$\text{Region 1: } \Delta y1 = x \times (m1/L1) \quad (2)$$

$$\text{Region 2: } \Delta y2 = m1 \times 23.622 + (x - L1 \times 23.622) \times ((m2 - m1)/(L2 - L1)) \quad (3)$$

$$\text{Region 3: } \Delta y3 = m2 \times 23.622 + (x - L2 \times 23.622) \times ((m3 - m2)/(L3 - L2)) \quad (4)$$

The color discrepancy correcting units 308C, 308Y, 308M, and 308K respectively correct color discrepancy due to the inclinations and curvatures of the main scan lines. More specifically, these correcting units adjust the output timings of bitmap data stored in the bitmap memory 306 and adjust the exposure amounts for respective dots based on the color discrepancy correction amounts calculated for respective dots by the color discrepancy correction amount arithmetic units 307C, 307Y, 307M, and 307K. In this manner, any color discrepancy (registration errors) upon transferring toner images of respective colors onto a transfer sheet can be prevented.

Each color discrepancy correcting unit 308 according to this embodiment will be described below with reference to the block diagram shown in FIG. 13.

Figure 13:
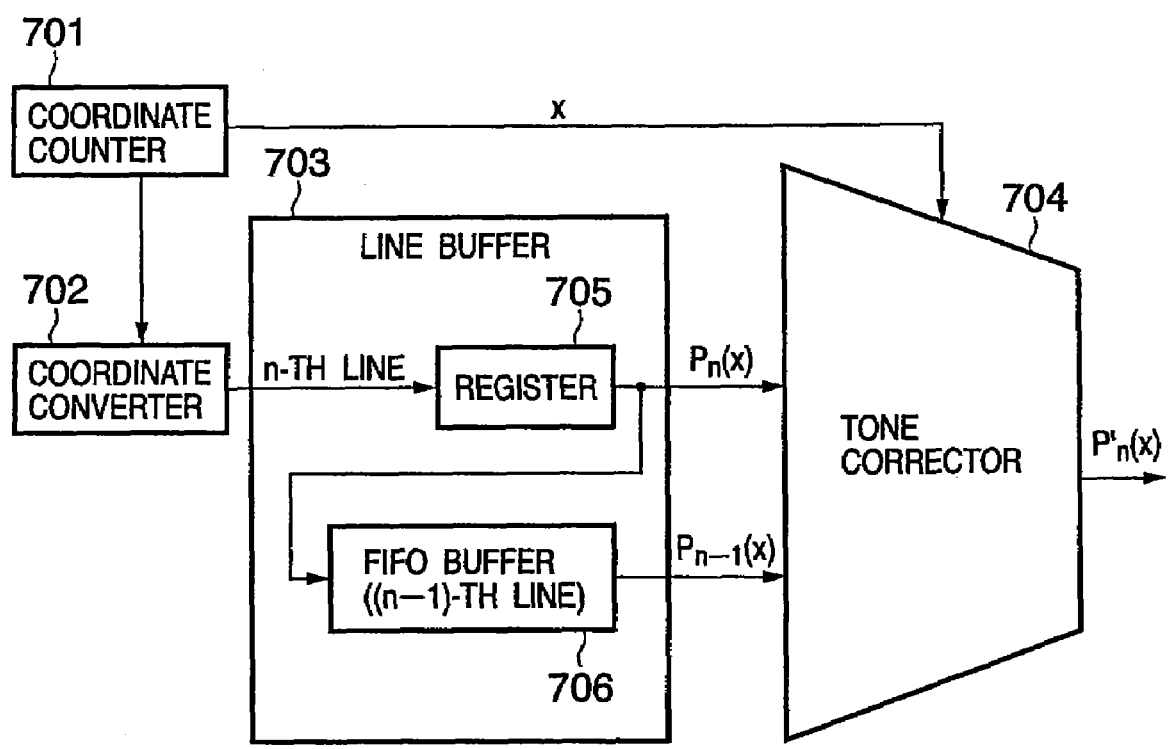
FIG. 13 is a block diagram showing the arrangement of a color discrepancy correcting unit according to the third embodiment of the present invention.

FIG. 13 is a block diagram showing the arrangement of the color discrepancy correcting unit 308C according to this embodiment. Since other color discrepancy correcting units 308Y, 308M, and 308K have the same arrangement, a description of the correcting units 308Y, 308M, and 308K corresponding to other colors will be omitted.

The color discrepancy correcting unit 308C comprises a coordinate counter 701, coordinate converter 702, line buffer 703, and tone corrector 704. The coordinate counter 701 outputs coordinate data (x, y) in the main scan direction and sub-scan direction of a dot, that is to undergo color discrepancy correction processing, to the coordinate converter 702. At the same time, the coordinate counter 701 outputs coordinate data x in the main scan direction to the color discrepancy correction amount arithmetic unit 307C and tone corrector 704. The coordinate converter 702 executes correction processing of the integer part of a correction amount Δy based on the coordinate data (x, y) in the main scan direction and sub-scan direction from the coordinate counter 701 and the correction amount Δy obtained from the color discrepancy correction amount arithmetic unit 307C. That is, the coordinate converter 702 executes reconstruction processing in the sub-scan direction for respective dots.

The tone corrector 704 performs correction processing of the decimal part of the correction amount Δy based on the coordinate data x in the main scan direction from the coordinate counter 701 and the correction amount Δy obtained from the color discrepancy correction amount arithmetic unit 307C. That is, as for a correction amount less than a dot unit, the tone corrector 704 performs correction by adjusting the ON/OFF ratios of corresponding dots on neighboring lines in the sub-scan direction with respect to data on the current line. Also, the tone corrector 704 uses the line buffer 703 to refer to neighboring dots in the sub-scan direction.

Figure 14:
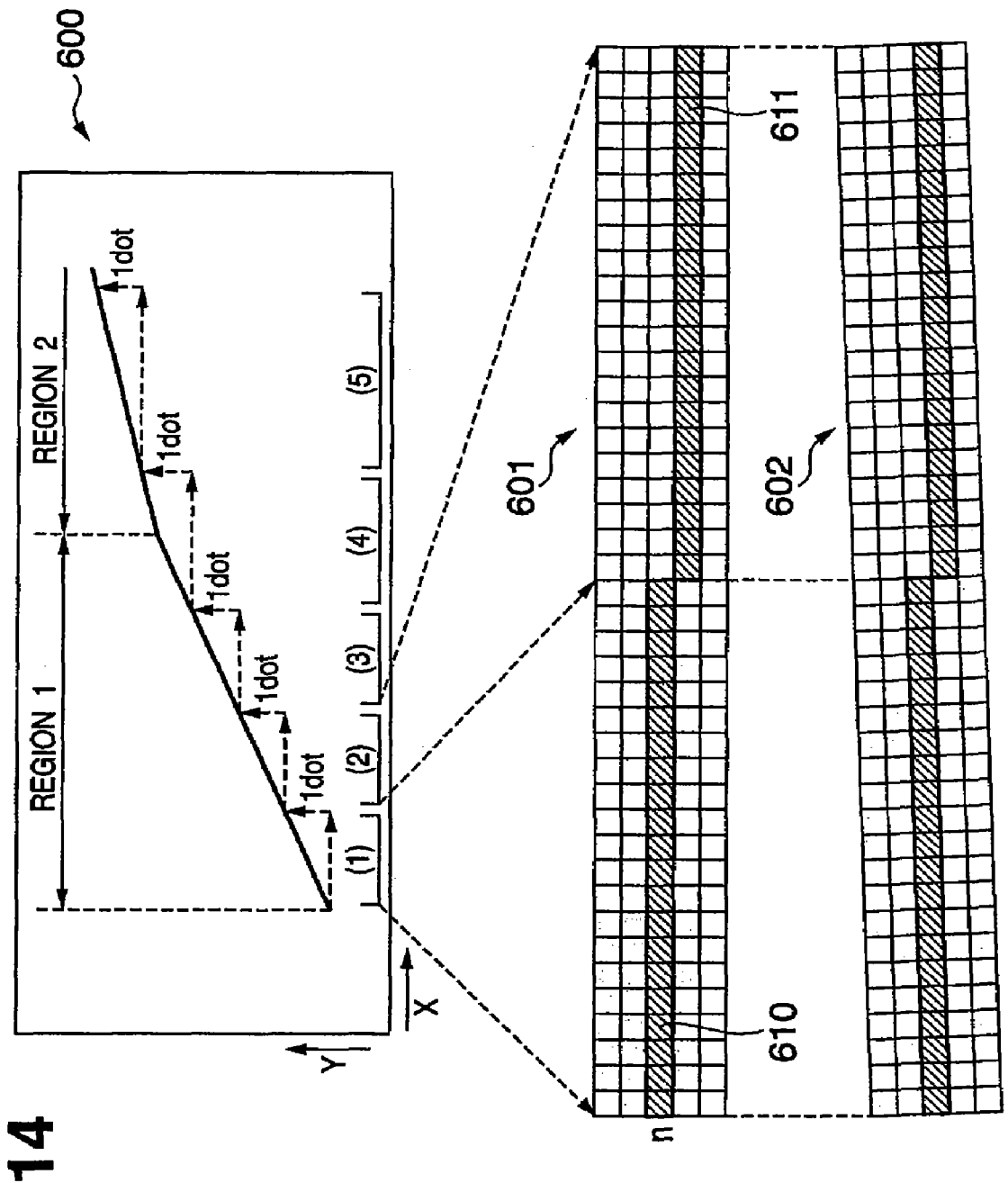
FIG. 14 is a conceptual view for explaining the operation contents when a coordinate converter according to the third embodiment of the present invention corrects a discrepancy amount of the integer part of a color discrepancy correction amount $\Delta y$, i.e., color discrepancy for each line.

FIG. 14 is a conceptual view for explaining the operation contents when the coordinate converter 702 according to this embodiment corrects the discrepancy amount of the integer part of the color discrepancy correction amount Δy, i.e., color discrepancy for each line.

The coordinate converter 702 offsets a coordinate of image data (cyan in this case) in the sub-scan direction (Y-direction), which is stored in the bitmap memory 306, in accordance with the value of the integer part of the color discrepancy correction amount Δy calculated based on the color discrepancy information of the main scan lines approximated by straight lines, as indicated by reference numeral 600. For example, let n (lines) be a coordinate of the position of dot data 610, as indicated by reference numeral 601. This value is obtained from the coordinate counter 701. Also, let x be a coordinate of that dot data in the main scan direction. Then, the color discrepancy correction amount Δy1 in region (1) satisfies 0≦Δy1<1. Hence, upon reconstructing the data 610 whose coordinate in the sub-scan direction in region (1) is n, data of the n-th line is read out from the bitmap memory 306.

In region (2), the color discrepancy correction amount Δy2 satisfies 1≦Δy2<2. Therefore, upon reconstructing data, coordinate conversion processing for reading out an image bitmap at a position offset by 1 as the number of sub-scan lines, i.e., data of the (n+1)-th line from the bitmap memory 306 is executed. Likewise, coordinate conversion processing for reading out data of the (n+2)-th line for region (3) and that for reading out data of the (n+3)-th line for region (4) are executed.

With the aforementioned method, the reconstruction processing in the sub-scan direction in a dot unit is executed.

Reference numeral 602 denotes an exposed image obtained by exposing image data which has undergone color discrepancy correction in a dot unit by the coordinate converter 702 on the photosensitive drum 14C.

Figure 15:
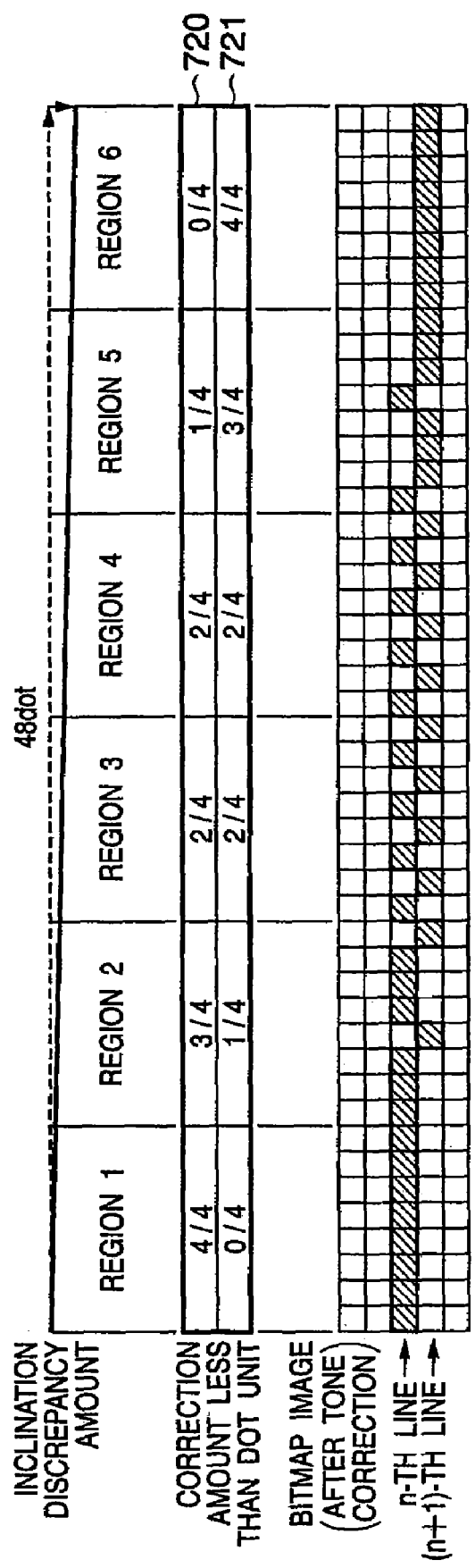
FIG. 15 is a conceptual view for explaining the operation contents when a tone corrector according to the third embodiment of the present invention performs color discrepancy correction in less than a dot unit, i.e., it corrects a discrepancy amount of the decimal part of the color discrepancy correction amount $\Delta y$.

FIG. 15 is a conceptual view for explaining the operation contents of color discrepancy correction in less than a dot unit executed by the tone corrector 704 according to this embodiment, i.e., those for correcting the discrepancy amount of the decimal part of the color discrepancy correction amount Δy.

Referring to FIG. 15, reference numeral 720 denotes a dot distribution (correction amount) on the current line (n-th line); and 721, a dot distribution (correction amount) on the next line ((n+1)-th line). In this way, in this embodiment, the discrepancy amount of a fraction below the decimal point is corrected by adjusting the ON/OFF ratios of dots on lines located before or after the current line in the sub-scan direction. In FIG. 15, the inclination discrepancy amount is 1 dot/48 dots. In this embodiment, color discrepancy correction in less than a dot unit is done by dividing this 48-dot section into six regions (regions (1) to (6), and each region is delimited by 8 dots. At this time, all 8 dots are ON on only the n-th line in region (1). In region (2), 6 dots are ON on the n-th line and 2 dots are ON on the (n+1)-th line. In regions (3) and (4), 4 dots are ON on each of the n-th and (n+1)-th lines. Furthermore, in region (5), 2 dots are ON on the n-th line and the remaining 6 dots are ON on the (n+1)-th line. In region (6), all 8 dots are ON on the (n+1)-th line. In this way, color discrepancy correction in less than a dot unit is done.

In this embodiment, the number of divided correction regions is six. However, the present invention is not limited to such specific value. For example, even when the inclination or discrepancy amount is an indivisible value, tone correction can be made by assigning remaining dots to an arbitrary region.

This operation will be described below with reference to the block diagram of the color discrepancy correcting unit shown in FIG. 13.

The coordinate converter 702 transfers bitmap data which is reconstructed to correct color discrepancy amounts for respective dots from the bitmap memory 306 to the line buffer 703. The tone corrector 704 uses the line buffer 703 for one line so as to refer to dot values before and after the current line (n-th line) in the sub-scan direction. The line buffer 703 includes a FIFO (first in first out) buffer 706 which stores data for one line of the previous line, and a register 705 which holds dot data of the coordinate which is to undergo tone correction processing. The dot data stored in the register 705 is output to the tone corrector 704, and is stored in the FIFO buffer 706 since it is used to generate correction data for the next line. The tone corrector 704 determines the current region based on the coordinate x (dots) in the main scan direction, and determines tone to be output. For example, in case of a coordinate in region (4) in FIG. 15, the tone corrector 704 expresses tone by alternately outputting dot data Pn(x) of the n-th line and dot data Pn−1(x) of the previous line.

In the above description, correction processing implemented by hardware has been explained. When the controller 302 comprises a CPU, processing can also be implemented by software.

Figure 16:
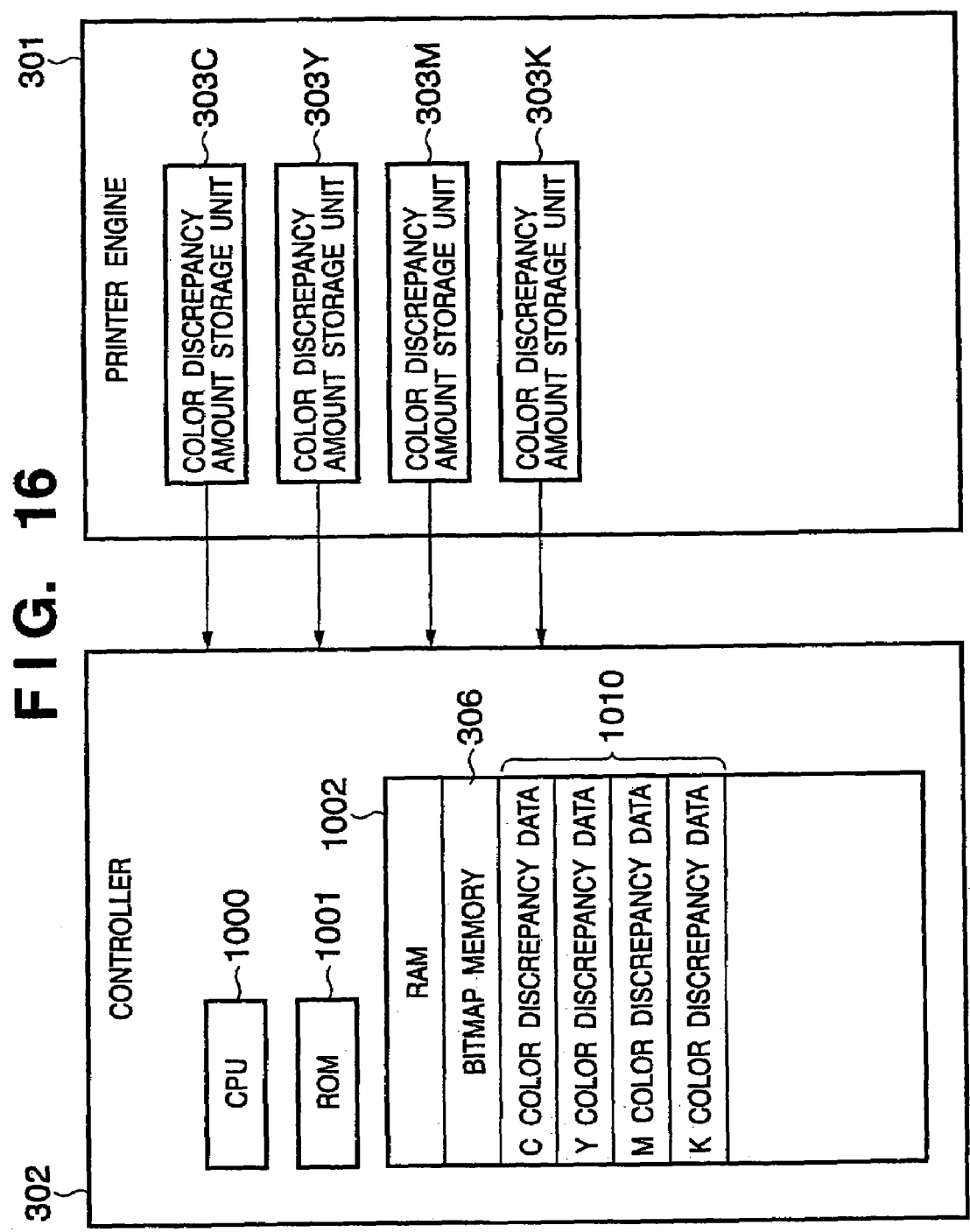
FIG. 16 is a block diagram showing an example of a controller shown in FIG. 11 which is configured by a CPU and memories.

FIG. 16 is a block diagram showing an example of the controller 302 shown in FIG. 11, which is configured by a CPU and memories. The same reference numerals in FIG. 16 denote components common to those in FIG. 11 above, and a description thereof will be omitted.

The printer engine 301 has the same arrangement as in FIG. 11, and the exposure units 51, photosensitive drums 14, and the like are not illustrated. The color discrepancy amount storage units 303C to 303K respectively store the color discrepancy amounts on the photosensitive drums 14C to 14K corresponding to respective colors, as described above. The controller 302 comprises a CPU 1000, a ROM 1001 which stores programs to be executed by the CPU 1000 and various data, and a RAM 1002 which is used as a work area in control processing by the CPU 1000, and temporarily saves various data. This RAM 1002 has the bitmap memory 306 which stores cyan, yellow, magenta, and black bitmap image data. On the RAM 1002, areas 1010 for storing color discrepancy data which are acquired from the color discrepancy amount storage units 303C to 303K and correspond to respective colors are also assured.

Figure 17:
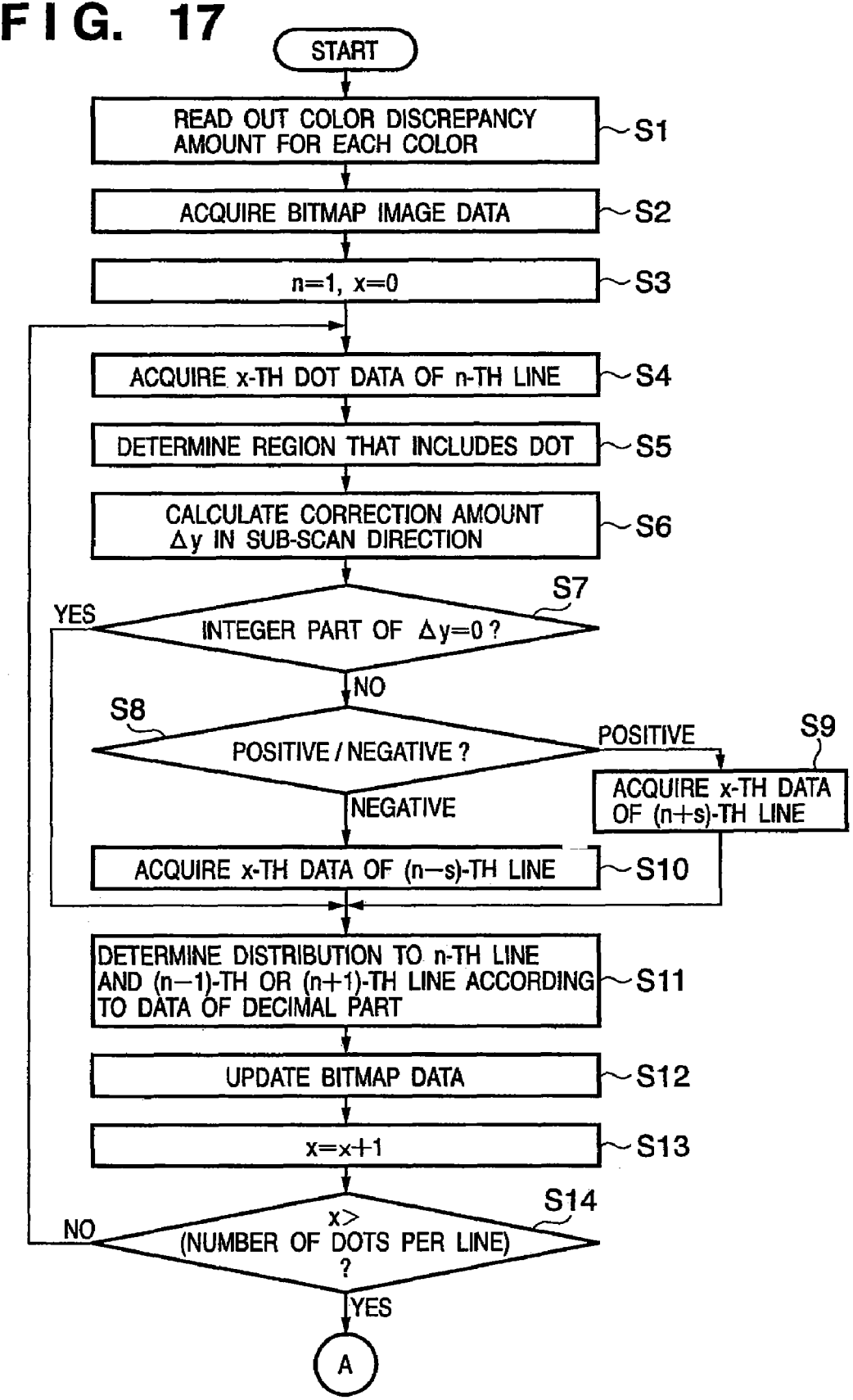
FIGS. 17 and 18 are flowcharts for explaining image forming processing to be executed by the CPU of the controller according to the third embodiment of the present invention.
Figure 18:
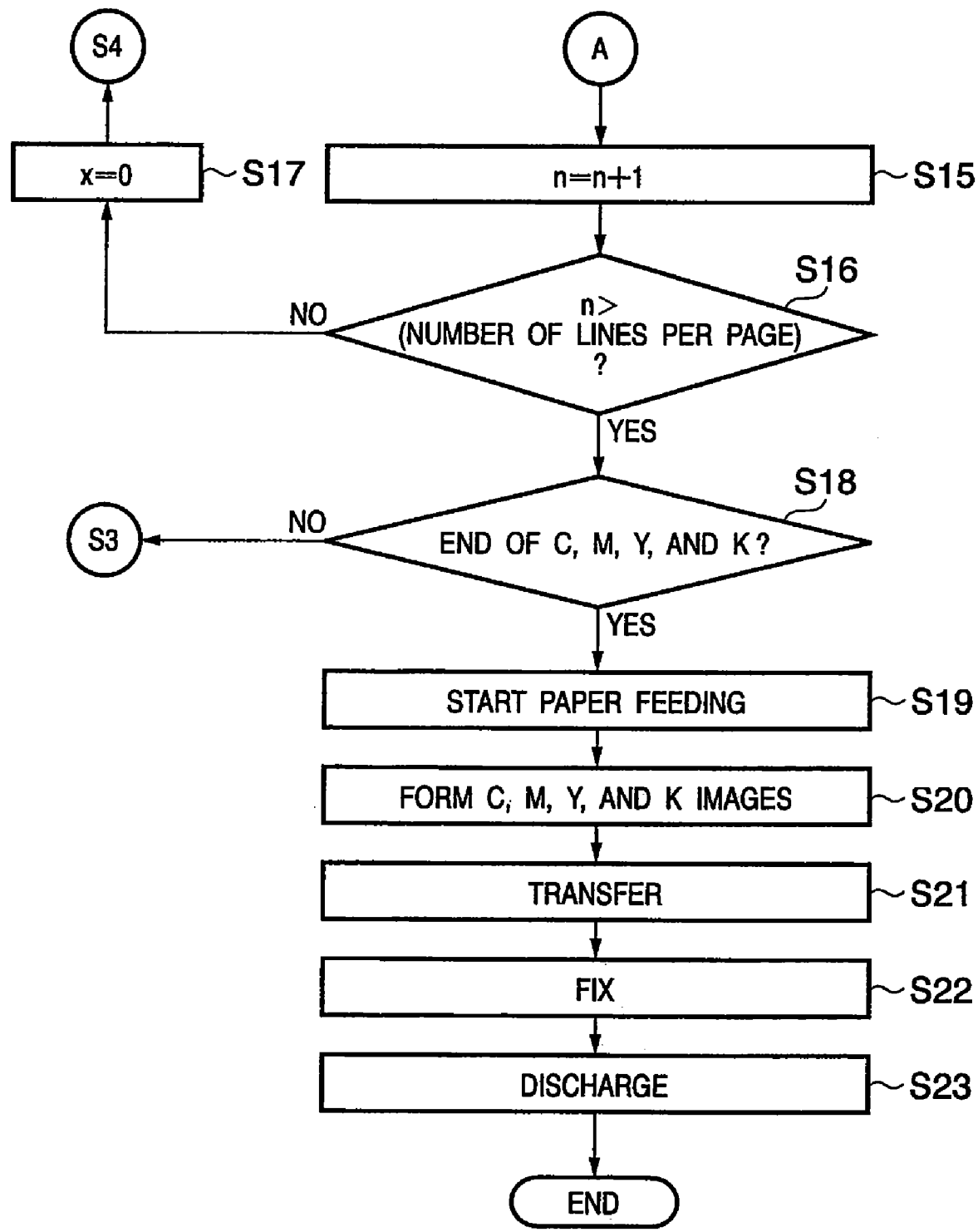

FIGS. 17 and 18 are flowcharts for explaining image forming processing to be executed by the CPU 1000 of the controller 302 according to this embodiment. A program that implements this processing is stored in the ROM 1001, and is executed under the control of the CPU 1000.

In step S1, the color discrepancy amounts for respective colors stored in the color discrepancy amount storage units 303C to 303K of the printer engine 301 are read out, and are stored in the areas 1010 on the RAM 1002. In step S2, print data is input and undergoes processing such as color conversion and the like. After that, the print data is converted into cyan, yellow, magenta, and black bitmap image data each for one page, and the converted data are stored in the bitmap memory 306. In step S3, a variable n used to count the number of lines is reset to "1", and a variable x used to count the dot position (x coordinate) is reset to "0". Note that both these variables are stored in the RAM 1002.

In step S4, the x-th dot data of the n-th line is read out from the cyan bitmap data. In step S5, a region which includes that dot (for example, one of regions 1 to 3 in FIG. 10) is determined. In step S6, a correction amount Δy in the sub-scan direction, which forms that dot is calculated based on the region determined in step S5 and the dot position (x). This value can be calculated using one of equations (2) to (4) above. It is checked in step S7 if the integer part of the correction amount Δy calculated in step S6 is "0". If the integer part is "0", since correction in a line unit is not required, the flow jumps to step S11; otherwise, the flow advances to step S8 to check if the integer part is positive or negative. If the integer part is positive, the flow advances to step S9 to acquire the x-th dot data of the (n+s)-th line and specify it as the dot data of the current line (see FIG. 14). On the other hand, if it is determined in step S8 that the integer part is negative, the flow advances to step S10 to the x-th dot data of the (n−s)-th line and specify it as the dot data of the current line (see FIG. 14). Note that s indicates the absolute value of that integer part. After step S9 or S10, the flow advances to step S11.

In step S11, processing for the numerical value of the decimal part of the correction amount Δy is executed in turn. According to the numerical value of the decimal part, the distribution of the x-th dot data on the current line (n-th line) and the (n+1)-th or (n−1)-th line is determined. As has been described above with reference to FIG. 15, dot data are exchanged or replaced between those on neighboring lines in accordance with the numerical value of the decimal part. In this manner, after the x-th dot data on the current line (n-th line) is updated, the bitmap data is updated in step S12. In step S13, the variable x is incremented by +1. It is checked in step S14 if the value of the variable x becomes larger than the total number of dots of one line. If the value of the variable x is smaller than the total number of dots, the flow returns to step S4 to repeat the aforementioned processing.

If it is determined in step S14 that the value of the variable x becomes larger than the total number of dots of one line, the flow advances to step S15 to increment the variable n used to count the number of lines by +1. It is then checked in step S16 if the value of this variable n exceeds the number of lines of one page. If the value of this variable n does not exceed the number of lines of one page, the flow advances to step S17 to reset the variable x to "0". The flow then returns to step S4 to repeat the aforementioned processing. On the other hand, If it is determined in step S16 that the value of the variable n exceeds the number of lines of one page, the flow advances to step S18. It is checked in step S18 if processing for the cyan, yellow, magenta, and black bitmap data is complete. If the processing is not complete yet, the flow returns to step S3 to repeat the aforementioned processing; otherwise, the flow advances to step S19 to start image forming processing.

In step S19, a transfer sheet is picked up from the cassette 53 and begins to be fed. While the transfer sheet is fed placed on the feeding belt 10, toner images are formed in turn in the order of cyan, yellow, magenta, and black (step S20), and they are transferred in turn on the fed transfer sheet (step S21). Upon completion of transfer, the toner images are fixed on the transfer sheet in step S22. Upon completion of fixing, the fixed transfer sheet is discharged in step S23.

As described above, with the color image forming apparatus according to this embodiment, both color discrepancy in a dot unit and that in an amount less than a dot unit can be corrected based on the color discrepancy amounts on respective photosensitive drums. In this way, color discrepancy of respective color images due to the inclinations, curvatures, and the like of scan lines that scan and expose the respective photosensitive drums can be prevented, thus obtaining a high-quality color image.

Fourth Embodiment

According to parent reference 2 (Japanese Patent Application Laid-Open No. 8-85237) described above, the output coordinate position of image data for each color is corrected for an image that has undergone halftone processing. For this reason, if dithering is applied, reproducibility of halftone dots of a halftone image deteriorates. As a result, color inconsistency may occur and moiré may become obvious, as has been described previously. That is, when image data having constant density values is input and that image data undergoes the aforementioned color discrepancy correction and is printed, the following problems may occur. In general, the density value of image data and a toner density for that density value do not have a linear relationship. For this reason, although the input image data has constant density values, if it is corrected in an amount less than a minimum dot unit, the density of the corrected image is no longer constant. When such non-uniform density part is periodically repeated, moiré becomes obvious, and a high-quality color image cannot be obtained. The fourth embodiment solves such drawbacks.

The arrangement of the color image forming apparatus shown in FIG. 2 will be quoted in this embodiment.

Figure 19:
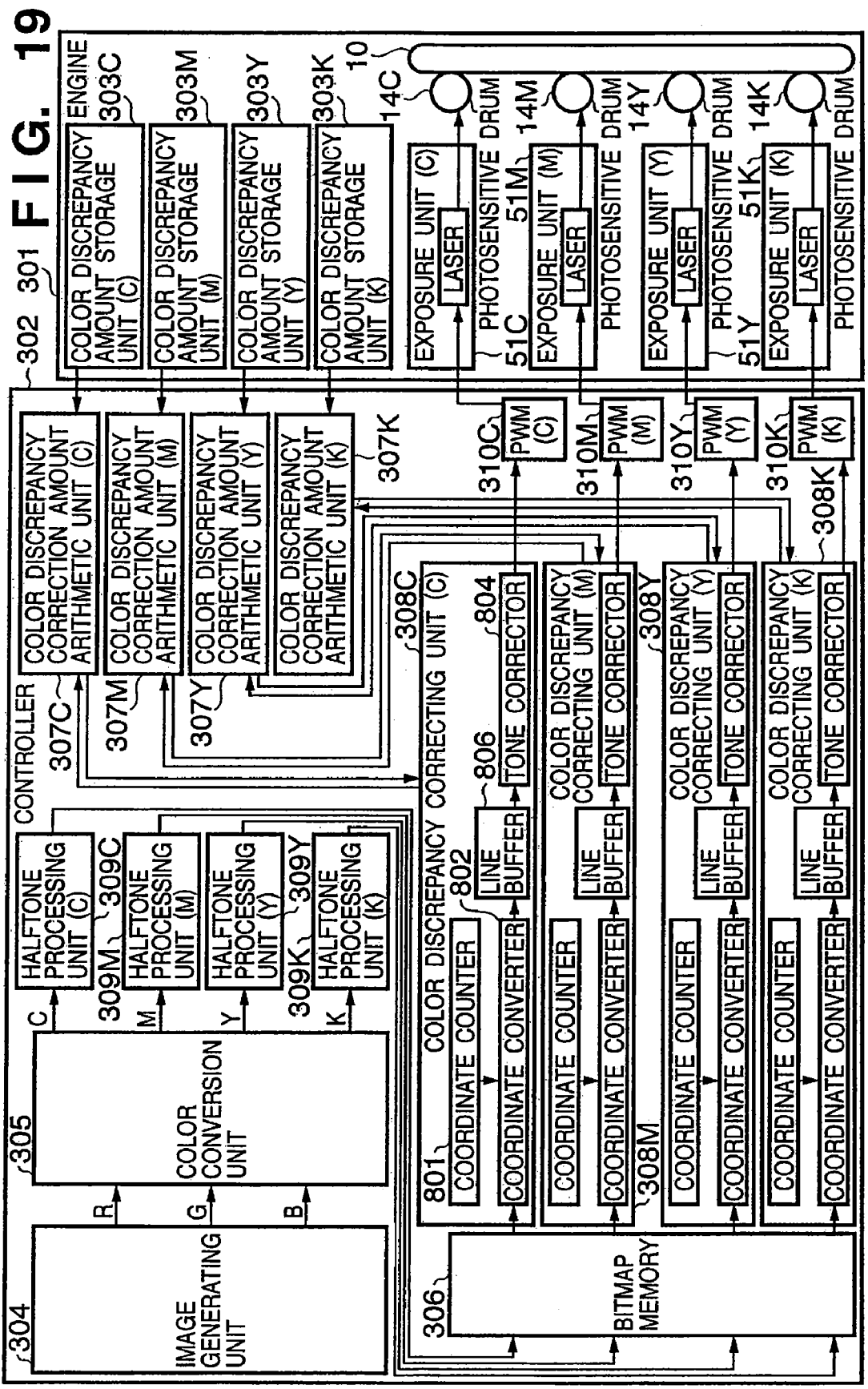
FIG. 19 is a control block diagram associated with color discrepancy correction processing according to the fourth embodiment of the present invention.

FIG. 19 is a block diagram for explaining color discrepancy correction processing for correcting color discrepancy that occurs due to the inclination and curvature of the main scan line in this embodiment.

Reference numeral 301 denotes a printer engine which has image forming units shown in FIG. 2, and executes print processing based on bitmap image data generated by a controller 302. Reference numerals 303C, 303Y, 303M, and 303K denote color discrepancy amount storage units which respectively store color discrepancy amounts for respective colors, i.e., cyan, yellow, magenta, and black. In this embodiment, discrepancy amounts in the sub-scan direction with respect to the ideal main scan line 201 based on the positions of the actual main scan line 202 measured at the plurality of points, as described above using FIG. 10, are stored as information indicating the inclination and curvature of the main scan line 202 in the color discrepancy amount storage unit 303.

An example of data to be stored in this color discrepancy amount storage unit 303 (303C, 303Y, 303M, and 303K) is as shown in FIG. 12.

An operation for executing print processing by correcting image data to cancel the discrepancy amounts of the main scan lines stored in the color discrepancy amount storage unit 303 in the controller 302 will be described below.

An image generating unit 304 generates raster image data, which allows print processing, based on print data received from an external apparatus (not shown) such as a computer apparatus or the like, and outputs that data as RGB data for respective dots. A color conversion unit 305 converts the RGB data into data on a CMYK space which can be processed by the printer engine 301. Each of halftone processing units 309C to 309K reduces the number of bits of the input dot data using a predetermined halftone screen pattern to convert tone expression in a dot unit into data of tone expression in area units based on the halftone screen. The converted data is stored for each color in a bitmap memory 306. The bitmap memory 306 temporarily stores the raster image data to be printed, and may comprise either a page memory that can store image data for one page or a band memory that can store data for a plurality of lines.

Reference numerals 307C, 307Y, 307M, and 307K denote color discrepancy amount arithmetic units which calculate correction amounts of color discrepancy corresponding to respective color data. These arithmetic units calculate color discrepancy correction amounts in the sub-scan direction corresponding to coordinate information in the main scan direction designated by color discrepancy correcting units 308 (to be described later) for respective dots on the basis of information indicating the discrepancy amounts of the main scan lines stored in the color discrepancy amount storage units 303 corresponding to respective colors. The calculation results are output to the corresponding color discrepancy correcting units 308.

Let x (dots) be a coordinate of a given dot in the main scan direction, and y (lines) be a coordinate of that dot in the sub-scan direction. Also, let $\Delta yi$ (dots) (i indicates a region) be the color discrepancy correction amount in the sub-scan direction. In this case, arithmetic expressions of the color discrepancy correction amounts $\Delta yi$ in the sub-scan direction in respective regions based on FIG. 10 are as follows (note that the resolution in this case is 600 dpi).

Region 1: $\Delta y1 = x \times (m1/L1)$ (5)

Region 2: $\Delta y2 = m1 \times 23.622 + (x - L1 \times 23.622) \times ((m2 - m1)/(L2 - L1))$ (6)

Region 3: $\Delta y3 = m2 \times 23.622 + (x - L2 \times 23.622) \times ((m3 - m2)/(L3 - L2))$ (7)

The color discrepancy correcting units 308C, 308Y, 308M, and 308K respectively correct color discrepancy due to the inclinations and curvatures of the main scan lines. More specifically, these correcting units adjust the output timings of bitmap data stored in the bitmap memory 306 and adjust the exposure amounts for respective dots based on the color discrepancy correction amounts calculated for respective dots by the color discrepancy correction amount arithmetic units. In this manner, any color discrepancy (registration errors) upon transferring toner images of respective colors onto a transfer sheet can be prevented.

Figure 20:
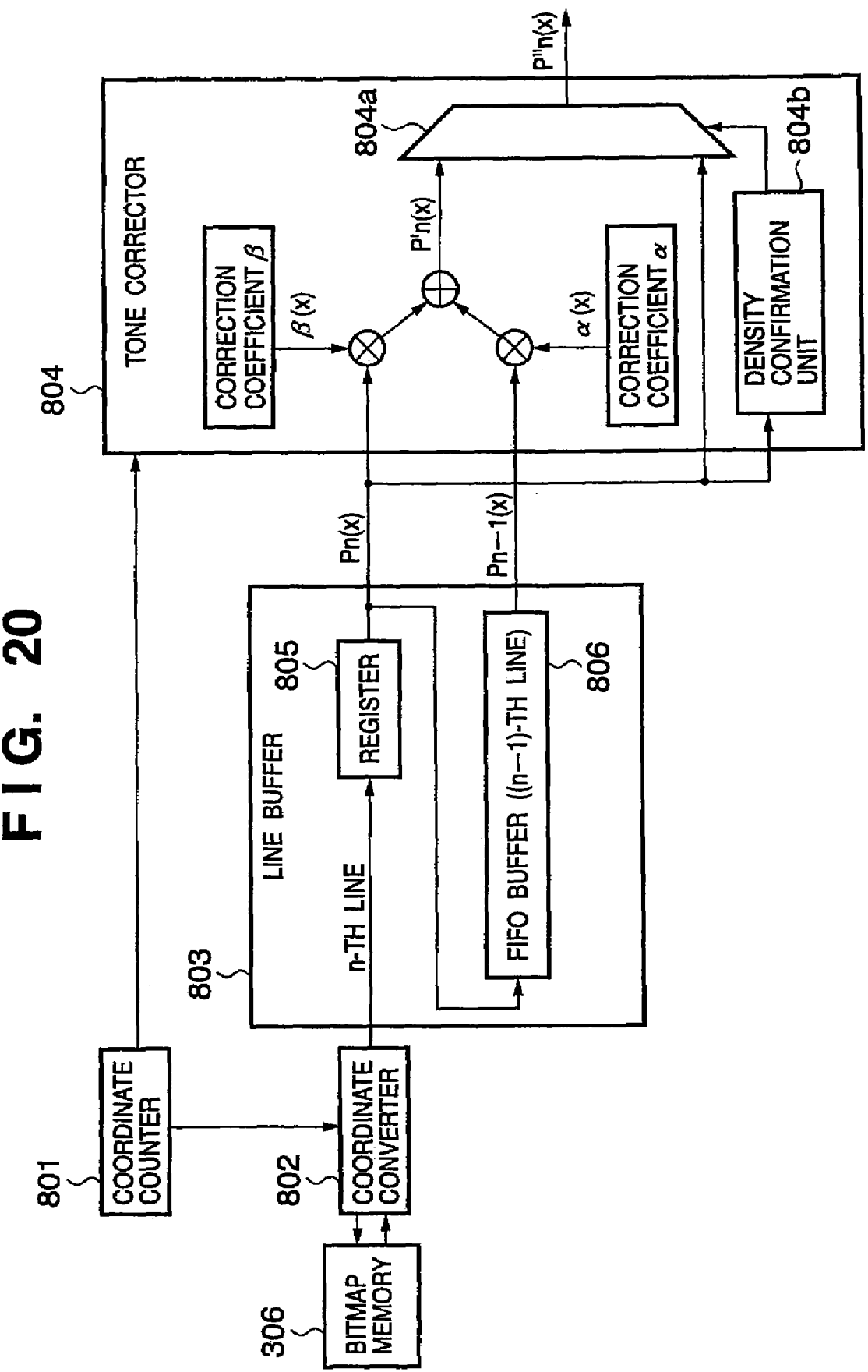
FIG. 20 is a block diagram showing the arrangement of a color discrepancy correcting unit according to the fourth embodiment of the present invention.

The color discrepancy correcting unit 308 (308C, 308Y, 308M, and 308K) according to this embodiment will be described below with reference to the block diagram shown in FIG. 20. Note that a case of the cyan color discrepancy correcting unit 308C will be explained below. Since the color discrepancy correcting units for other colors have the same arrangements and operations, a description thereof will be omitted.

The color discrepancy correcting unit 308C comprises a coordinate counter 801, coordinate converter 802, line buffer 803, and tone corrector 804. The coordinate counter 801 outputs coordinate data in the main scan direction and sub-scan direction of a dot, that is to undergo color discrepancy correction processing, to the coordinate converter 802. At the same time, the coordinate counter 801 outputs coordinate data in the main scan direction of that dot to the color discrepancy correction amount arithmetic unit 307C and tone corrector 804. The coordinate converter 802 reads out line data to be processed from the bitmap memory 306 based on the coordinate data in the main scan direction and sub-scan direction from the coordinate counter 801. The tone corrector 804 executes correction processing based on the integer part of a discrepancy correction amount $\Delta y$ based on this discrepancy correction amount $\Delta y$ obtained by the color discrepancy correction amount arithmetic unit 307C, i.e., reconstruction processing in the sub-scan direction in a dot unit. The tone corrector 804 also executes correction processing based on the value of the decimal part of the discrepancy correction amount $\Delta y$ based on the coordinate data in the main scan direction from the coordinate counter 801 and the discrepancy correction amount $\Delta y$, i.e., correction in less than a dot unit by adjusting the exposure ratios of neighboring dots in the sub-scan direction. The tone corrector 804 uses the line buffer 803 to refer to neighboring dots in the sub-scan direction.

The operation based on the above arrangement will be described below.

The coordinate converter 802 converts an address in the sub-scan direction of a coordinate value input from the coordinate counter 801, and reads out bitmap data of a corresponding line from the bitmap memory 306. The line buffer 803 comprises a register 805 for storing dot data to be processed, and a FIFO buffer 806 for storing dot data for one line of the previous line. The tone corrector 804 refers to dot data on neighboring lines in the sub-scan direction stored in the line buffer 803 so as to generate correction data. The dot data stored in the register 805 is output to the tone corrector 804 and is used to generate correction data for the next line. The tone corrector 804 receives a coordinate x in the main scan direction of the n-th line from the coordinate counter 801. The tone corrector 804 also inputs x-th dot data Pn(x) of the n-th line from the register 805 and x-th dot data Pn−1(x) of the previous line from the FIFO buffer 806. The tone corrector 804 executes the following arithmetic processing to generate correction data P″n(x).

$$P''n(x)=Pn(x)\times\beta(x)+Pn-1(x)\times\alpha(x)$$

A density confirmation unit 804b receives the dot data Pn(x) to be processed to confirm the density of that dot. If the density of this dot Pn(x) is lower than a predetermined density value (μ), the original dot data Pn(x) is output as P″n(x); otherwise, the corrected dot data P″n(x) is selected and output. This selection is made by a selector 804a. In this manner, the bitmap data whose color discrepancy amount less than a dot unit in the sub-scan direction is corrected is output.

The dot data whose discrepancy amounts are corrected are converted into pulse-width modulated signals by PWM circuits 310C to 310K, and these signals are sent to corresponding exposure units 51C to 51K, thus driving respective semiconductor lasers.

Figure 21A:
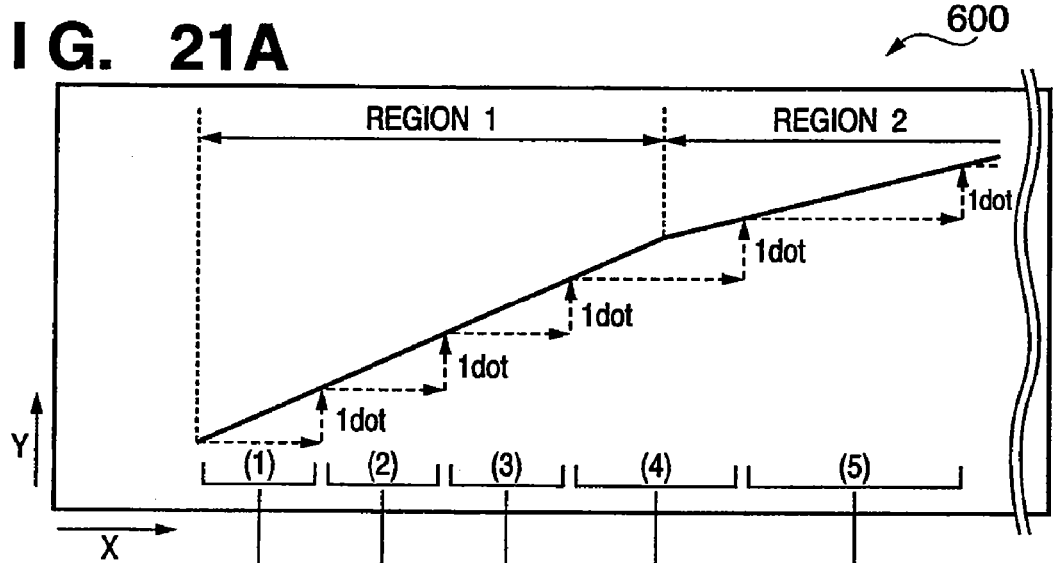
FIGS. 21A to 21C are conceptual views for explaining the operation contents when a coordinate converter according to the fourth embodiment of the present invention corrects a discrepancy amount of the integer part of a color discrepancy correction amount $\Delta y$ (color discrepancy for each line)
Figure 21B:
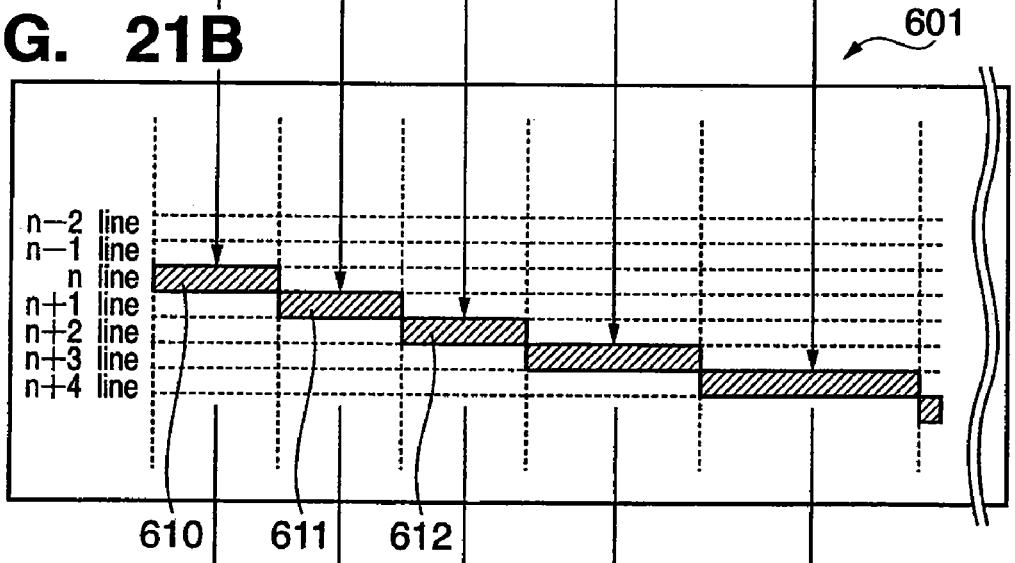
Figure 21C:
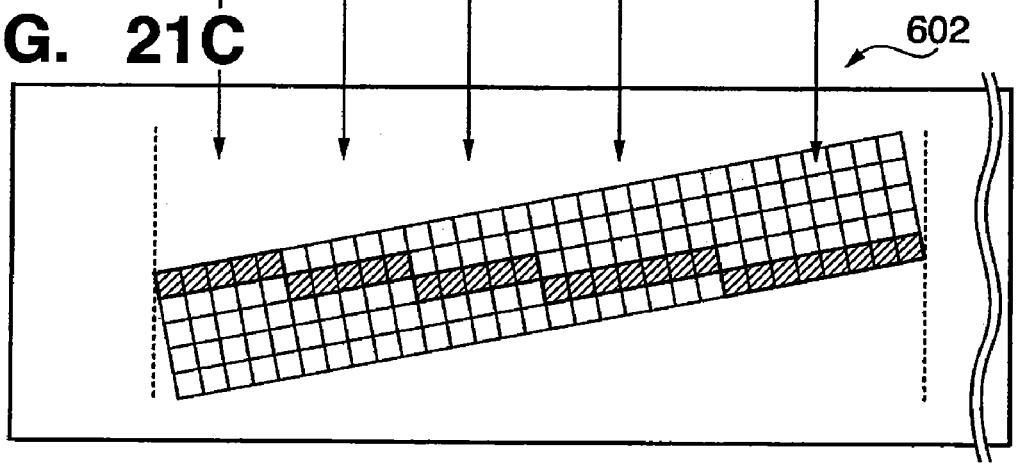

FIGS. 21A to 21C are conceptual views for explaining the operation executed when the coordinate converter 802 according to this embodiment corrects a discrepancy amount based on the integer part of the color discrepancy correction amount Δy.

The coordinate converter 802 offsets a coordinate of dot data in the sub-scan direction (Y-direction), which is stored in the bitmap memory 306, in accordance with the value of the integer part of the color discrepancy correction amount Δy calculated based on the color discrepancy information of the main scan lines approximated by straight lines, as indicated by reference numeral 600 in FIG. 21A. For example, as indicated by reference numeral 601 in FIG. 21B, when the coordinate in the sub-scan direction from the coordinate counter 801 is n (lines), letting x be a coordinate in the main scan direction, the color discrepancy correction amount Δy in region (1) in FIG. 21A satisfies 0≦Δy<1. Hence, in this case, upon reconstructing data of the n-th line, dot data 610 of the n-th line is read out from the bitmap memory 306 (offset=0). In region (2), the color discrepancy correction amount Δy satisfies 1≦Δy<2. Therefore, upon reconstructing the data of the n-th line, coordinate conversion processing for reading out data 611 of the (n+1)-th line offset by 1 as the number of sub-scan lines is executed. Likewise, in region (3), since the color discrepancy correction amount Δy satisfies 2≦Δy<3, coordinate conversion processing for reading out data 612 of the (n+2)-th line is executed. Also, similarly, coordinate conversion processing for reading out data of the (n+3)-th line for region (4) and that for reading out data of the (n+4)-th line for region (5) are executed.

With the above method, reconstruction processing in a line unit in the sub-scan direction, i.e., in a dot unit, is executed in accordance with the value of the integer part of the discrepancy correction amount. Note that reference numeral 602 in FIG. 21C denotes an exposed image when an image is exposed on the photosensitive drum based on the data 601 which has undergone the color discrepancy correction in a dot unit by the coordinate converter 802.

FIGS. 22A to 22F are conceptual views for explaining the operation contents of color discrepancy correction in less than a dot unit performed by the tone corrector 804, i.e., those for correcting the discrepancy amount of the decimal part of the color discrepancy correction amount Δy. The discrepancy amount of the decimal part is corrected by adjusting the exposure ratios of neighboring dots in the sub-scan direction.

FIG. 22A shows an image of a main scan line having a right upward inclination. FIG. 22B shows a bitmap image before discrepancy correction, i.e., a bitmap image of a straight line which is horizontal in the main scan direction. FIG. 22C shows a correction image obtained by correcting the bitmap image in FIG. 22B to cancel color discrepancy due to the inclination of the main scan line shown in FIG. 22A.

In this embodiment, in order to realize the correction image shown in FIG. 22C, the exposure amounts of dots on neighboring lines located in the sub-scan direction are adjusted.

FIG. 22D shows the relationship between the color discrepancy correction amount Δy and correction coefficients used to attain tone correction. k is the integer part (obtained by truncating the decimal part) of the color discrepancy correction amount Δy, i.e., a correction amount in a dot unit described using FIGS. 21A to 21C. β and α are correction coefficients, which are used to perform correction in less than a dot unit (a size smaller than one dot size) in the sub-scan direction, and represent distribution ratios of an exposure amount of neighboring dots in the sub-scan direction. These correction coefficients are respectively given by:

$$\alpha=\Delta y-k$$

$$\beta=1-\alpha$$

where α is the distribution ratio of a dot to the (n+k)-th line, and β is that of a dot to the (n+k−1)-th line. That is, when k=0, α is the distribution ratio of a dot to the n-th line, and β is that of a dot to the (n−1)-th line. Also, when k=1, α is the distribution ratio of a dot to the (n+1)-th line, and β is that of a dot to the n-th line.

A description will be given with reference to FIGS. 22C and 22D. A dot 700 is formed on the (n−1)-th line immediately before the n-th line where it is originally located, since k=0, α=0, and β=1 in FIG. 22D. A dot 701 is formed ¾ on the (n−1)-th line immediately before the n-th line, and is formed ¼ on the current line (n), since α=0.25 and β=0.75 in FIG. 22D. Likewise, a dot 702 is formed ½ on the (n−1)-th line immediately before the n-th line, and is formed ½ on the current line (n), since α=0.5 and β=0.5 in FIG. 22D. Also, a dot 703 is formed ¼ on the (n−1)-th line immediately before the n-th line, and is formed ¾ on the current line (n). Note that a dot 704 is formed at the position of the n-th line where it is originally located, since k=1, α=0, and β=1. For dots 705 to 707, since k=1, α represents the distribution ratio of a dot to the (n+1)-th line, and β represents that of a dot to the n-th line. Furthermore, for a dot 708, since k=2, α represents the distribution ratio of a dot to the (n+2)-th line, and β represents that of a dot to the (n+1)-th line.

FIG. 22E shows pulse signals based on the bitmap image in which the exposure ratios of the neighboring dots in the sub-scan direction are adjusted in accordance with the correction coefficients in FIG. 22D. FIG. 22E illustrates each pulse signal in the form of a pulse-width modulated signal corresponding to each dot data.

FIG. 22F shows an image developed on the photosensitive drum when exposure is made by a laser based on the pulse widths that have undergone tone correction, as shown in FIG. 22E. In this manner, the inclination of the main scan line is canceled, and a horizontal straight line is formed.

In the above description, correction processing implemented by hardware has been explained. When the controller 302 comprises a CPU, as shown in FIG. 16, processing can also be implemented by software as in the above third embodiment.

Figure 23:
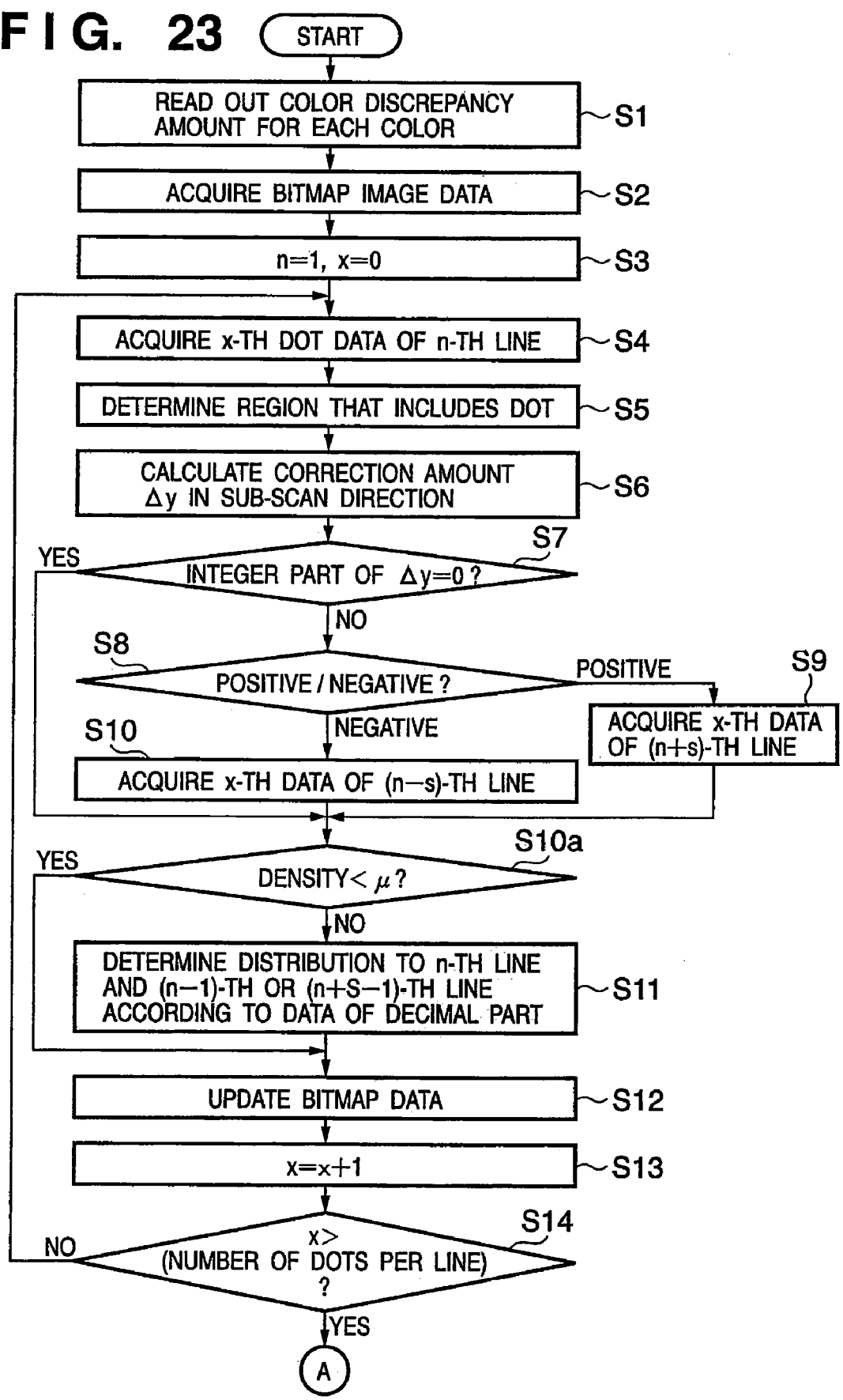
FIGS. 23 and 24 are flowcharts for explaining image forming processing to be executed by a CPU of a controller according to the fourth embodiment of the present invention.
Figure 24:
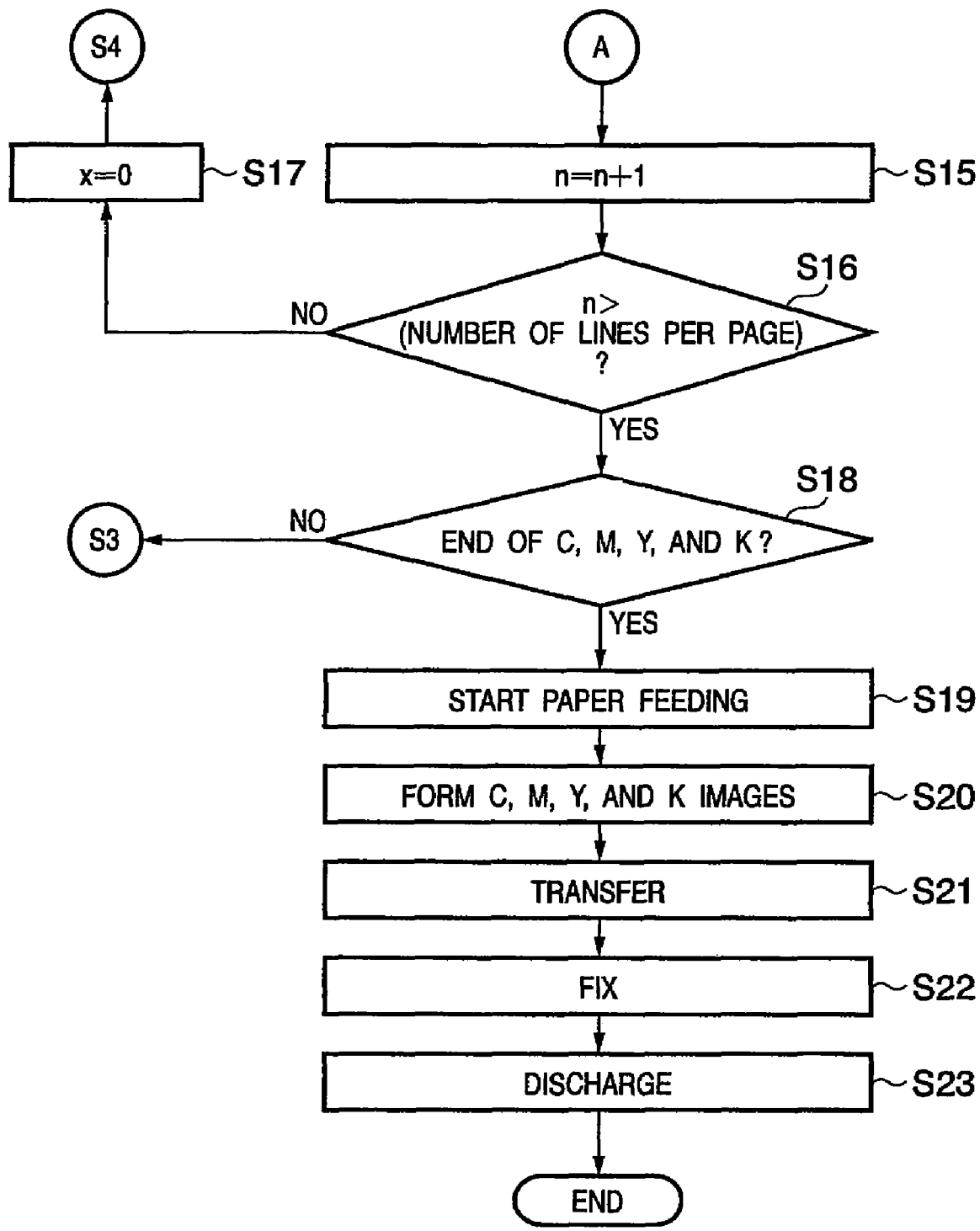

FIGS. 23 and 24 are flowcharts for explaining image forming processing to be executed by the CPU 1000 when the controller 302 according to this embodiment has the arrangement shown in FIG. 16. A program that implements this processing is stored in the ROM 1001, and is executed under the control of the CPU 1000.

In step S1, the color discrepancy amounts for respective colors stored in the color discrepancy amount storage units 303C to 303K of the printer engine 301 are read out, and are stored in the areas 1010 on the RAM 1002. In step S2, print data is input and undergoes processing such as color conversion and the like. After that, the print data is converted into cyan, yellow, magenta, and black bitmap image data each for one page, and the converted data are stored in the bitmap memory 306. In step S3, a variable n used to count the number of lines is reset to "1", and a variable x used to count the dot position (x coordinate) is reset to "0". Note that both these variables are stored in the RAM 1002.

In step S4, the x-th dot data of the n-th line is read out from the cyan bitmap data. In step S5, a region which includes that dot (for example, one of regions 1 to 3 in FIG. 10) is determined. In step S6, a correction amount $\Delta y$ in the sub-scan direction, which forms that dot is calculated based on the region determined in step S5 and the dot position (x). This value can be calculated using one of equations (5) to (7) above. It is checked in step S7 if the integer part of the correction amount $\Delta y$ calculated in step S6 is "0". If the integer part is "0", since correction in a line unit is not required, the flow jumps to step S10a; otherwise, the flow advances to step S8 to check if the integer part is positive or negative. If the integer part is positive, the flow advances to step S9 to acquire the x-th dot data of the (n+s)-th line and specify it as the dot data of the current line (see FIGS. 21A to 21C). On the other hand, if it is determined in step S8 that the integer part is negative, the flow advances to step S10 to the x-th dot data of the (n−s)-th line and specify it as the dot data of the current line (see FIGS. 21A to 21C). Note that s indicates the absolute value of that integer part. After step S9 or S10, the flow advances to step S10a. It is checked in step S10a if the density of the dot data (multi-valued data) to be processed is lower than a predetermined density ($\mu$). This corresponds to the arrangement of the tone confirmation unit 804b shown in FIG. 20. If the density value is lower than the threshold ($\mu$), it is determined that the aforementioned correction using the coefficients $\alpha$ and $\beta$ is not required, and the flow jumps to step S12. On the other hand, if the density value is higher than the threshold ($\mu$), since that dot becomes conspicuous if it is formed, it is determined that the aforementioned discrepancy correction is required, and the flow advances to step S11.

In step S11, processing for the numerical value of the decimal part of the correction amount $\Delta y$ is executed in turn. According to the numerical value of the decimal part, the distribution of the x-th dot data on the current line (n-th line) and the (n+1)-th or (n−1)-th line is determined. As has been described above with reference to FIGS. 22A to 22F, dot data are exchanged or replaced between those on neighboring lines in accordance with the numerical value of the decimal part. In this manner, after the x-th dot data on the current line (n-th line) is updated, the bitmap data is updated in step S12. In step S13, the variable x is incremented by +1. It is checked in step S14 if the value of the variable x becomes larger than the total number of dots of one line. If the value of the variable x is smaller than the total number of dots, the flow returns to step S4 to repeat the aforementioned processing.

If it is determined in step S14 that the value of the variable x becomes larger than the total number of dots of one line, the flow advances to step S15 to increment the variable n used to count the number of lines by +1. It is then checked in step S16 if the value of this variable n exceeds the number of lines of one page. If the value of this variable n does not exceed the number of lines of one page, the flow advances to step S17 to reset the variable x to "0". The flow then returns to step S4 to repeat the aforementioned processing. On the other hand, If it is determined in step S16 that the value of the variable n exceeds the number of lines of one page, the flow advances to step S18. It is checked in step S18 if processing for the cyan, yellow, magenta, and black bitmap data is complete. If the processing is not complete yet, the flow returns to step S3 to repeat the aforementioned processing; otherwise, the flow advances to step S19 to start image forming processing.

In step S19, a transfer sheet is picked up from the cassette 53 and begins to be fed. While the transfer sheet is fed placed on the feeding belt 10, dot data is PWM-modulated. Toner images are formed in turn in the order of cyan, yellow, magenta, and black (step S20), and they are transferred in turn on the fed transfer sheet (step S21). Upon completion of transfer, the toner images are fixed on the transfer sheet in step S22. Upon completion of fixing, the fixed transfer sheet is discharged in step S23.

Note that the aforementioned threshold ($\mu$) may be set for each color or beam. For example, in case of a color such as yellow whose density difference is difficult to visually determine, the threshold $\mu$ is set to be larger than those of other colors. In this way, since the ratio of execution of tone correction is reduced compared to other colors, moiré can be eliminated.

As described above, with the color image forming apparatus according to this embodiment, both color discrepancy in a dot unit and that in an amount less than a dot unit can be corrected based on the color discrepancy amounts on respective photosensitive drums. In this way, color discrepancy of respective color images due to the inclinations, curvatures, and the like of scan lines that scan and expose the respective photosensitive drums can be prevented, thus obtaining a high-quality color image.

Fifth Embodiment

The method disclosed in patent reference 2 above further suffers the following problems. That is, when image data is output while executing coordinate conversion, comprehensive misalignments can be coped with, but stripe-like spots are generated due to quantization errors. When the coordinate value of the dot position after coordinate conversion includes a fraction below the decimal point, with an arrangement which forms a dot around a location where that point is ideally located by reducing the toner amount, stripe-like spots due to quantization errors can be prevented to some extent. However, in order to obtain a high-quality image, a toner discharge amount must be finely controlled. In order to finely control the toner discharge amount, the number of bits to be assigned per pixel of image data must be increased. For this reason, this arrangement requires a large-capacity memory that stores image data, resulting in an increase in manufacturing cost of the apparatus. Note that this problem is also posed when a monochrome image is formed. The fifth embodiment solves such drawbacks.

The arrangement of the color image forming apparatus shown in FIG. 2 will be quoted in this embodiment.

Figure 25:
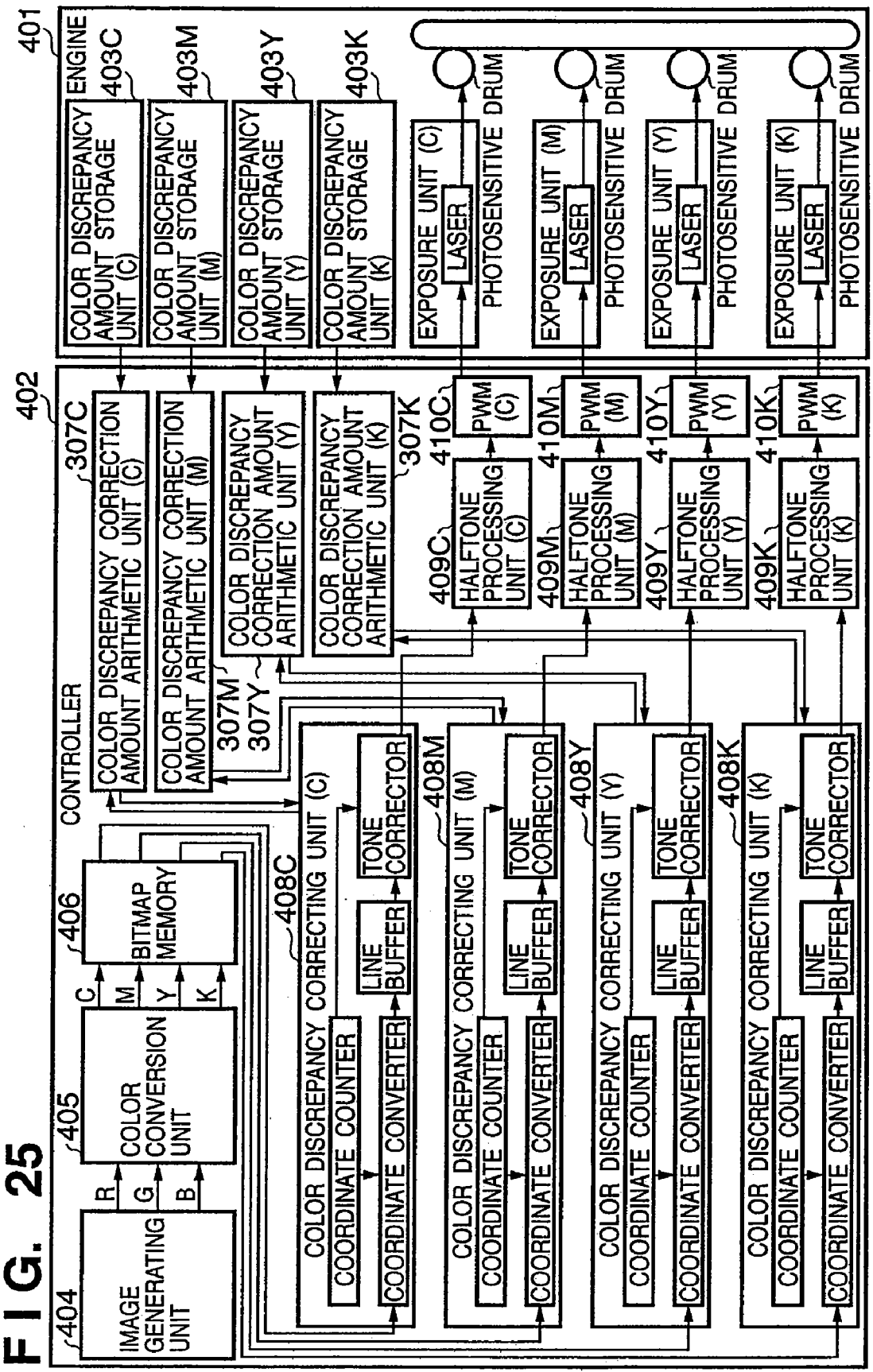
FIG. 25 is a control block diagram associated with color discrepancy correction processing according to the fifth embodiment of the present invention.

FIG. 25 is a block diagram for explaining color discrepancy correction processing for correcting color discrepancy that occurs due to the inclination and curvature of the main scan line in this embodiment.

Referring to FIG. 25, reference numeral 401 denotes a printer engine, which executes print processing based on image bitmap information generated by a controller 402, i.e., based on drive signals input from PWM units 410 (to be described later).

Reference numerals 403C, 403Y, 403M, and 403K (to be referred to as 403 together hereinafter) denote color discrepancy amount storage units for basic colors. These color discrepancy amount storage units respectively store information associated with color discrepancy of the main scan lines for respective regions mentioned above. In this embodiment, each color discrepancy amount storage unit 403 stores the difference between the actual main scan line 202 and ideal main scan line 201 as information indicating the inclination and curvature of the main scan line, as described above using FIG. 10.

FIG. 26 shows an example of data to be stored in the color discrepancy amount storage unit 403. Regions 1 to 3 in FIG. 26 correspond to those in FIG. 10. For example, the widths of regions 1 to 3 in FIG. 26 respectively correspond to those of regions 1 to 3 in FIG. 10, i.e., the x-coordinate difference of (Pa, Pb), that of (Pb, Pc), and that of (Pc, Pd). The discrepancy amounts of regions 1 to 3 in FIG. 26 correspond to those of regions 1 to 3 in FIG. 10, i.e., the y-coordinate difference of (Pa, Pb), that of (Pb, Pc), and that of (Pc, Pd).

In this embodiment, each color discrepancy amount storage unit 403 stores the discrepancy amount between the ideal main scan line and actual main scan line as information associated with color discrepancy. However, the present invention is not limited to such specific information as long as the characteristics or the like of the inclination and curvature of the actual main scan line can be derived (e.g., the inclination of the actual main scan line, coordinates of the end points, and the like). As information to be stored in each color discrepancy amount storage unit 403, the above discrepancy amount may be measured in the manufacturing process of the apparatus, and may be pre-stored as information unique to the apparatus. Alternatively, a detection mechanism that detects the discrepancy amount may be prepared to form a predetermined pattern used to measure discrepancy for each photosensitive drum 14 of a basic color, and the discrepancy amount detected by the detection mechanism may be stored.

An operation for executing print processing by correcting image data to cancel the discrepancy amounts of the main scan lines stored in the color discrepancy amount storage units 403 in the controller 402 will be described below.

An image generating unit 404 generates raster image data, which allows print processing, based on print data received from an external apparatus (not shown) such as a computer apparatus or the like, and outputs that data as RGB (Red, Green, Blue) data for respective dots. Reference numeral 405 denotes a color conversion unit which converts the RGB data output from the image generating unit 404 into data on a CMYK space which can be processed by the controller 402, and stores the converted data in a bitmap memory (image memory) 406 to be described below for respective basic colors. The bitmap memory 406 temporarily stores the raster image data to be printed, and may comprise either a page memory that can store image data for one page or a band memory that can store data for a plurality of lines.

Reference numerals 307C, 307Y, 307M, and 307K denote color discrepancy correction amount arithmetic units. These arithmetic units calculate color discrepancy correction amounts in the sub-scan direction corresponding to coordinate information in the main scan direction designated by color discrepancy correcting units 408 (to be described later) for respective dots on the basis of information indicating the discrepancy amounts of the main scan lines stored in the color discrepancy amount storage units 403 corresponding to respective colors. The calculation results are output to the corresponding color discrepancy correcting units 408.

Each color discrepancy correction amount arithmetic unit 307 calculates a color discrepancy correction amount in the sub-scan direction by executing the following arithmetic operations. That is, letting x (dots) be coordinate data in the main scan direction, and Δy (dots) be a color discrepancy correction amount in the sub-scan direction, arithmetic expressions of respective regions based on FIGS. 10 and 26 are as follows. Assume that the following arithmetic expressions are given when the print density is 600 dpi.

Region 1: $\Delta y1 = x*(m1/L1)$

Region 2: $\Delta y2 = m1*23.622 + (x-L1*23.622)*((m2-m1)/(L2-L1))$

Region 3: $\Delta y3 = m2*23.622 + (x-L2*23.622)*((m3-m2)/(L3-L2))$

As shown in FIG. 10, L1, L2, and L3 are distances (unit: mm) in the main scan direction from the print start position to the left ends of regions 1, 2, and 3. Also, m1, m2, and m3 are discrepancy amounts between the ideal main scan line 201 and actual main scan line 202 at the left ends of regions 1, 2, and 3.

Referring back to FIG. 25, reference numerals 408C, 408Y, 408M, and 408K (to be referred to as 408 together hereinafter) denote color discrepancy amount correcting units. This correcting unit adjusts the output timings of bitmap data stored in the bitmap memory 406 and adjusts the exposure amounts for respective pixels based on the color discrepancy correction amounts calculated for respective dots by the corresponding color discrepancy correction amount arithmetic unit 307, so as to correct color discrepancy due to the inclination and curvature of the main scan line. In this way, color discrepancy upon transferring toner images of respective basic colors onto a transfer sheet can be prevented.

Figure 27:
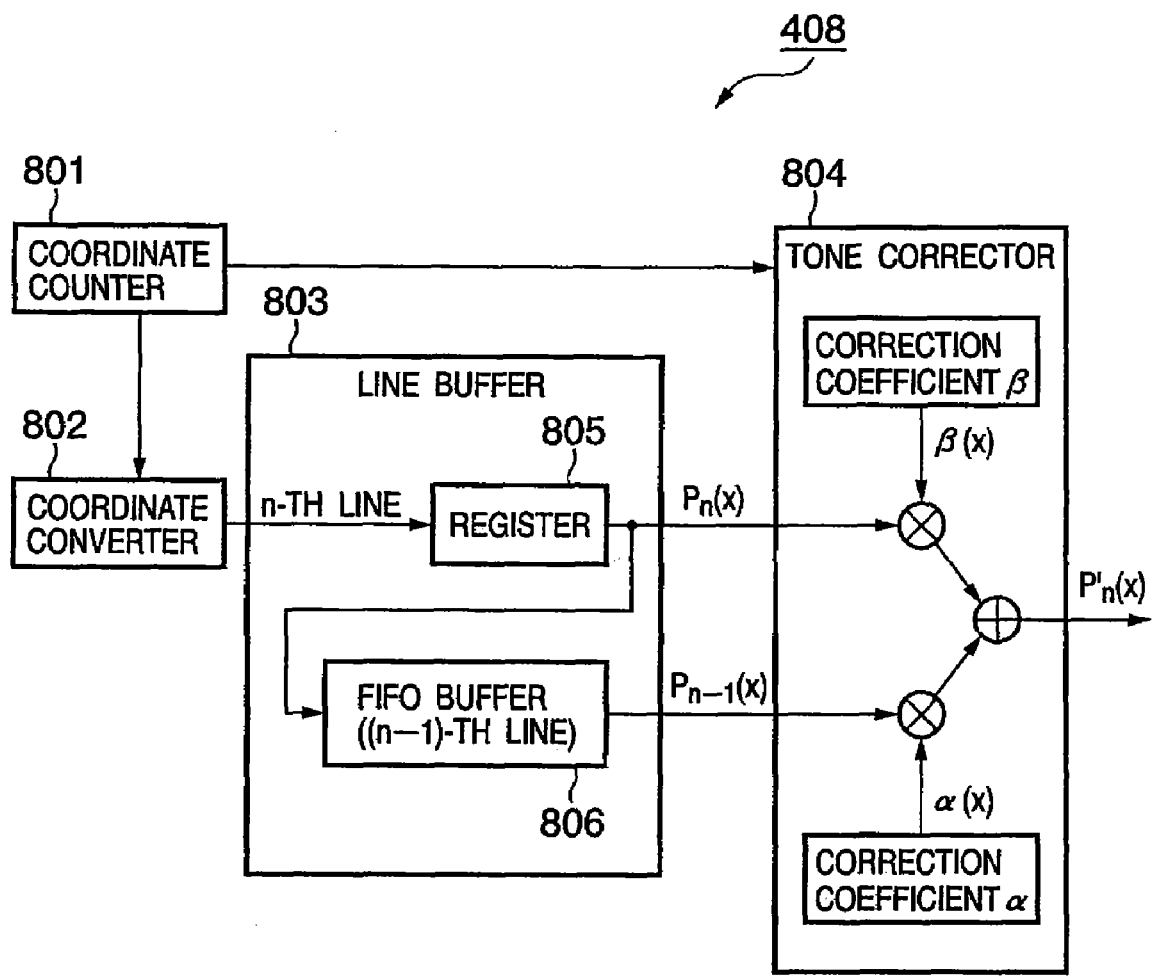
FIG. 27 is a block diagram showing the arrangement of a color discrepancy correcting unit according to the fifth embodiment of the present invention.

The color discrepancy correcting unit 408 will be described below with reference to FIG. 27. FIG. 27 is a block diagram showing the arrangement of the color discrepancy amount correcting unit 408.

As shown in FIG. 27, the color discrepancy correcting unit 408 comprises a coordinate counter 801, coordinate converter 802, line buffer 803, and tone corrector 804. The coordinate counter 801 outputs coordinate data in the main scan direction and sub-scan direction of a dot, that is to undergo color discrepancy correction processing, to the coordinate converter 802. At the same time, the coordinate counter 801 outputs coordinate data in the main scan direction of that dot to the color discrepancy correction amount arithmetic unit 307 and tone corrector 804. The coordinate converter 802 as conversion means executes correction processing of the integer part of the correction amount Δy based on the coordinate data in the main scan direction and sub-scan direction from the coordinate counter 801 and the correction amount Δy obtained from the color discrepancy correction amount arithmetic unit 307. That is, the coordinate converter 802 executes reconstruction processing in the sub-scan direction in the pixel unit. The tone corrector 804 as acquisition means executes correction processing of the decimal part of Δy based on the coordinate data in the main scan direction from the coordinate counter 801 and the correction amount Δy, i.e., it performs correction in less than the pixel unit by adjusting the exposure ratios of neighboring dots in the sub-scan direction. The tone corrector 804 uses the line buffer (holding means) 803 to refer to neighboring dots in the sub-scan direction.

In this manner, the color discrepancy amount correcting unit 408 comprises the coordinate converter 802 which executes correction processing of the integer part of the correction amount Δy obtained from the color discrepancy correction amount arithmetic unit 307, i.e., reconstruction processing in the sub-scan direction in the pixel unit. Furthermore, the unit 408 also comprises the tone corrector 804 which executes correction processing of the decimal part of Δy, i.e., performs correction in less than the pixel unit by adjusting the exposure ratios of neighboring dots in the sub-scan direction. The tone corrector 804 uses the line buffer to refer to neighboring dots in the sub-scan direction.

Figure 28A:
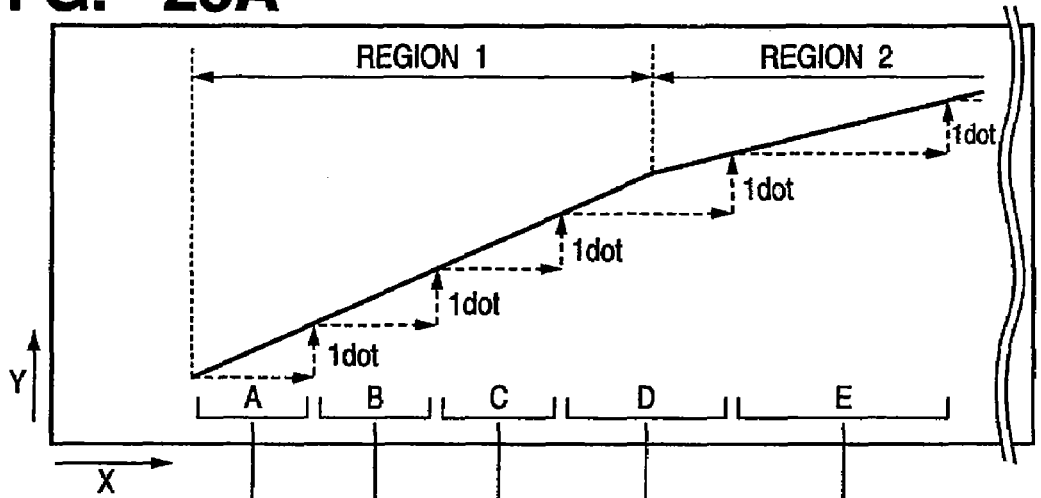
FIGS. 28A to 28C are views illustrating the operation contents when a coordinate converter according to the fifth embodiment of the present invention corrects a discrepancy amount of the integer part of a color discrepancy correction amount $\Delta y$.
Figure 28B:
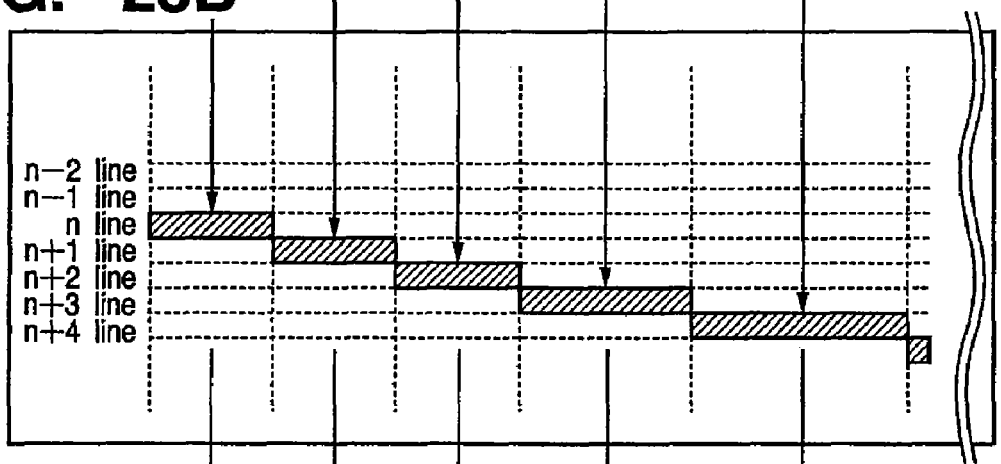
Figure 28C:
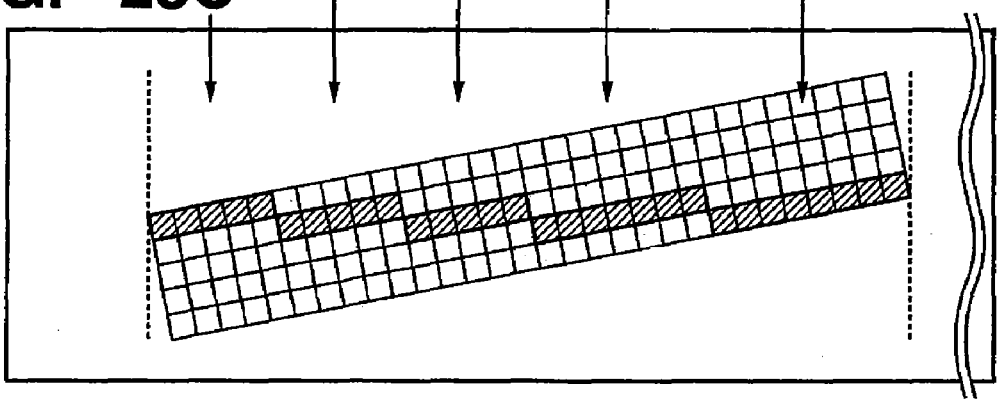

The processing of the coordinate converter 802 of the color discrepancy amount correcting unit 408 will be described below with reference to FIGS. 28A to 28C. FIGS. 28A to 28C are views illustrating the operation contents of the coordinate converter 802 for correcting the discrepancy amount of the integer part of the color discrepancy correction amount Δy.

The coordinate converter 802 offsets a coordinate of image data in the sub-scan direction (Y-direction), which is stored in the bitmap memory 406, in accordance with the value of the integer part of the color discrepancy correction amount Δy calculated based on the color discrepancy information of the main scan lines approximated by straight lines, as shown in FIG. 28A. Referring to FIG. 28B, let X be a coordinate position in the main scan direction. When the coordinate position in the sub-scan direction from the coordinate counter 801 is n, at the X-coordinate in the main scan direction, the color discrepancy correction amount Δy in region (A) satisfies $0 \leq \Delta y < 1$, and the offset amount is 0. Hence, upon reconstructing data of the n-th line, data of the n-th line is read out from the bitmap memory. In region (B), the color discrepancy correction amount Δy satisfies $1 \leq \Delta y < 2$. Therefore, upon reconstructing the data of the n-th line, coordinate conversion processing for reading out an image bitmap at a position offset by the number of sub-scan lines=1, i.e., data of the (n+1)-th line from the bitmap memory is executed. Likewise, coordinate conversion processing for reading out data of the (n+2)-th line for region (C) and that for reading out data of the (n+3)-th line for region (D) are executed. With the above method, reconstruction processing in the pixel unit in the sub-scan direction is executed.

FIG. 28C shows an exposed image when image data which has undergone the color discrepancy correction in the pixel unit by the coordinate converter 802 is exposed on the photosensitive drum 14. Even when the main scan direction obliquely misaligns upon image formation, since the aforementioned reconstruction processing in the sub-scan direction is executed, an image of a horizontal straight line can be formed on a transfer sheet in a form approximate to that of an original image.

The processing of the tone corrector 804 for performing correction in less than the pixel unit by adjusting the exposure ratios of neighboring dots in the sub-scan direction will be described below with reference to FIGS. 29A to 29F. FIGS. 29A to 29F are views illustrating the operation contents of color discrepancy correction in less than the pixel unit executed by the tone corrector 804, i.e., those for correcting the discrepancy amount of the decimal part of the color discrepancy correction amount Δy. The discrepancy amount of the decimal part can be corrected by adjusting the exposure ratios of neighboring dots in the sub-scan direction.

FIG. 29A shows an image of a main scan line having a right upward inclination. FIG. 29B shows a bitmap image before tone correction, i.e., a bitmap image of a horizontal straight line of an original image. FIG. 29C shows a correction bitmap image after the bitmap image shown in FIG. 29B has undergone tone correction so as to cancel color discrepancy due to the inclination of the main scan line shown in FIG. 29A. The correction bitmap image shown in FIG. 29C is ideal when the inclination discrepancy amount is given by, e.g., FIG. 29A. The tone corrector 804 forms an image approximate to the correction bitmap image by adjusting the exposure amounts of regular grid points and the toner discharge amounts, so as to form an image approximate to the correction bitmap image shown in FIG. 29C.

In order to realize the correction image shown in FIG. 29C, the exposure amounts of neighboring dots in the sub-scan direction are adjusted. FIG. 29D shows the relationship between the color discrepancy correction amount Δy and correction coefficients used to attain tone correction. k is the integer part (obtained by truncating the decimal part) of the color discrepancy correction amount Δy, i.e., a correction amount in the sub-scan direction in the pixel unit. β and α are correction coefficients, which are used to perform correction in less than the pixel unit in the sub-scan direction, and represent distribution ratios of an exposure amount of neighboring dots in the sub-scan direction based on information of the decimal part of the color discrepancy correction amount Δy. These correction coefficients are respectively calculated by:

$$\alpha = \Delta y - k$$

$$\beta = 1 - \alpha$$

where α is the distribution ratio to the dot to be scanned, and β is that to the trailing dot.

FIG. 29E illustrates a bitmap image which has undergone tone correction to adjust the exposure ratios of neighboring dots in the sub-scan direction based on the correction coefficients α and β in FIG. 29D. FIG. 29F shows an exposed image of the bitmap image, which has undergone tone correction, on the photosensitive drum 14, i.e., a state wherein the inclination of the main scan line is canceled by the bitmap image which has undergone tone correction, and a horizontal straight line is formed.

The tone correction processing will be described below with reference again to FIG. 27. The coordinate converter 802 reconstructs image data input from the bitmap memory 406 to correct color discrepancy amounts in the pixel unit based on the correction amounts acquired from the color discrepancy correction amount arithmetic unit 307. More specifically, the coordinate converter 802 executes processing for converting the coordinate of the read address of the bitmap memory 406 based on the correction amount acquired from the color discrepancy correction amount arithmetic unit 307, and reading out image data based on the converted address information. In this manner, for example, the coordinate converter 802 acquires information of pixels corresponding to dots which line up in the main scan direction (corresponding to, e.g., the right direction in FIG. 28B) on an oblique basis system shown in, e.g., FIGS. 28C and 29F in turn from the bitmap memory 406. The coordinate converter 802 transfers this reconstructed image data to the line buffer 803. The coordinate converter 802 calculates the values α and β by the aforementioned arithmetic operations from Δy acquired by the color discrepancy correction amount arithmetic unit 307, and outputs them to the tone corrector 804.

Note that the color discrepancy amount correcting unit 408 may receive the value of the correction amount Δy from the color discrepancy correction amount arithmetic unit 307 every time it outputs pixel information for one dot to a halftone processing unit 409. Alternatively, the color discrepancy amount correcting unit 408 may receive values of the correction amounts Δy for one line from the color discrepancy correction amount arithmetic unit 307 prior to the processing, and may proceed with processing based on these values.

In the above arrangement, the coordinate converter 802 calculates α, β, and the like from the correction amount Δy. However, the color discrepancy correction amount arithmetic unit 307 may calculate α, β, and the like from the correction amount Δy stored in the color discrepancy amount storage unit 403, and may output them in response to a request from the components of the color discrepancy amount correcting unit 408. In this case, the color discrepancy amount correcting unit 408 may acquire α and β for one line in advance from the color discrepancy correction amount arithmetic unit 307 prior to the processing, or may acquire them every time it processes pixel information for one dot.

The line buffer 803 is a storage device which temporarily buffers image data for a predetermined line since the tone corrector 804 must refer to neighboring pixel values in the sub-scan direction upon generating correction data. In this embodiment, the data size to be buffered is for one line of image data for the sake of simplicity. However, data for two or more lines may be buffered.

The line buffer 803 comprises a FIFO (First In First Out) buffer 806 which stores data for one line of the previous line, and a register 805 which holds pixel data of a coordinate that is to undergo the tone correction processing. The pixel data stored in the register 805 is output to the tone corrector 804, and is also stored in the FIFO buffer 806 so as to be used in generation of correction data for the next line.

Let x (dots) be a coordinate in the main scan direction, Pn(x) be pixel data input from the register 805, and Pn−1(x) be pixel data input from the FIFO buffer 806. At this time, the tone corrector 804 executes the following arithmetic processing to generate correction data.

$$P'n(x)=Pn(x)*\beta(x)+Pn-1(x)*\alpha(x)$$

Note that the values α and β are acquired from the coordinate converter 802, as described above. The tone corrector 804 outputs the value of P'n(x) calculated by the above arithmetic processing to the halftone processing unit 409 as an image bitmap whose color discrepancy amount less than the pixel unit in the sub-scan direction is corrected.

Upon reception of image data that has undergone the color discrepancy correction from the tone corrector 804 (color discrepancy correcting unit 408), each of halftone processing units 409C, 409M, 409Y, and 409K (to be referred to as 409 together hereinafter) executes halftone processing using a predetermined halftone pattern. The processed image data is output to each of PWM (Pulse Wide (or Width) Modulation) units 410C, 410M, 410Y, and 410K (to be referred to as 410 together hereinafter).

Upon reception of the image data that has undergone the halftone processing, each PWM unit applies pulse width modulation processing to that image data, and outputs the processed data to the printer engine 401 as a drive signal. The printer engine 401 executes exposure processing on each photosensitive drum 14, development processing, transfer processing onto a transfer sheet, and the like based on the received drive signal.

In this embodiment, the tone corrector 804 performs bit expansion of input image data in addition to the aforementioned processing, and outputs the bit-expanded image data to the halftone processing unit 409 and PWM unit 410 to allow detailed image formation. The processing and effect of this tone corrector 804 will be described in detail below with reference to FIGS. 30A to 30H. FIGS. 30A to 30H are views for explaining the processing for assigning many bits to the number of bits of data output from the bitmap memory upon performing tone correction so as to obtain a higher-quality image.

In the example shown in FIGS. 30A to 30H, assume that each pixel of image data input to the tone corrector is expressed by 2 bits. FIG. 30A shows an image of a main scan line having a right upward inclination. FIG. 30B shows a bitmap image of a horizontal straight line before tone correction, and FIG. 30C shows a correction bitmap image of FIG. 30B to cancel color discrepancy due to the inclination of the main scan line in FIG. 30A. In order to realize the correction bitmap image in FIG. 30C, the exposure amounts of neighboring dots in the sub-scan direction are adjusted. FIG. 30D shows a list of Δy and corresponding values of k, α, and β. The values of α and β are calculated by the aforementioned equations (α=Δy−k and β=1−α).

The tone corrector 804 performs color discrepancy correction in less than the pixel unit based on the correction coefficients shown in, e.g., FIG. 30D. Furthermore, the tone corrector 804 executes processing for expanding the bit width of each pixel. The effect of the processing for expanding the bit width will be described below with reference to FIGS. 30E to 30H.

FIG. 30E shows a bitmap image on the photosensitive drum 14 when each pixel after tone correction is expressed by 2 bits, and FIG. 30F shows a bitmap image when each pixel after tone correction is expressed by 4 bits.

The correction coefficients shown in FIG. 30D are divided into a total of 10 gray levels. However, since the number of bits (bit width) in FIG. 30E is only 2 bits, each pixel value can only express up to four gray levels. Hence, the calculated correction value must be rounded to reduce the number of gray levels to four to express halftone. In this case, an exposed image on the photosensitive drum 14 is as shown in FIG. 30G.

By contrast, since the number of bits is expanded to 4 bits in FIG. 30F, each pixel value can express up to 16 gray levels. For this reason, the round error of the correction coefficients calculated in FIG. 30D can be reduced. In this case, an exposed image on the photosensitive drum 14 is as shown in FIG. 30H. As can be seen from comparison with FIG. 30G of 2 bits, an accurate, high-quality image can be obtained.

Assume that information about the expansion range of the number of bits per pixel is stored in a predetermined storage device, and the tone corrector 804 refers to this information upon bit expansion and controls the bit expansion processing based on that information. In the above description, input data is expressed by 2 bits. However, when the number of bits to be assigned to one pixel is increased using the same arrangement, the same effect can be obtained.

As described above, since the tone corrector 804 expands the bit width (the number of bits) per pixel and then outputs the data to the halftone processing unit, an accurate, detailed image can be formed even in an environment in which respective image forming units suffer color discrepancy. In the above arrangement, since the tone corrector 804 executes processing for expanding the bit width of each pixel, each pixel of image data to be input to the color discrepancy correcting unit may have a normal bit width. Therefore, according to the above arrangement, an accurate, detailed image can be formed without increasing the capacity of storage devices such as the bitmap memory 406, line buffer 803, and the like.

In the above arrangement, information about the expansion range of the number of bits per pixel is stored in the predetermined storage device. However, the embodiment of the present invention is not limited to such specific arrangement. For example, an instruction input device which serves as a user interface which can be operated by the user may be provided, an instruction input indicating the number of bits to be expanded or the like, and the bit expansion per pixel may be controlled based on this instruction input. With this arrangement, the user can easily set details and accuracy of image formation in accordance with the use application and purpose.

Sixth Embodiment

Conventionally, various methods of forming an electrostatic latent image by irradiating a photosensitive member with a light beam, and forming a visible image on a print medium by developing the latent image with toner in an image forming apparatus using an electrophotographic method have been proposed. Upon forming an image by such electrophotographic method, an image formed on the photosensitive member suffers distortion due to errors of the positional precision and diameter of the photosensitive member, and an positional precision error of an optical system. As a method of correcting such distortion in an image, a method of mechanically correcting the optical path of the optical system, and a method of correcting such distortion by applying image processing such as coordinate conversion or the like to an image may be used. However, these methods pose the following problems.

In order to correct the optical path of the optical system, a correction optical system including a light source and f-θ lens, a mirror in the optical path, and the like must be mechanically moved to adjust the position of the test toner image. However, for this purpose, high-precision movable members are required, resulting in high cost of the apparatus. Furthermore, since it takes much time until correction is completed, it is nearly impossible to frequently perform correction. However, the optical path length difference may change along with an elapse of time due to temperature rise of mechanical components. In such case, it becomes difficult to prevent any misalignment by correcting the optical path of the optical system.

In contrast to the aforementioned mechanical correction, attempts to cancel misalignment by converting image data are described in Japanese Patent Application Laid-Open No. 8-85236 (patent reference 3) and above patent reference 2 (Japanese Patent Application Laid-Open No. 8-85237).

Figure 31A:
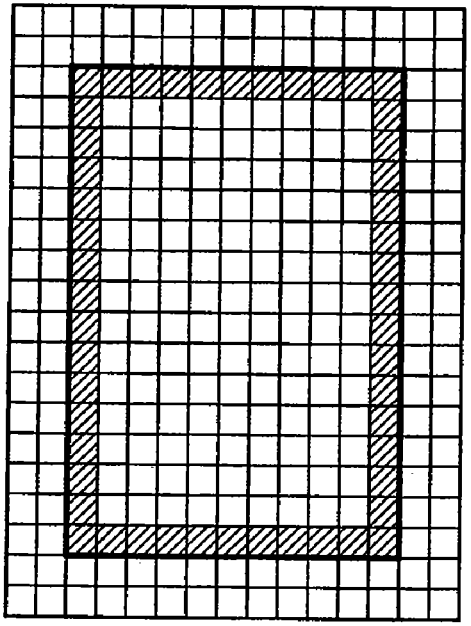
FIGS. 31A to 31D are views for explaining general image distortion correction.
Figure 31B:
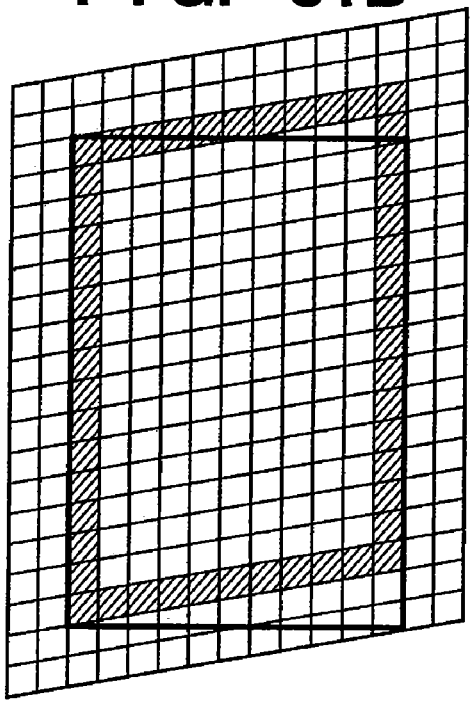
Figure 31C:
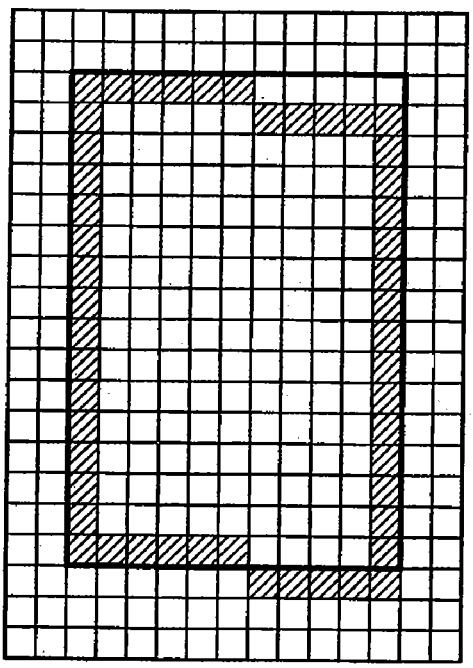
Figure 31D:
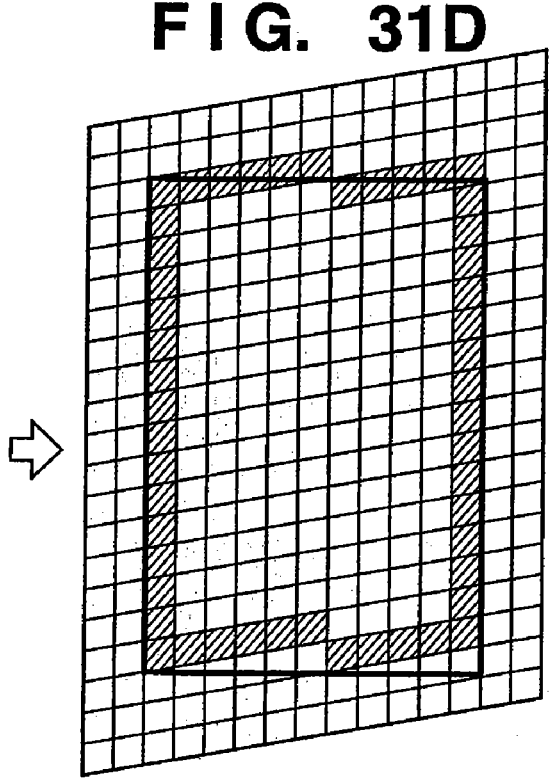

Patent reference 3 discloses an arrangement which automatically converts the output coordinate position of image data for each color into that whose registration error is corrected, and corrects the position of each light beam based on the converted image data for each color. For example, in a system in which an image shown in FIG. 31A is distorted, as shown in FIG. 31B, image data which has undergone position correction for each dot, as shown in FIG. 31C, is generated, and is printed to cancel the distortion. However, upon printing image data shown in FIG. 31C, an image with steps is formed, as shown in FIG. 31D, thus deteriorating image quality.

Patent reference 2 discloses an arrangement which automatically converts the output coordinate position of image data for each color into that whose registration error is corrected, and corrects the position of a light beam modulated based on the converted image data for each color in an amount smaller than the minimum dot unit of the color signal. However, with the method of patent reference 2, when the output coordinate position of image data for each color, which has undergone halftone processing, is corrected, the reproducibility of halftone dots of a halftone image deteriorates. As a result, color inconsistency may occur and moiré may become obvious.

Figure 32A:
FIGS. 32A to 32C are views for explaining occurrence of color inconsistency resulting from the general image distortion correction.
Figure 32B:
Figure 32C:
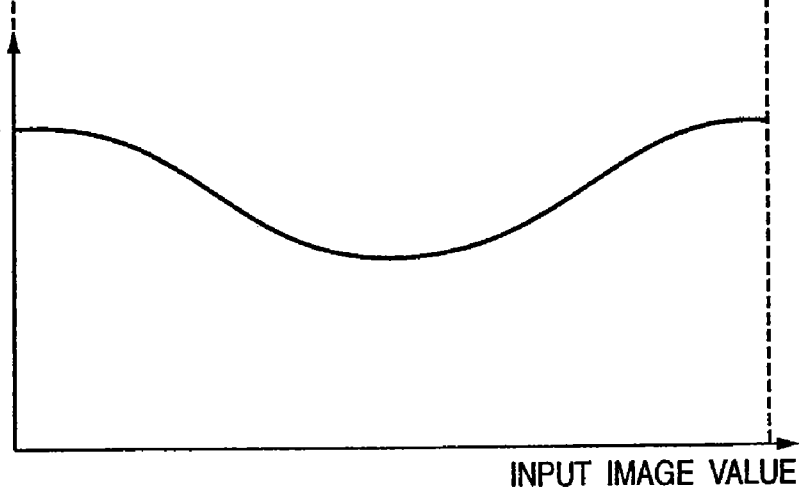

FIGS. 32A to 32C show an example. An input image shown in FIG. 32A has a constant density value. An image after color discrepancy correction shown in FIG. 32B is obtained by applying predetermined misalignment correction to the input image. In general, the relationship between the image density value and toner density corresponding to the image density value is not linear, as indicated by "toner density" shown in FIG. 32C. For this reason, when the image after color discrepancy correction in FIG. 32B is printed, although the input image in FIG. 32A has a constant density value, an image whose density value is not constant is printed. When such non-uniform density values are periodically repeated, moiré becomes obvious, and a high-quality color image cannot be obtained. Since correction is made by calculating correction amounts less than one pixel, the arrangement becomes complicated, resulting in high cost.

Japanese Patent Application Laid-Open No. 9-90695 (patent reference 4) discloses an arrangement which skips image correction in case of a monochrome image. However, if no correction is applied, an image which is distorted, as shown in FIG. 31B, is not corrected, and a high-quality image cannot be obtained.

Therefore, the sixth embodiment has as its object to provide an image forming apparatus which effectively corrects any image distortion by a simple arrangement, and can acquire a high-quality image with low cost.

Figure 33A:
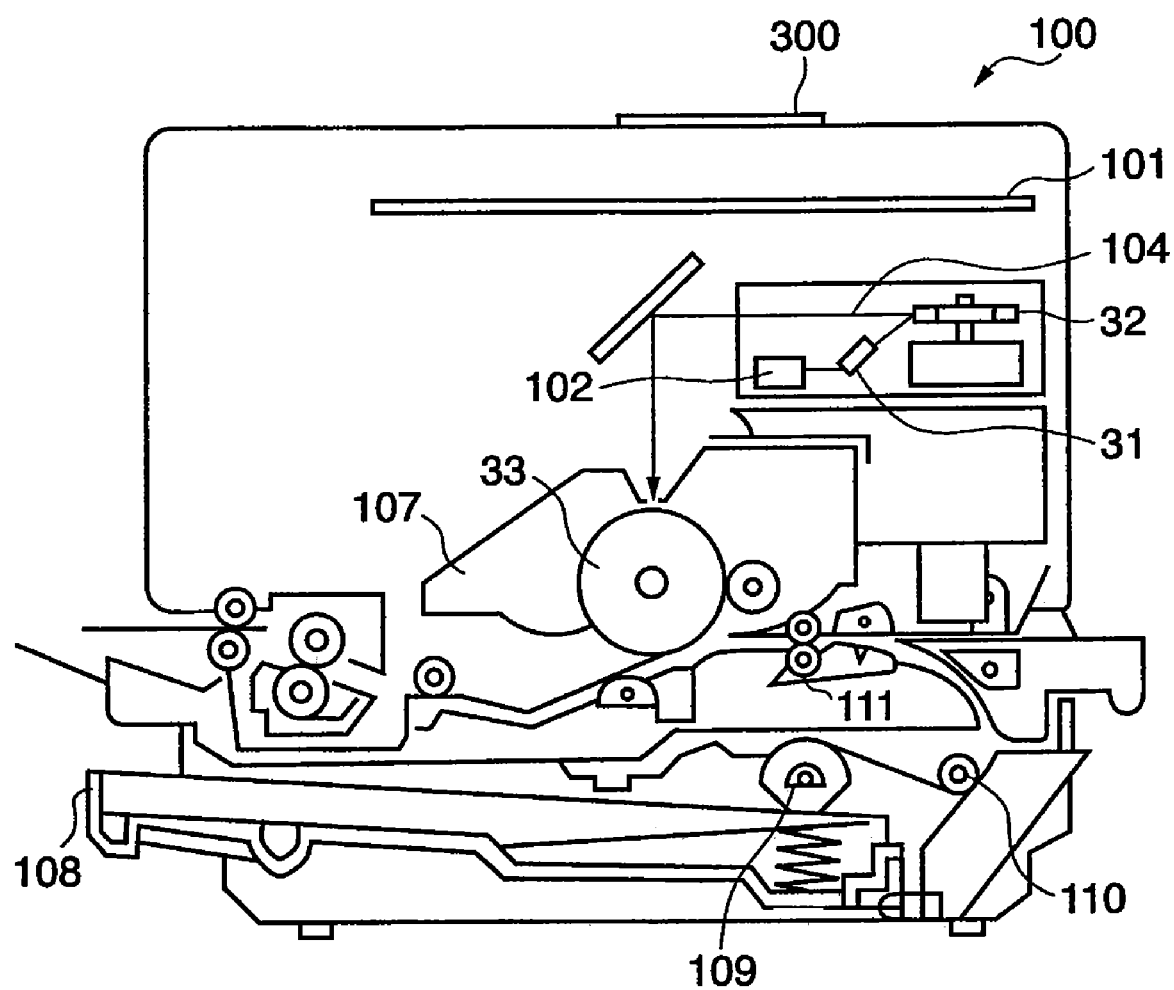
FIG. 33A is a sectional view showing the internal structure of an image forming apparatus according to the sixth embodiment of the present invention.

The arrangement of an image forming apparatus according to this embodiment will be described below with reference to FIG. 33A. FIG. 33A is a sectional view showing the internal structure of the image forming apparatus (laser beam printer) according to this embodiment.

Referring to FIG. 33A, an image forming apparatus 100 receives and stores print information (text codes, etc.), form information, macro commands, and the like, supplied from an externally connected host computer (not shown). After that, the apparatus 100 generates a corresponding text pattern, form pattern, or the like according to the received information, and forms a visible image on a print sheet as a print medium. Reference numeral 300 denotes a control panel on which operation switches, LED indicators, and the like are arranged; and 101, a printer controller which controls the overall image forming apparatus 100 and interprets text information and the like supplied from the host computer. The printer controller 101 mainly converts text information into a video signal of a text pattern, and outputs the converted video signal to a laser driver 102.

The laser driver 102 is a circuit for driving a semiconductor laser 31, and turns on/off a laser beam 104 emitted by the semiconductor laser 31 in accordance with the input video signal. This laser beam 104 is scanned in the right-and-left directions by a rotary polygonal mirror (polygon mirror) 32 to expose the surface of a photosensitive drum 33. As a result, an electrostatic latent image of the text pattern is formed on the photosensitive drum 33. This latent image is developed by a developing unit 107 arranged around the photosensitive drum 33, and is then transferred onto a print sheet. This print sheet uses a cut sheet, which is stored in a paper cassette 108 attached to the LBP (image forming apparatus) 100. The cut sheet is picked up into the apparatus by a paper feed roller 109 and guide rollers 110 and 111, and is fed to the photosensitive drum 33.

Figure 33B:
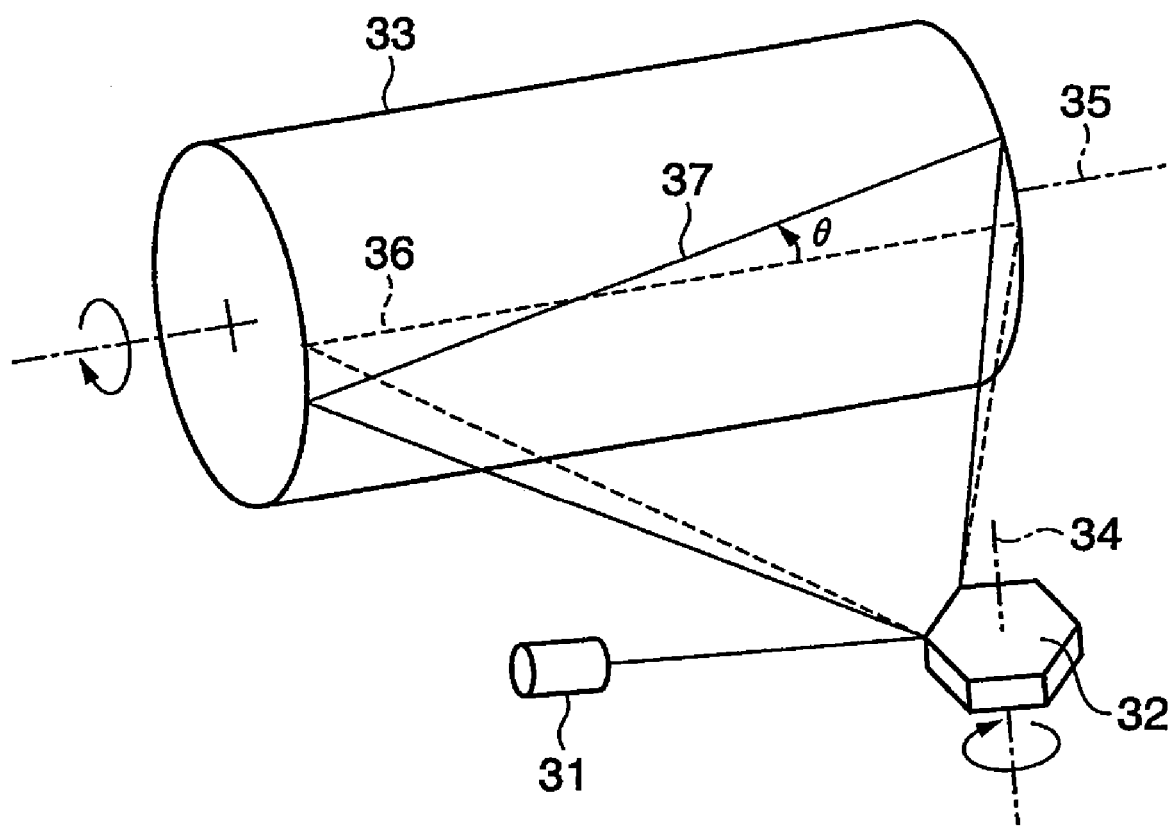
FIG. 33B is a view showing misalignment of an optical system in the image forming apparatus according to the sixth embodiment of the present invention.

FIG. 33B is a schematic view for explaining the arrangement of an optical system of the image forming apparatus 100 according to the sixth embodiment. Referring to FIG. 33B, the laser unit 31 turns on and off in accordance with a PWM signal generated by the printer controller 101 and laser driver 102. The polygon mirror 32 rotates about a rotational axis 34. A laser beam from the laser unit 31 is scanned in the main scan direction (direction of a rotational axis 35) upon rotation of the polygon mirror 32 to expose the surface of the photosensitive drum 33. The photosensitive drum 33 rotates about the rotational axis 35, and an electrostatic latent image corresponding to an image to be printed is formed on the photosensitive drum by exposure.

In such optical system, the positional precisions of the laser unit 31, polygon mirror 32, photosensitive drum 33, the rotational axis 34 of the polygonal mirror, and the rotational axis 35 of the photosensitive drum 33 are important. However, the mechanical positional precisions have limits, and a main scan line 37 of the laser beam on the photosensitive drum 33 has an inclination with respect to an ideal main scan line 36 parallel to the rotational axis 35 due to misalignment of these components. An arrangement for reducing an image distortion caused by such inclination of the main scan line will be described below.

Figure 34:
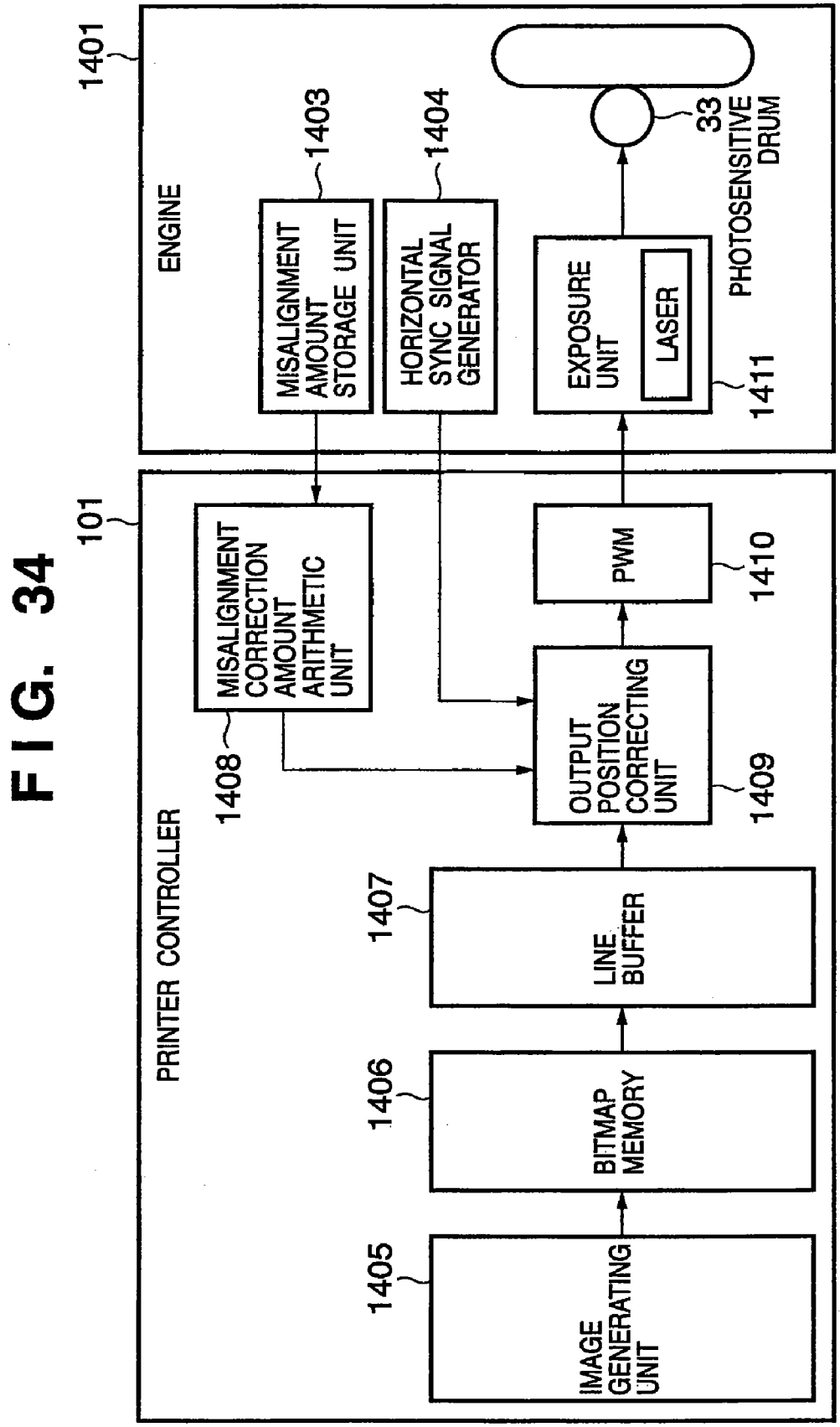
FIG. 34 is a block diagram showing the arrangement for position misalignment adjustment according to the sixth embodiment of the present invention.

FIG. 34 is a block diagram for explaining the control arrangement for implementing correction processing which is executed in the sixth embodiment and corrects the inclination of the main scan line.

Referring to FIG. 34, a printer engine 1401 executes actual print processing based on image bitmap information generated by the printer controller 101 (the laser driver 102, semiconductor laser 31, polygon mirror 32, photosensitive drum 33, paper feeding system, and the like in FIG. 33A). A horizontal sync signal generator 1404 outputs a signal for synchronizing a write start position in the main scan direction to the printer controller 101. A misalignment amount storage unit 1403 measures and stores information (angle θ) indicating the inclination of the actual main scan line 37 with respect to the ideal main scan line (35) shown in FIG. 33B.

In this embodiment, the angle θ is stored as information indicating the inclination of the main scan line. However, the present invention is not limited to this as long as the inclination of the actual main scan line is identifiable information. For example, (1) the fact that when a position advances x in the main scan line direction, it deviates y in the sub-scan direction ($\approx \tan \theta$), (2) the fact that when a position advances x in the main scan line direction, it deviates 1 in the sub-scan direction (substantially the same as (1)), (3) a product (Ly·sin θ) of a distance (Ly) between the main scan lines and the inclination, or the like may be held as information. As the information stored in the misalignment amount storage unit 1403, the misalignment amount (θ) is measured in the manufacturing processing of this image forming apparatus 100, and is pre-stored as information unique to the apparatus. Alternatively, the image forming apparatus 100 may comprise a known detection mechanism for detecting the misalignment amount. In this case, a predetermined pattern used to measure the misalignment amount is formed on the photosensitive drum 33, and the misalignment amount detected by the detection mechanism is stored in the misalignment amount storage unit 1403. If the arrangement comprising the detection mechanism is adopted, a change in characteristic of the image forming apparatus (exposure unit 1411) over time can be coped with.

The control for executing print processing by correcting the output position in the main scan direction to correct the misalignment amount of the main scan line stored in the misalignment amount storage unit 1403 in the printer controller 101 will be described below.

An image generating unit 1405 generates raster image data, which allows print processing, based on print data received from a computer (not shown) or the like, applies color conversion processing and the like to the raster image data, and stores the processed data in a bitmap memory 1406. The bitmap memory 1406 temporarily stores data to be printed, and comprises either a page memory that stores data for one page or a band memory that stores data for a plurality of lines. A line buffer 1407 holds line data read out from the bitmap memory 1406. Data held by the line buffer 1407 is read out by an output position correcting unit 1409 to be described later. A PWM unit 1410 generates amplitude modulation data according to the readout line data, and supplies it to the laser driver 102 of the exposure unit 1411. As a result, the semiconductor laser 31 of the exposure unit 1411 turns on and off according to the line data. Note that the exposure unit 1411 includes the laser driver 102, semiconductor laser 31, and polygon mirror 32.

In this embodiment, by adjusting the data read start timing from the line buffer 1407 by the output position correcting unit 1409 in accordance with the misalignment amount (θ), image distortion due to the inclination (θ) of the main scan line is reduced. This adjustment processing will be described in detail below.

Figure 37:
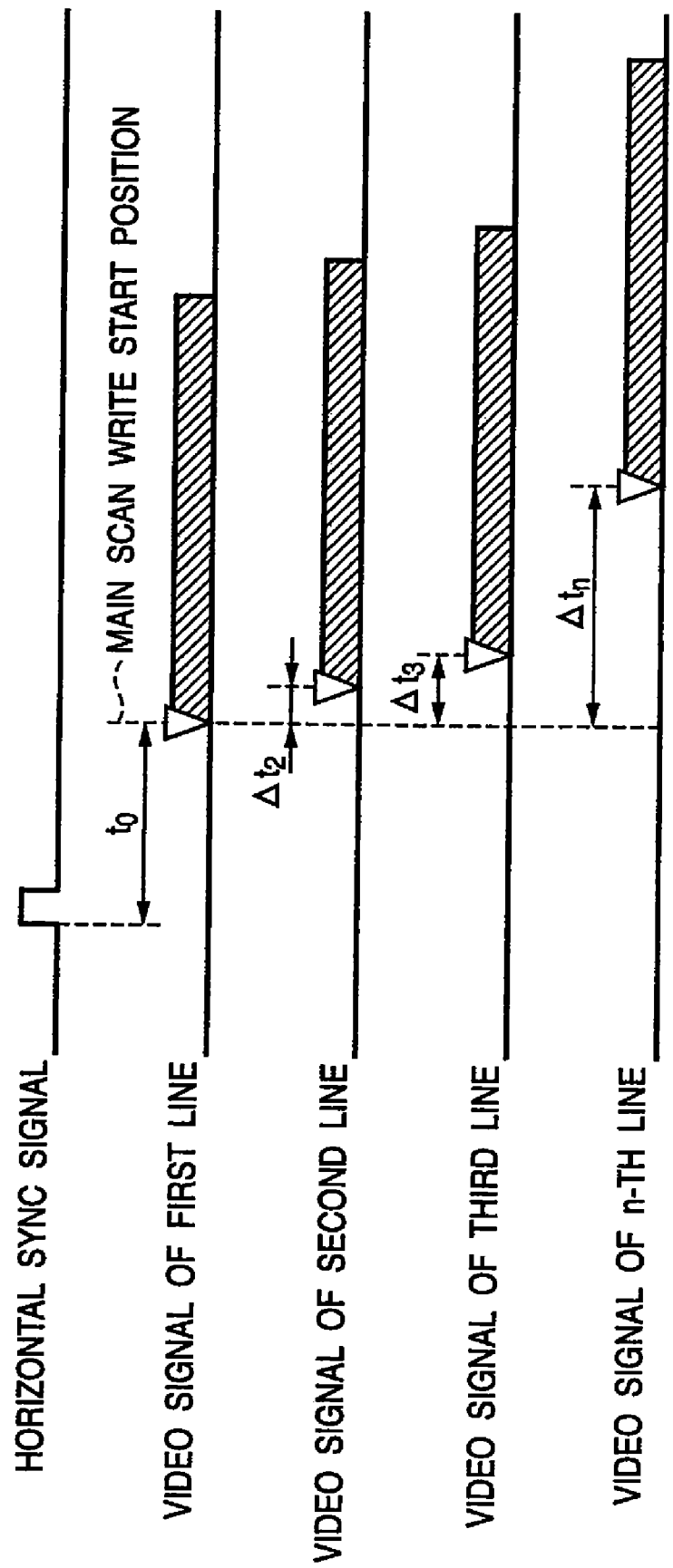
FIG. 37 is a timing chart showing the relationship between a video signal and horizontal sync signal according to the sixth embodiment of the present invention.

A misalignment correction amount arithmetic unit 1408 calculates a misalignment correction amount $\Delta x_n$ of a line to be currently output (n-th line) based on the inclination θ stored in the misalignment amount storage unit. The misalignment correction amount $\Delta x_n$ is given by:

$$\Delta x_n = Ly(n-1) \cdot \sin \theta$$

where $\Delta x_n$: the misalignment correction amount of the n-th line n: the currently scanned line number θ: the inclination of the scan line Ly: the distance (height of one pixel) between the scan lines The output position correcting unit 1409 adjusts the output start timing for each scan in accordance with the misalignment correction amount $\Delta x_n$ calculated in this way. FIG. 37 shows the timings of video signals output from the output position correcting unit 1409. A video signal of the first line is output a predetermined period $t_o$ after the horizontal sync signal. A video signal of the second line is output after a delay of $\Delta t_2$ compared to the first line. More specifically, an exposure scan starts $t_0 + \Delta t_2$ after the horizontal sync signal. A delay amount $\Delta t_n$ of a video signal of the n-th line is given by:

$$\Delta t_n = \Delta x_n \div (dx/dt)$$

where $\Delta x_n$: the misalignment correction amount of the n-th line (dx/dt): the laser scan speed The video signal, the timing of which is adjusted based on the above equation, is transmitted to the PWM unit 1410. The output from the PWM unit 1410 is sent to the exposure unit 1411 in the engine 1401, and the photosensitive drum in the engine 1401 is exposed by a laser beam of the laser unit, thus performing development and print processing. That is, a shift amount $\Delta x_n$ of the write start position of each scan line is determined based on the misalignment amount (angle θ), and the write start timing is delayed by $\Delta t_n$ to attain the determined shift amount.

Figure 36:
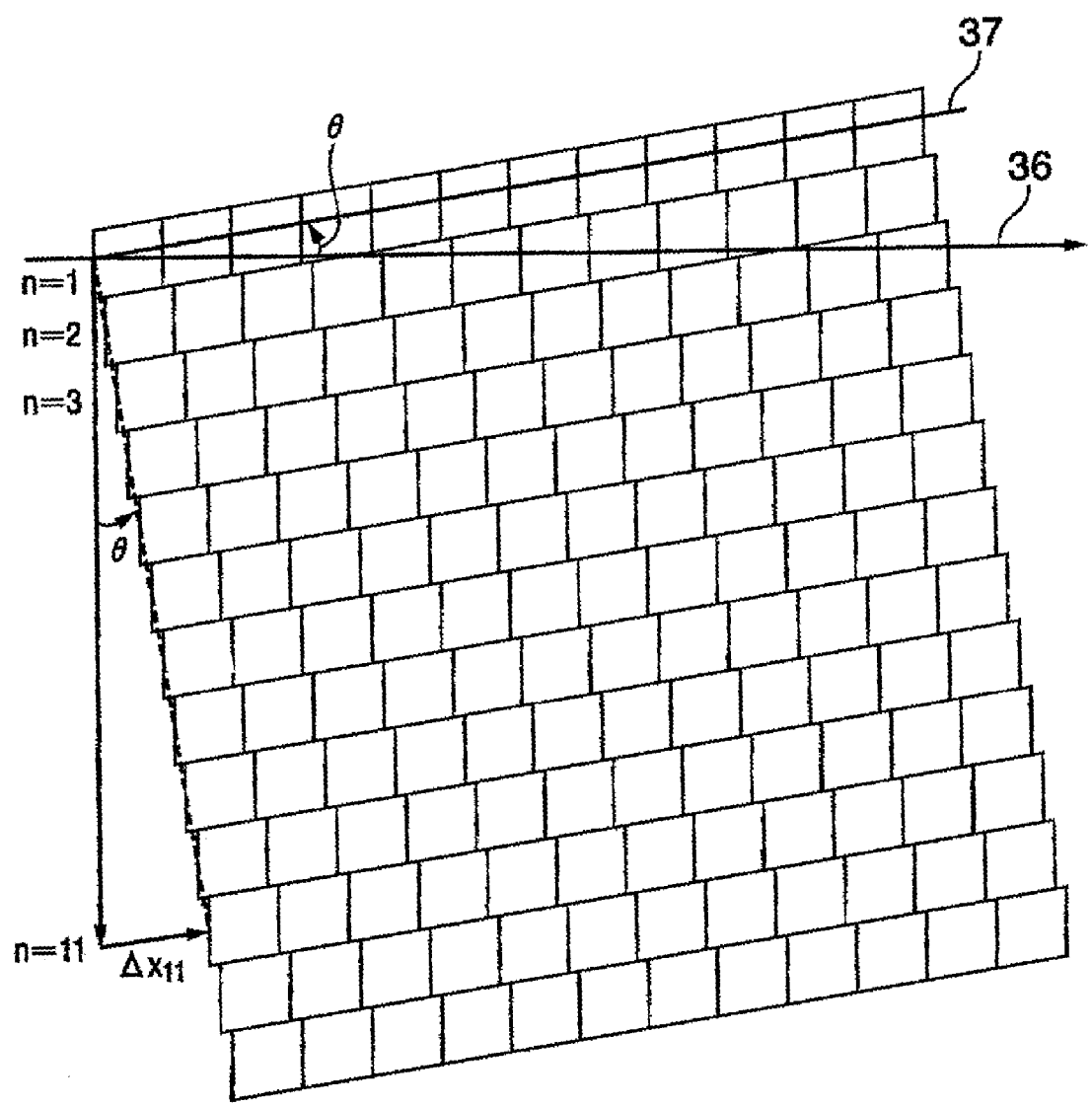
FIG. 36 is a view for explaining details of adjustment of a scan start position according to the sixth embodiment of the present invention.

FIG. 36 is a view for explaining the correction state according to this embodiment in detail. Referring to FIG. 36, the main scan line of the laser beam has an inclination with respect to the ideal main scan line 36 parallel to the rotational axis 35. The aforementioned correction control corresponds to processing for shifting the main scan start position by Ly·sin θ for respective lines. Therefore, for a line of, e.g., n=11, the correction amount is $\Delta x_{11} = Ly \times 10 \times \sin \theta$.

Figure 35A:
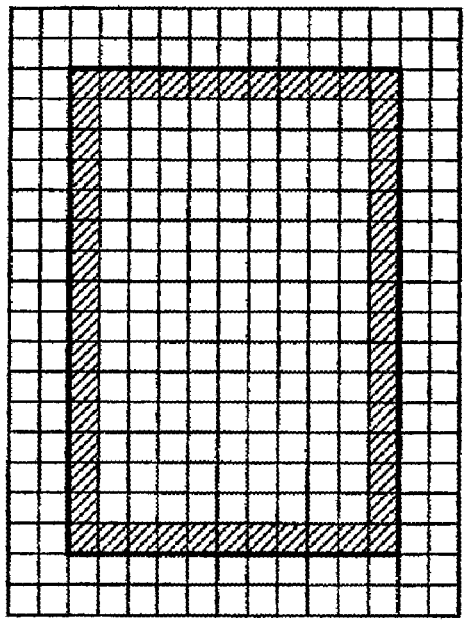
FIGS. 35A to 35C are views for explaining image distortion correction according to the sixth embodiment of the present invention.
Figure 35B:
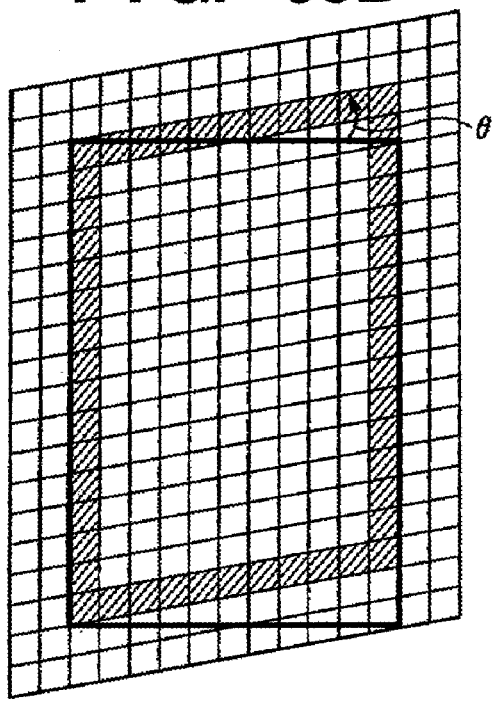
Figure 35C:
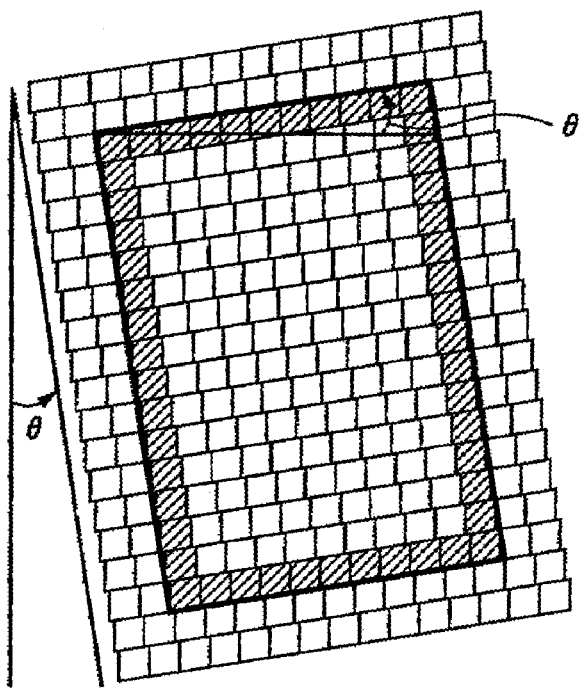

An image output via the aforementioned process becomes an image whose output positions are gradually shifted, as shown in FIG. 35C. This image has an inclination θ with respect to the sub-scan direction as a print direction. A distortion generated in an image which does not undergo any correction, as shown in FIG. 35B, is canceled, and a high-quality image approximate to an ideal image shown in FIG. 35A can be obtained. That is, the entire image has an inclination with respect to a paper sheet, but the distortion of the image itself can be reduced.

Seventh Embodiment

The sixth embodiment has exemplified the monochrome image forming apparatus. However, the present invention can be applied to a color image forming apparatus. Application of the present invention to a color image forming apparatus which comprises independent exposure units and photosensitive drums for respective color components will be described below.

Figure 38:
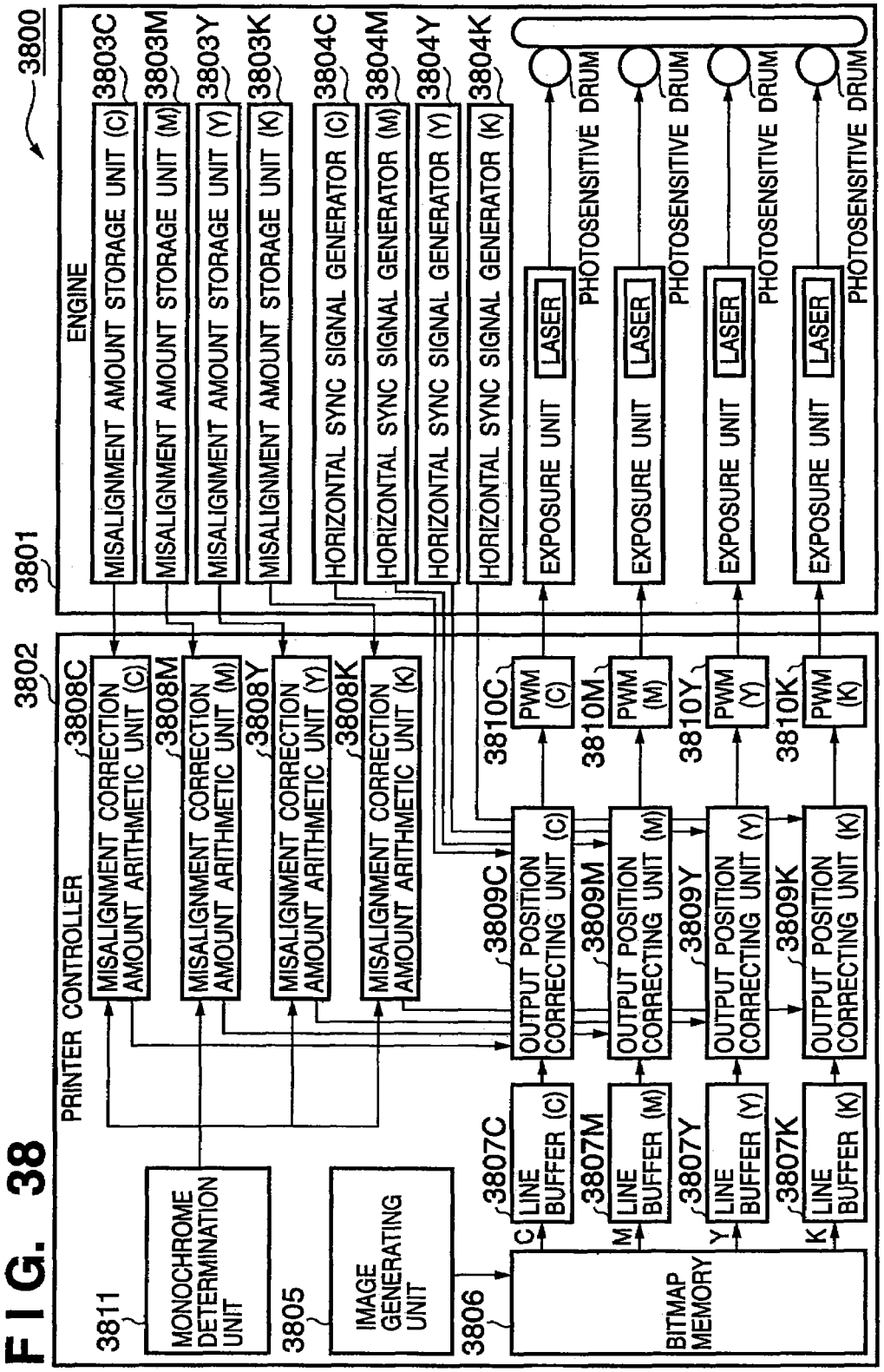
FIG. 38 is a block diagram showing the arrangement according to the seventh embodiment of the present invention.

FIG. 38 is a block diagram for explaining the correction processing operation for correcting the inclination of a scan line in a color image forming apparatus 3800 of the seventh embodiment. The arrangement shown in FIG. 38 is obtained by developing the arrangement shown in FIG. 34 for a color image forming apparatus. That is, in this arrangement, the arrangement shown in FIG. 34 is prepared in correspondence with respective color components (cyan (C), magenta (M), yellow (Y), and black (K) in this example). In the color image forming apparatus 3800, a plurality of color signals are generated by a printer controller 3802, and are transmitted to a printer engine 3801.

The printer engine 3801 executes print processing in practice based on image bitmap information generated by the printer controller 3802. Reference numerals 3804C, 3804M, 3804Y, and 3804K denote horizontal sync signal generators, which output horizontal sync signals for synchronizing write start positions in the main scan direction to the printer controller 3802 for respective color components to be printed. Reference numerals 3803C, 3803Y, 3803M, and 3803K denote misalignment amount storage units, which store angles θ, each of which indicates the inclination of the main scan line 37 of the laser beam with respect to the ideal main scan line 35, for respective color components, as shown in FIG. 33B.

In the seventh embodiment, the angle θ is stored as information indicating the inclination of the main scan line. However, the present invention is not limited to this as long as the inclination of the actual main scan lien is identifiable information. As the information stored in each of the misalignment amount storage units 3803C, 3803M, 3803Y, and 3803K, the misalignment amount may be measured in the manufacturing processing of this apparatus, and may be pre-stored as information unique to the apparatus. Alternatively, the image forming apparatus 3800 may comprise detection mechanisms each for detecting the misalignment amount in correspondence with the photosensitive drums. In this case, the misalignment amounts on the respective photosensitive drums detected by the detection mechanisms are stored in the misalignment amount storage units 3803C, 3803M, 3803Y, and 3803K. If the arrangement comprising the detection mechanisms is adopted, a change in characteristic of the image forming apparatus (exposure units) over time can be coped with.

The control for executing print processing by correcting the output position in the main scan direction to correct the misalignment amount of the main scan line stored in each of the misalignment amount storage units 3803C, 3803M, 3803Y, and 3803K in the printer controller 3802 will be described below.

An image generating unit 3805 generates raster image data, which allows print processing, based on print data received from a computer (not shown) or the like, applies color conversion processing and the like to the raster image data, and stores the processed data in a bitmap memory 3806. The bitmap memory 3806 temporarily stores data to be printed, and comprises either a page memory that stores data for one page or a band memory that stores data for a plurality of lines. Line buffers 3807C, 3807M, 3807Y, and 3807K hold line data read out from the bitmap memory 3806 for respective color components. Data held by the line buffers 3807C, 3807M, 3807Y, and 3807K are read out by output position correcting units 3809C, 3809M, 3809Y, and 3809K (to be described later) for respective color components.

A monochrome determination unit 3811 determines based on data used when the image generating unit 3805 generates an image or based on print data sent from a computer (not shown) whether or not an image is to be printed using only one of a plurality of colors. When the monochrome determination unit 3811 determines that the image is to be printed using only one color, only a misalignment correction amount arithmetic unit corresponding to the color to be used is activated, and misalignment amount correction described in the sixth embodiment is executed. That is, one of misalignment correction amount arithmetic units 3808C, 3808M, 3808Y, and 3808K corresponding to the use color acquires an inclination θ from the corresponding one of the misalignment amount arithmetic units 3808C, 3808M, 3808Y, and 3808K, and calculates a misalignment correction amount $\Delta x_n$. As described in the sixth embodiment, one of output position correcting units 3809C, 3809M, 3809Y, and 3809Y corresponding to the use color determines $\Delta t_n$ in accordance with $\Delta x_n$, and adjusts the output timing of a video signal (main scan start timing).

On the other hand, when an image is to be printed using a plurality of colors, the monochrome determination unit 3811 inhibits all the misalignment correction amount arithmetic units 3808C, 3808M, 3808Y, and 3808K from executing a misalignment correction operation. The misalignment correction amount arithmetic units 3808C, 3808M, 3808Y, and 3808K whose misalignment correction operation is inhibited always output $\Delta x_n = 0$. Of course, the output position correcting units 3809C, 3809M, 3809Y, and 3809Y may perform through operations not to apply any correction. The reason why the misalignment correction is skipped in case of a plurality of colors is as follows. In the arrangement which has the photosensitive drums for respective color components, the directions and magnitudes of the skews or inclinations of images are different for respective color components. For this reason, the correction amounts are different for the respective color components, and color discrepancy or the like occurs if misalignment correction is done, thus worsening the image quality. In this case, when an image is corrected using coordinate conversion processing or the like, the same image quality as in the conventional method can be obtained.

As described above, in the color image forming apparatus as well, a high-quality image can be obtained by the same processing as in the sixth embodiment.

Eighth Embodiment

In the seventh embodiment, the misalignment correction amount arithmetic units and output position correcting units are prepared in correspondence with colors. However, the misalignment correction is done only when the monochrome determination unit 3811 determines that an image is to be formed using only one color. That is, since the misalignment correction is always applied to one color, an arrangement which has a misalignment correction amount arithmetic unit and output position correcting unit common to all the colors may be adopted.

Figure 39:
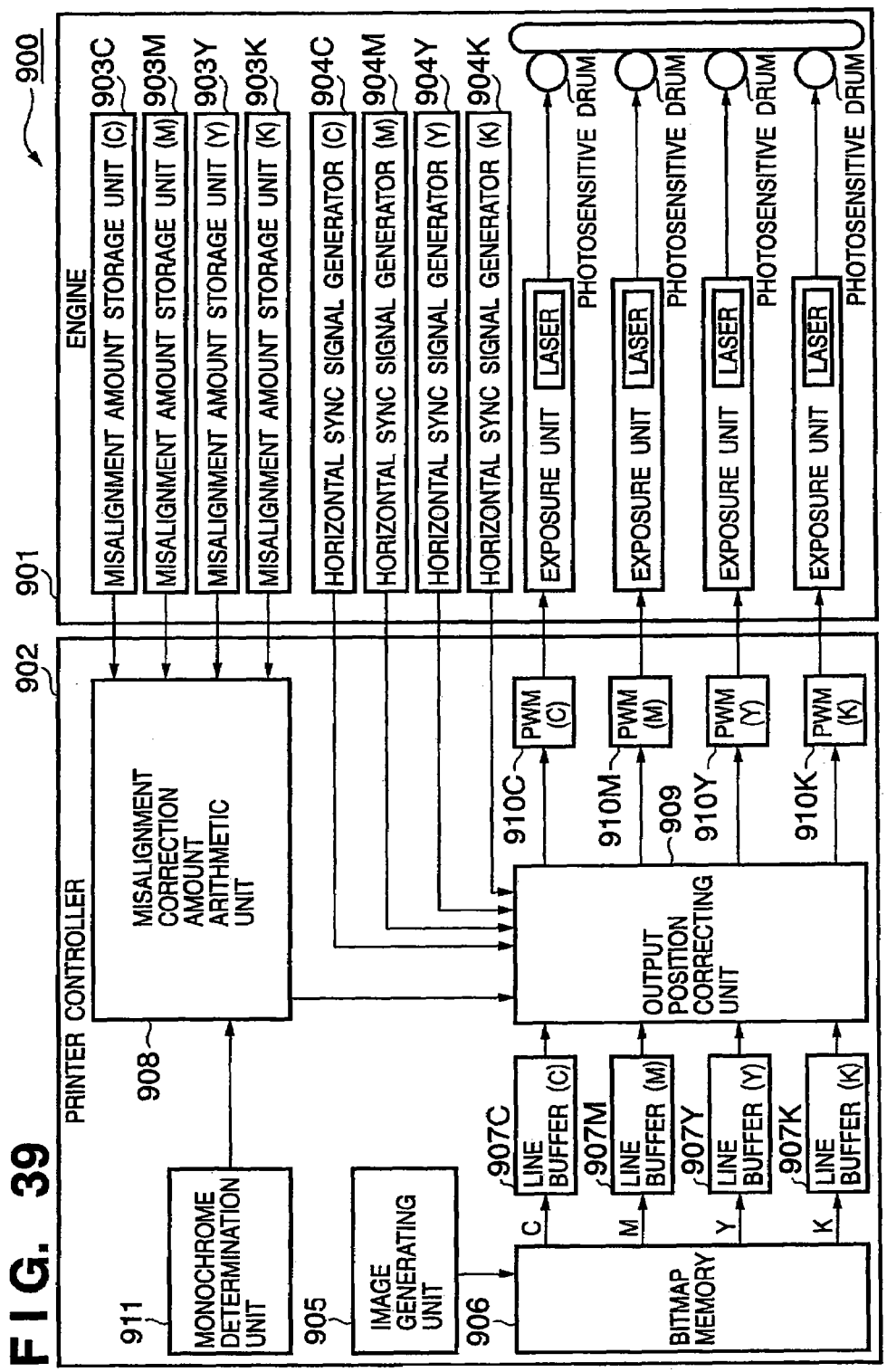
FIG. 39 is a block diagram showing the arrangement according to the eighth embodiment of the present invention.

FIG. 39 is a block diagram showing the arrangement which has a misalignment correction amount arithmetic unit and output position correcting unit common to all the color components. In this arrangement, a monochrome determination unit 911 determines whether or not a monochrome image is to be formed, and outputs information of a color component to be output (a color component to be used) to a misalignment correction amount arithmetic unit 908. The misalignment correction amount arithmetic unit 908 reads out a misalignment amount ($\theta$) from one of misalignment amount storage units 903C, 903M, 903Y, and 903K corresponding to the color component to be output, and performs a correction arithmetic operation. An output position correcting unit 909 corrects an output position in accordance with the correction arithmetic operation result of the misalignment correction amount arithmetic unit 908. In this manner, misalignment correction can be done in the same manner as in the sixth and seventh embodiments.

According to the eighth embodiment, since the misalignment correction amount arithmetic unit and output position correcting unit are commonly used, cost can be reduced compared to the seventh embodiment.

Ninth Embodiment

In the sixth to eighth embodiments, the misalignment correction amount arithmetic unit calculates misalignment correction amounts for all pixels independently of a horizontal sync signal. For example, in the sixth embodiments the output position correcting unit 1409 calculates a delay time based on the misalignment correction amount calculated by the misalignment correction amount arithmetic unit 1408. Then, each scan start timing is determined by adding the calculated delay time to the scan start timing with reference to the horizontal sync signal.

Figure 40:
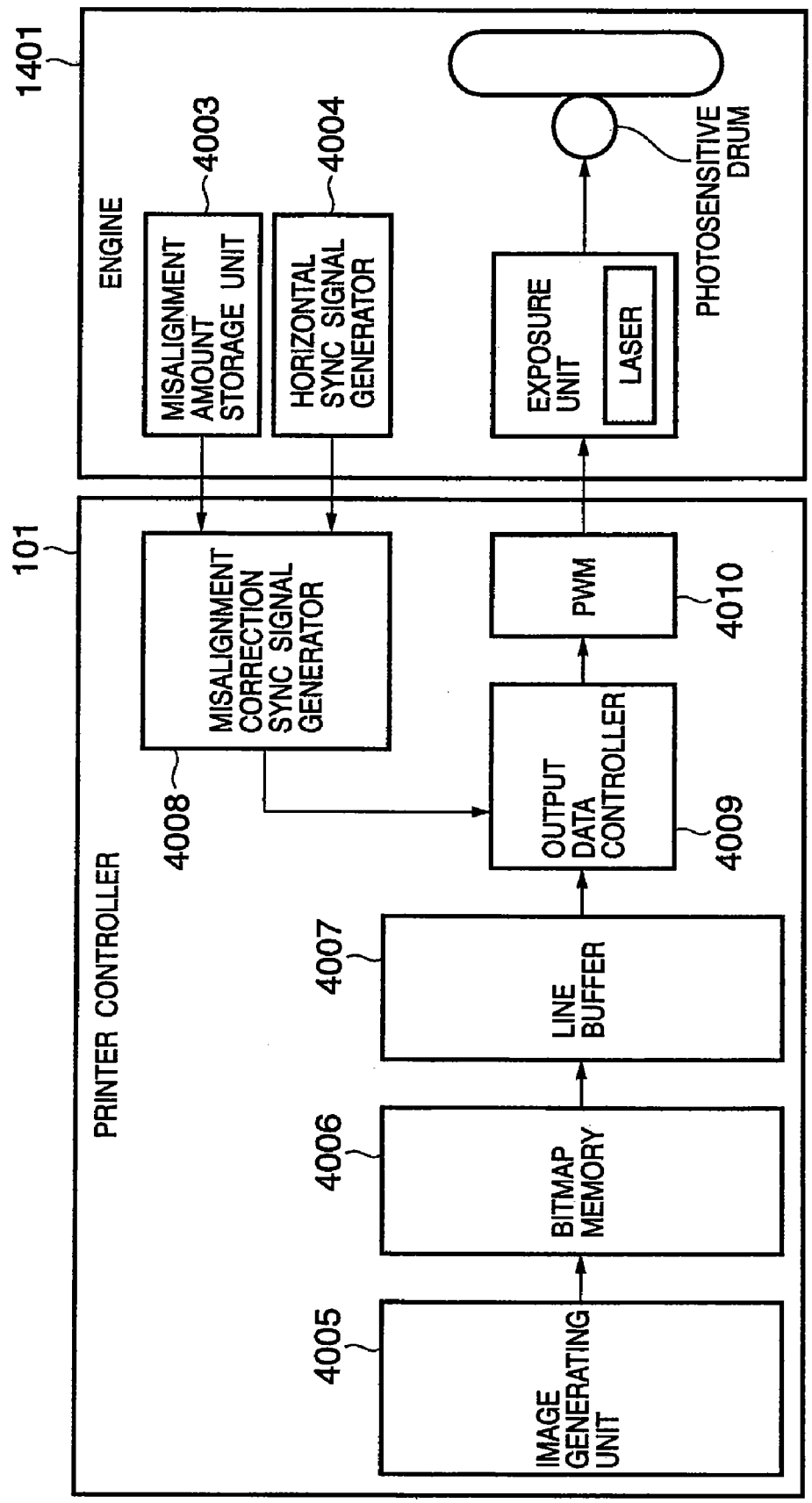
FIG. 40 is a block diagram showing the arrangement according to the ninth embodiment of the present invention.

In the ninth embodiment, the timing of the horizontal sync signal is corrected in accordance with the arithmetic result of the misalignment correction amount arithmetic unit (to shift the horizontal sync signal for each line). FIG. 40 is a block diagram for explaining the control arrangement for implementing correction processing that corrects the inclination of the main scan line according to the ninth embodiment.

Referring to FIG. 40, the printer engine 1401 executes actual print processing based on image bitmap information generated by the printer controller 101, as in FIG. 34. In FIG. 40, a misalignment correction sync signal generator 4008 executes the same processing as that of the misalignment correction amount arithmetic unit 1408 of the sixth embodiment. That is, the generator 4008 calculates a misalignment correction amount $\Delta x_n$ of a line to be currently output (n-th line) based on an inclination $\theta$ stored in a misalignment amount storage unit 4003, and calculates a delay amount $\Delta t_n$ of a video signal. Furthermore, the misalignment correction sync signal generator 4008 generates a horizontal sync signal for the n-th line, which is delayed $\Delta t_n$ from an actual horizontal sync signal using the calculated delay amount $\Delta t_n$ of the video signal and the horizontal sync signal from a horizontal sync signal generator 4004. The generated horizontal sync signal is sent to an output data controller 4009. The output data controller 4009 reads out data from a line buffer 4007 in synchronism with the horizontal sync signal for the n-th line received from the misalignment correction sync signal generator 4008, and transmits it as a video signal to a PWM unit 4010.

Figure 41:
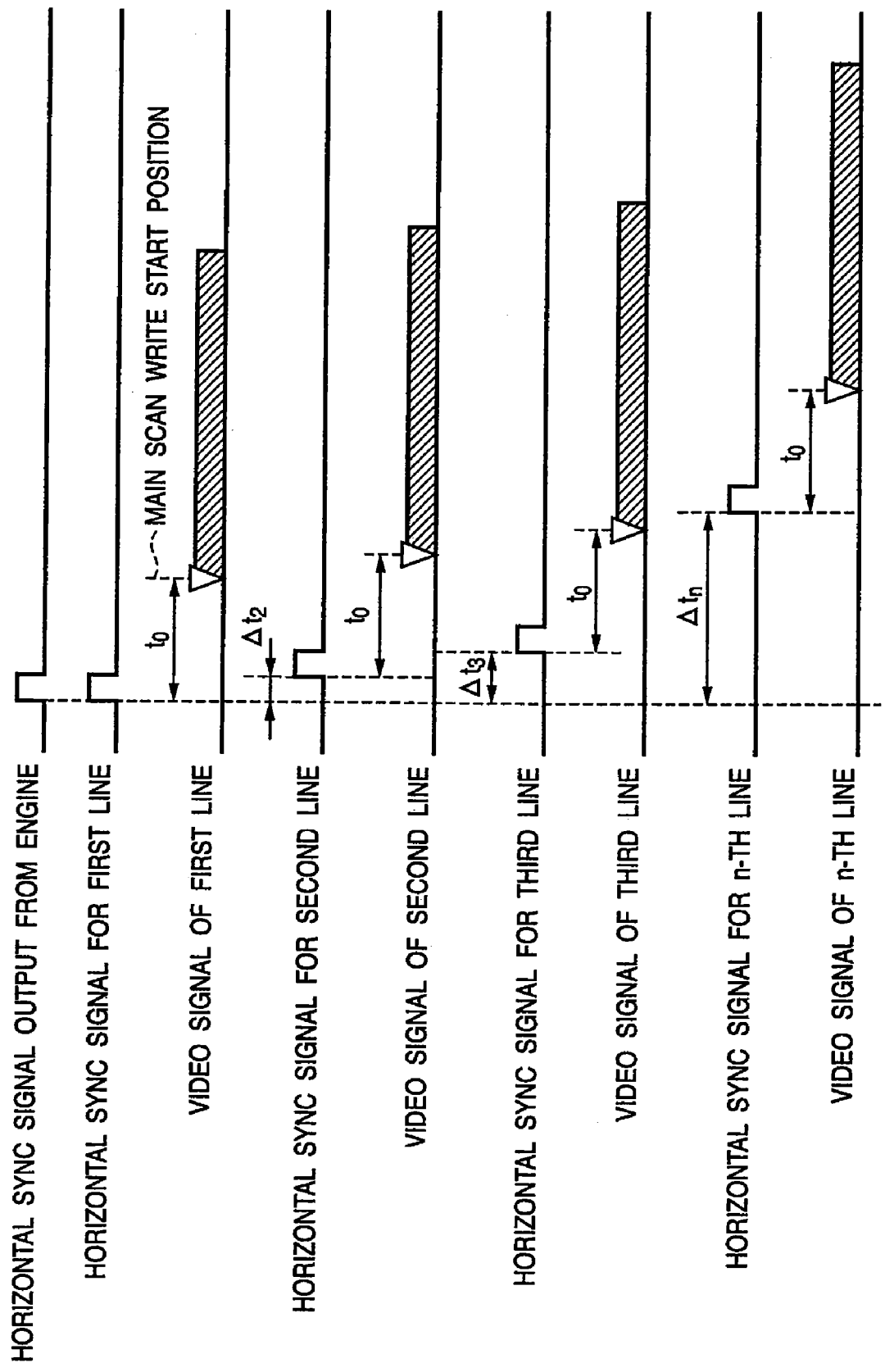
FIG. 41 is a timing chart showing the relationship between a video signal and horizontal sync signal according to the ninth embodiment of the present invention.

FIG. 41 shows the relationship between the horizontal sync signals and video signals according to the ninth embodiment. A video signal of each line is output in synchronism with the horizontal sync signal for the corresponding line output from the misalignment correction sync signal generator 4008. In this way, misalignment correction can be done as in the sixth embodiment.

Tenth Embodiment

Figure 42:
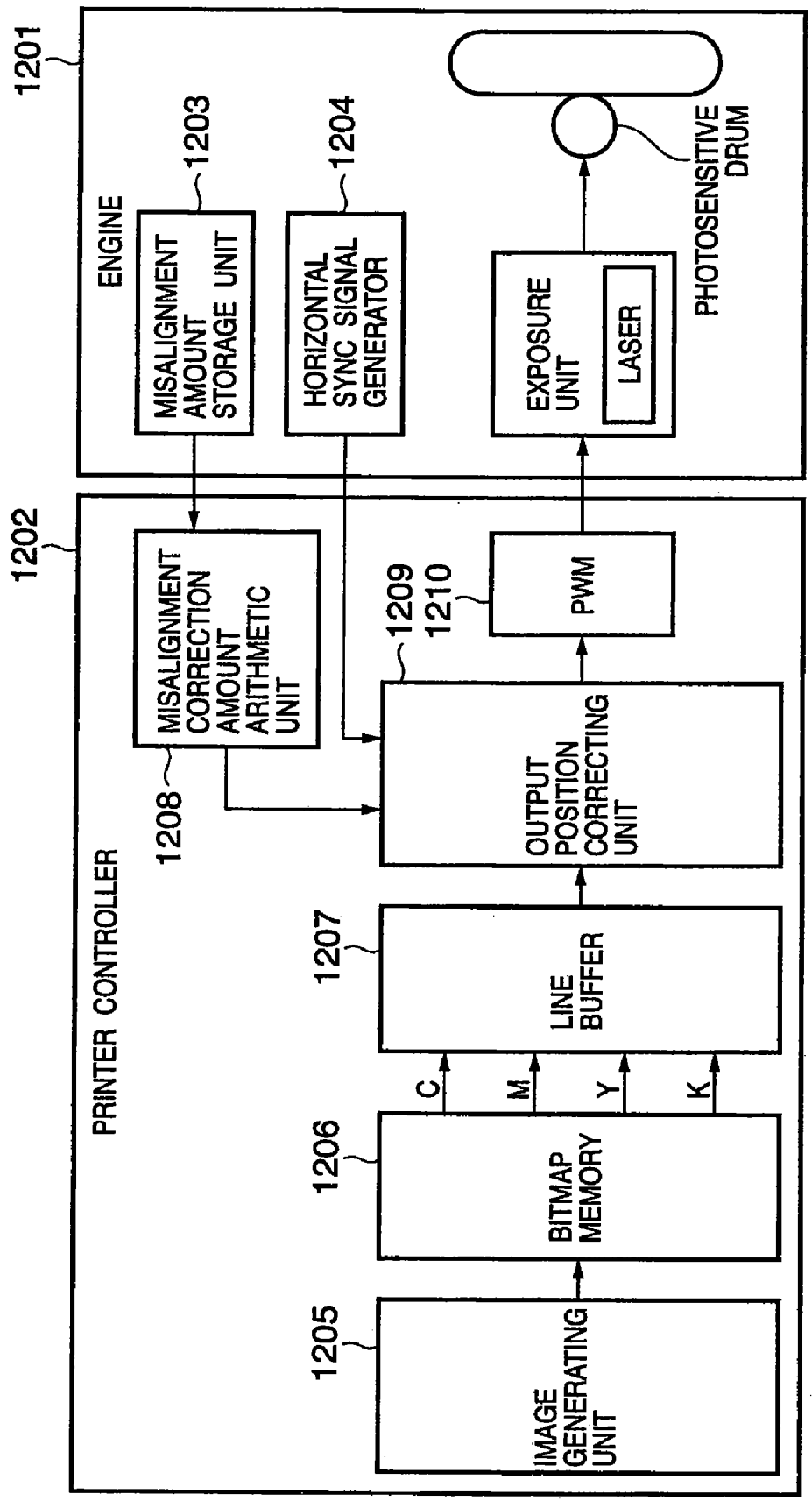
FIG. 42 is a block diagram showing the arrangement according to the tenth embodiment of the present invention.

In the seventh and eighth embodiments, misalignment correction is made when an image is to be printed using one color. In a printer which forms a color image by a 4-pass method, misalignment correction may be made when an image is to be printed using a plurality of colors. FIG. 42 is a block diagram showing the arrangement which performs misalignment correction in the printer of the 4-pass method. In the arrangement shown in FIG. 42, image data of C, M, Y, and K colors saved in a bitmap memory 1206 are read out onto a line buffer 1207 for each color. The write start position of the readout data is corrected by an output position correcting unit 1209, and the corrected data is output to a PWM unit 1210. The PWM data output from the PWM unit 1210 is exposed and developed. In the printer which has a photosensitive drum and exposure unit common to all the color components (e.g., the printer of the 4-pass method), all colors suffer identical misalignment amounts and, hence, the inclination angles match. Therefore, the misalignment amount and misalignment correction amount are common to all the colors. For this reason, when the misalignment correction described in the sixth embodiment is applied to the printer of the 4-pass method, misalignment correction can be done even in case of color printing.

Note that the arithmetic operations of the misalignment correction amount and scan start timing in the sixth to ninth embodiments may be implemented by dedicated hardware or may be implemented when a CPU executes a predetermined control program.

In the description of the above embodiments, $\theta$ is positive (rotation in the counterclockwise direction). However, as can be seen from the above description, the present invention can be applied to a case in which $\theta$ is negative. When $\theta$ is negative, $\Delta t_n$ also becomes negative, the time $t_o$ between the horizontal sync signal to each main scan write start timing becomes shorter with increasing line number (n) in, e.g., FIG. 37. In the ninth embodiment (FIG. 41) that controls the sync signal timing itself, the interval of the horizontal sync signals changes in a direction to decrease.

According to the sixth to tenth embodiments, image distortion can be effectively removed by a simple arrangement that shifts the write start position of each scan line based on a misalignment amount according to an epoch-making idea that allows to print an image aslant on a print sheet and gives top priority to removal of image distortion. More specifically, in an image forming apparatus which forms an image by radiating a laser beam, the output pixel position in the main scan direction is shifted to cancel image distortion caused by errors of the positional precisions and rotational axis of the apparatus without using any complicated processing and arrangement. In this way, a high-quality image can be obtained with low cost. The scan start position can be obtained by an arithmetic operation, as given by $\Delta t_n$, and can be shifted in a unit smaller than one pixel. Therefore, delicate misalignment adjustment smaller than one pixel can be implemented.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-112657 filed on Apr. 8, 2005, Japanese Patent Application No. 2005-112658 filed on Apr. 8, 2005, Japanese Patent Application No. 2005-118972 filed on Apr. 15, 2005, Japanese Patent Application No. 2005-118973 filed on Apr. 15, 2005, Japanese Patent Application No. 2005-118974 filed on Apr. 15, 2005, and Japanese Patent Application No. 2005-118975 filed on Apr. 15, 2005, which are hereby incorporated by reference herein in its entirety.

What is claimed is:

1. A color image forming apparatus which comprises, in correspondence with colors, image forming units, each of which has a photosensitive member as an image carrier, an exposure unit that forms an electrostatic latent image by irradiating the photosensitive member with a light beam modulated according to a color signal, a developing unit that visualizes the electrostatic latent image formed on the photosensitive member by the exposure unit, and a transfer unit that transfers each color image visualized by the developing unit onto a transfer material, the apparatus comprising:
   a color discrepancy amount storage unit configured to store information of a color discrepancy amount of each of the image forming units, which is measured in advance;
   a first color discrepancy correcting unit configured to perform color discrepancy correction in a pixel unit by performing coordinate conversion of bitmap data to be printed based on the information of the color discrepancy amount stored in said color discrepancy amount storage unit; and
   a second color discrepancy correcting unit configured to perform color discrepancy correction in less than a pixel unit by performing tone correction of the bitmap data corrected by said first color discrepancy correcting unit based on the information of the color discrepancy amount stored in said color discrepancy amount storage unit.

2. The apparatus according to claim 1, wherein the information of the color discrepancy amount indicates a discrepancy amount in a sub-scan direction of an actual main scan line with respect to an ideal main scan line scanned on the photosensitive member.

3. The apparatus according to claim 1, wherein said first color discrepancy correcting unit offsets a coordinate in a sub-scan direction of the bitmap data by an amount corresponding to a position of the coordinate in a unit of the number of dots in a main scan direction corresponding to the color discrepancy amount.

4. The apparatus according to claim 1, wherein said second color discrepancy correcting unit distributes a density of each dot to neighboring dots in a sub-scan direction at predetermined distribution ratios in a unit of the number of dots in a main scan direction corresponding to the color discrepancy amount, for the bitmap data which is corrected by said first color discrepancy correcting unit.

5. A color image forming apparatus which comprises, in correspondence with colors, image forming units, each of which has a photosensitive member as an image carrier, an exposure unit that forms an electrostatic latent image by irradiating the photosensitive member with a light beam modulated according to a color signal, a developing unit that visualizes the electrostatic latent image formed on the photosensitive member by the exposure unit, and a transfer unit that transfers each color image visualized by the developing unit onto a transfer material, the apparatus comprising:
   a color discrepancy amount storage unit configured to store information of a color discrepancy amount of each of the image forming units, which is measured in advance;
   a first color discrepancy correcting unit configured to perform color discrepancy correction in a pixel unit by performing coordinate conversion of bitmap data to be printed based on the information of the color discrepancy amount stored in said color discrepancy amount storage unit; and
   a second color discrepancy correcting unit configured to perform color discrepancy correction in less than a pixel unit by performing tone conversion of only a fixed number of pixels, near a dot at a position where a correction value of said first color discrepancy correcting unit is switched, of the bitmap data corrected by said first color discrepancy correcting unit.

6. The apparatus according to claim 5, wherein the information of the color discrepancy amount indicates a discrepancy amount in a sub-scan direction of an actual main scan line with respect to an ideal main scan line scanned on the photosensitive member.

7. The apparatus according to claim 5, wherein said first color discrepancy correcting unit offsets a coordinate in a sub-scan direction of the bitmap data by an amount corresponding to a position of the coordinate in a unit of the number of dots in a main scan direction corresponding to the color discrepancy amount.

8. The apparatus according to claim 5, wherein said second color discrepancy correcting unit distributes a density of each dot to neighboring dots in a sub-scan direction at predetermined distribution ratios in a unit of the number of dots in a main scan direction corresponding to the color discrepancy amount, for only the fixed number of pixels, near the dot at the position where the correction value of said first color discrepancy correcting unit is switched, of the bitmap data which is corrected by said first color discrepancy correcting unit.

9. A color image forming apparatus in which a plurality of image stations, each of which has a photosensitive member, an exposure unit that forms an electrostatic latent image by irradiating the photosensitive member with a light beam modulated according to each color signal, a developing unit that visualizes the electrostatic latent image formed on the photosensitive member by the exposure unit, and a transfer unit that transfers each color image visualized by the developing unit onto a transfer material, are juxtaposed, and color images formed by the respective image stations are transferred in turn onto a transfer member conveyed by a feeding unit to form a color image, the apparatus comprising:
   a color discrepancy amount storage unit configured to store discrepancy amounts of images to be formed by the image stations in correspondence with the image stations;

an arithmetic unit configured to calculate a discrepancy correction amount of a dot to be formed based on the discrepancy amount stored in said color discrepancy amount storage unit and a position of the dot to be formed;

a dot position conversion unit configured to correct a position where the dot is formed based on the discrepancy correction amount calculated by said arithmetic unit; and a control unit configured to control image formation in the image stations so as to form the dot at a position corrected by said dot position conversion unit.

10. The apparatus according to claim 9, wherein said color discrepancy amount storage unit stores a deviation of a main scan line actually scanned by a light beam with respect to a predetermined main scan line of the light beam which scans the photosensitive member in each image station.

11. The apparatus according to claim 9, wherein said dot position conversion unit determines a line movement amount in a sub-scan direction used to move the position of the dot in accordance with an integer part of the discrepancy correction amount, and determines a distribution of dots between the main scan line on which the dot is located and a neighboring line based on a decimal part of the discrepancy correction amount.

12. The apparatus according to claim 9, wherein said arithmetic unit divides a main scan period in which the photosensitive member undergoes a main scan into a plurality of regions, and calculates discrepancy correction amounts for respective regions.

13. A method of controlling a color image forming apparatus in which a plurality of image stations, each of which has a photosensitive member, an exposure unit that forms an electrostatic latent image by irradiating the photosensitive member with a light beam modulated according to each color signal, a developing unit that visualizes the electrostatic latent image formed on the photosensitive member by the exposure unit, and a transfer unit that transfers each color image visualized by the developing unit onto a transfer material, are juxtaposed, and color images formed by the respective image stations are transferred in turn onto a transfer member conveyed by a feeding unit to form a color image, the method comprising:

an arithmetic step of calculating a discrepancy correction amount of a dot to be formed based on a discrepancy amount stored in a color discrepancy amount storage unit, which stores discrepancy amounts of images to be formed by the image stations in correspondence with the image stations, and a position of the dot to be formed;

a dot position conversion step of correcting a position where the dot is formed based on the discrepancy correction amount calculated in the arithmetic step; and a control step of controlling image formation in the image stations so as to form the dot at a position corrected in the dot position conversion step.

14. The method according to claim 13, wherein the color discrepancy amount storage unit stores a deviation of a main scan line actually scanned by a light beam with respect to a predetermined main scan line of the light beam which scans the photosensitive member in each image station.

15. The method according to claim 13, wherein the dot position conversion step includes a step of determining a line movement amount in a sub-scan direction used to move the position of the dot in accordance with an integer part of the discrepancy correction amount, and determining a distribution of dots between the main scan line on which the dot is located and a neighboring line based on a decimal part of the discrepancy correction amount.

16. The method according to claim 13, wherein the arithmetic step includes a step of dividing a main scan period in which the photosensitive member undergoes a main scan into a plurality of regions, and calculating discrepancy correction amounts for respective regions.

17. A color image forming apparatus in which a plurality of image stations, each of which has a photosensitive member, an exposure unit that forms an electrostatic latent image by irradiating the photosensitive member with a light beam modulated according to each color signal, a developing unit that visualizes the electrostatic latent image formed on the photosensitive member by the exposure unit, and a transfer unit that transfers each color image visualized by the developing unit onto a transfer material, are juxtaposed, and color images formed by the respective image stations are transferred in turn onto a transfer member conveyed by a feeding unit to form a color image, the apparatus comprising:

a color discrepancy amount storage unit configured to store discrepancy amounts of images to be formed by the image stations in correspondence with the image stations;

an arithmetic unit configured to calculate a discrepancy correction amount of a dot to be formed based on the discrepancy amount stored in said color discrepancy amount storage unit and a position of the dot to be formed;

a dot position conversion unit configured to correct a position where the dot is formed based on the discrepancy correction amount calculated by said arithmetic unit and dot data corresponding to the dot to be formed; and a control unit configured to control image formation in the image stations so as to form the dot at a position corrected by said dot position conversion unit.

18. The apparatus according to claim 17, wherein said color discrepancy amount storage unit stores a deviation of a main scan line actually scanned by a light beam with respect to a predetermined main scan line of the light beam which scans the photosensitive member in each image station.

19. The apparatus according to claim 17, wherein said dot position conversion unit determines a line movement amount in a sub-scan direction used to move the position of the dot in accordance with an integer part of the discrepancy correction amount, and determines a dot distribution of dot data not more than a dot size between the main scan line on which the dot is located and a neighboring line based on a decimal part of the discrepancy correction amount, when a density value of the dot data is not less than a predetermined value, and said dot position conversion unit determines a line movement amount in a sub-scan direction used to move the position of the dot in accordance with an integer part of the discrepancy correction amount when the density value of the dot data is not more than the predetermined value.

20. The apparatus according to claim 17, wherein said arithmetic unit divides a main scan period in which the photosensitive member undergoes a main scan into a plurality of regions, and calculates discrepancy correction amounts for respective regions.

21. A method of controlling a color image forming apparatus in which a plurality of image stations, each of which has a photosensitive member, an exposure unit configured to form an electrostatic latent image by irradiating the photosensitive member with a light beam modulated according to each color signal, a developing unit configured to visualize the electrostatic latent image formed on the photosensitive member by the exposure unit, and a transfer unit configured to transfer each color image visualized by the developing unit onto a transfer material, are juxtaposed, and color images formed by the respective image stations are transferred in turn onto a transfer member conveyed by a feeding unit to form a color image, the method comprising:

- an arithmetic step of calculating a discrepancy correction amount of a dot to be formed based on a discrepancy amount stored in a color discrepancy amount storage unit configured to store discrepancy amounts of images to be formed by the image stations in correspondence with the image stations and a position of the dot to be formed;
- a determination step of determining if a density of dot data corresponding to a dot to be processed is not less than a predetermined value;
- a dot position conversion step of correcting a position where the dot is formed based on the discrepancy correction amount calculated in the arithmetic step in accordance with a determination result in the determination step; and
- a control step of controlling image formation in the image stations so as to form the dot at a position corrected in the dot position conversion step.

22. The method according to claim 21, wherein the color discrepancy amount storage unit stores a deviation of a main scan line actually scanned by a light beam with respect to a predetermined main scan line of the light beam which scans the photosensitive member in each image station.

23. The method according to claim 21, wherein the dot position conversion step includes a step of determining a line movement amount in a sub-scan direction used to move the position of the dot in accordance with an integer part of the discrepancy correction amount, and determining a dot distribution of dot data not more than a dot size between the main scan line on which the dot is located and a neighboring line based on a decimal part of the discrepancy correction amount, when a density value of the dot data is not less than a predetermined value, and the dot position conversion step includes a step of determining a line movement amount in a sub-scan direction used to move the position of the dot in accordance with an integer part of the discrepancy correction amount when the density value of the dot data is not more than the predetermined value.

24. The method according to claim 21, wherein the arithmetic step includes a step of dividing a main scan period in which the photosensitive member undergoes a main scan into a plurality of regions, and calculates discrepancy correction amounts for respective regions.

25. An image forming apparatus comprising:
- an image forming unit configured to form an image on a print medium based on an input drive signal;
- a first memory configured to hold image information including a plurality of pieces of pixel information;
- a second memory configured to store correction information associated with misalignment correction of the image formed by said image forming unit;
- a conversion unit configured to convert a coordinate of a read address of said first memory based on the correction information stored in said second memory, and read out the pixel information in turn based on the converted address information;
- a third memory configured to temporarily hold the pixel information read out by said conversion unit;
- an acquisition unit configured to acquire the pixel information, a bit width of which is increased, by performing tone correction of the newly readout pixel information based on the correction information and pixel information held in said third memory; and
- an output unit configured to output the drive signal to said image forming unit based on the pixel information acquired by said acquisition unit.

26. The apparatus according to claim 25, wherein a plurality of image forming units equivalent to said image forming unit are equipped in correspondence with basic colors, and each of the plurality of image forming units forms an image of the corresponding basic color on the print medium,

- a plurality of second memories and third memories equivalent to said second memory and said third memory, a plurality of conversion units equivalent to said conversion unit, a plurality of acquisition units equivalent to said acquisition unit, and a plurality of output units equivalent to said output unit are equipped in correspondence with the basic colors, and
- said apparatus further comprises a feeding unit configured to feed the print medium among said plurality of image forming units, so as to superpose and form the images of the basic colors on the print medium using said plurality of image forming units.

27. The apparatus according to claim 25, wherein said image forming unit comprises:
- a photosensitive member configured to form an electrostatic latent image based on irradiation of a light beam;
- an exposure unit configured to irradiate said photosensitive member with the light beam;
- a developing unit configured to develop a toner image on said photosensitive member by transferring monochrome toner to said photosensitive member on which the electrostatic latent image is formed based on radiation of the light beam from said exposure unit; and
- a transfer unit configured to transfer the toner image developed on said photosensitive member onto the print medium.

28. The apparatus according to claim 25, further comprising an input unit configured to input increase information associated with an increase in bit width, and wherein said acquisition unit increases the bit width of each pixel based on the increase information.

29. A method of controlling an image forming apparatus having an image forming unit that forms an image on a print medium based on an input drive signal, the method comprising:
- a conversion step of converting a coordinate of a read address of an image memory, which holds image information including a plurality of pieces of pixel information, based on correction information associated with misalignment correction of the image formed by the image forming unit, and reading out the pixel information in turn based on the converted address information;
- a holding step of temporarily holding the pixel information read out in the conversion step in a holding unit;
- an acquisition step of acquiring the pixel information, a bit width of which is increased, by performing tone correction of the newly readout pixel information based on the correction information and pixel information held in the holding unit; and
- an output step of outputting the drive signal to said image forming unit based on the pixel information acquired in the acquisition step.

30. The method according to claim 29, wherein a plurality of image forming units equivalent to the image forming unit are equipped in correspondence with basic colors, and each of the plurality of image forming units forms an image of the corresponding basic color on the print medium, a plurality of image memories equivalent to the image memory, and a plurality of holding units equivalent to the holding unit are equipped in correspondence with the basic colors, the conversion step, the holding step, the acquisition step, and the output step are executed for each of the basic colors, and said method further comprises a feeding step of feeding the print medium among the plurality of image forming units, so as to superpose and form the images of the basic colors on the print medium using the plurality of image forming units.

31. The method according to claim 29, wherein the image forming unit comprises;

a photosensitive member configured to form an electrostatic latent image based on irradiation of a light beam;

an exposure unit configured to irradiate said photosensitive member with the light beam;

a developing unit configured to develop a toner image on said photosensitive member by transferring monochrome toner to said photosensitive member on which the electrostatic latent image is formed based on radiation of the light beam from said exposure unit; and a transfer unit configured to transfer the toner image developed on said photosensitive member onto the print medium.

32. The method according to claim 29, further comprising an input step of inputting increase information associated with an increase in bit width, and wherein the acquisition step includes a step of increasing the bit width of each pixel based on the increase information.

33. An image forming apparatus which forms an electrostatic latent image on a photosensitive member by exposure-scanning the photosensitive member with a light beam modulated according to an image signal, and forms a visible image by developing the electrostatic latent image, the apparatus comprising:

a holding unit configured to hold a discrepancy amount between a drawing path of the light beam in a main scan direction on the photosensitive member, and an ideal main scan direction on the photosensitive member; and a control unit configured to shift an exposure-scan start position of the light beam onto the photosensitive member based on the discrepancy amount.

34. The apparatus according to claim 33, wherein said holding unit holds, as the discrepancy amount, an angle $\theta$ that the drawing path of the light beam in the main scan direction makes with the ideal main scan direction, and said control unit shifts an exposure-scan start position of an n-th line by:

$$\Delta x_n = Ly(n-1) \cdot \sin \theta$$

where Ly is a distance between neighboring exposure scans.

35. The apparatus according to claim 34, wherein said control unit calculates a time $\Delta t_n$ required to make a scan of the light beam advance by $\Delta x_n$, and shifts the exposure-scan start position of the n-th line using the time $\Delta t_n$.

36. The apparatus according to claim 35, wherein said control unit changes a timing of a horizontal sync signal used to determine a timing of the main scan by the light beam based on the time $\Delta t_n$.

37. The apparatus according to claim 33, wherein said image forming apparatus has a plurality of photosensitive members for respective color components, and can form a color image by forming electrostatic latent images for the respective color components on the photosensitive members, said holding unit holds the discrepancy amounts unique to the photosensitive members, said image forming apparatus further comprises a determination unit configured to determine an image formed based on whether an image signal is an image using a single color component, and said control unit acquires the discrepancy amount of the corresponding color component from said holding unit, and shifts an exposure-scan start position of the light beam onto the photosensitive member of the corresponding color component based on the acquired discrepancy amount, when the image using only one of a plurality of color signals is to be formed.

38. The apparatus according to claim 33, wherein said image forming apparatus operates based on a multi-pass method that makes color image formation using a single photosensitive member, and said control unit shifts respective exposure-scan start positions of the light beam onto the photosensitive member based on the discrepancy amount in operations of respective passes that form electrostatic latent images corresponding to respective color components on the photosensitive member.

39. The apparatus according to claim 33, wherein said control unit shifts the exposure-scan start position in a unit smaller than one pixel.

40. An image distortion correction method in an image forming apparatus which forms an electrostatic latent image on a photosensitive member by exposure-scanning the photosensitive member with a light beam modulated according to an image signal, and forms a visible image by developing the electrostatic latent image, the method comprising:

an acquisition step of acquiring a discrepancy amount between a drawing path of the light beam in a main scan direction on the photosensitive member, and an ideal main scan direction on the photosensitive member; and a control step of shifting an exposure-scan start position of the light beam onto the photosensitive member based on the discrepancy amount.

* * * * *